United States Patent
Imaoka et al.

(10) Patent No.: US 10,978,228 B2
(45) Date of Patent: Apr. 13, 2021

(54) MAGNETIC MATERIAL AND MANUFACTURING METHOD THEREFOR

(71) Applicant: National Institute of Advanced Industrial Science and Technology, Tokyo (JP)

(72) Inventors: Nobuyoshi Imaoka, Nagoya (JP); Kimihiro Ozaki, Nagoya (JP)

(73) Assignee: National Institute of Advanced Industrial Science and Technology, Tokyo (JP)

(*) Notice: Subject to any disclaimer, the term of this patent is extended or adjusted under 35 U.S.C. 154(b) by 233 days.

(21) Appl. No.: 16/087,854

(22) PCT Filed: Mar. 24, 2017

(86) PCT No.: PCT/JP2017/012032
§ 371 (c)(1),
(2) Date: Sep. 24, 2018

(87) PCT Pub. No.: WO2017/164375
PCT Pub. Date: Sep. 28, 2017

(65) Prior Publication Data
US 2019/0051436 A1 Feb. 14, 2019

(30) Foreign Application Priority Data
Mar. 25, 2016 (JP) .............................. JP2016-062644

(51) Int. Cl.
*H01F 1/147* (2006.01)
*H01F 41/02* (2006.01)
(Continued)

(52) U.S. Cl.
CPC ............ *H01F 1/14791* (2013.01); *B22F 1/00* (2013.01); *B22F 3/00* (2013.01); *B22F 9/22* (2013.01);
(Continued)

(58) Field of Classification Search
None
See application file for complete search history.

(56) References Cited

U.S. PATENT DOCUMENTS

| 5,573,863 A | 11/1996 | Hayakawa et al. |
| 2004/0238796 A1 | 12/2004 | Abe |

(Continued)

FOREIGN PATENT DOCUMENTS

| JP | H06-316748 A | 11/1994 |
| WO | 03/015109 A1 | 2/2003 |

(Continued)

OTHER PUBLICATIONS

Balun, Intermetallics, vol. 15, p. 1237-1247. (Year: 2007).*
(Continued)

*Primary Examiner* — Xiaowei Su
(74) *Attorney, Agent, or Firm* — Morgan, Lewis & Bockius LLP

(57) ABSTRACT

Provided is a new magnetic material with high magnetic stability, as well as a manufacturing method therefor, said magnetic material having a higher saturation magnetization than ferrite-based magnetic materials, and having a higher electrical resistivity than existing metal-based magnetic materials, thus solving problems such as that of eddy current loss. Ti-ferrite nanoparticles obtained through wet synthesis are reduced within hydrogen, and grains are allowed to grow
(Continued)

while simultaneously using a phase separation phenomenon due to a disproportionation reaction to produce a magnetic material powder in which an α-(Fe, Ti) phase and a Ti-enriched phase are nano-dispersed. This powder is then sintered to produce a solid magnetic material.

19 Claims, 7 Drawing Sheets

(51) Int. Cl.

| | |
|---|---|
| B22F 9/22 | (2006.01) |
| C22C 14/00 | (2006.01) |
| C22C 38/00 | (2006.01) |
| H01F 1/33 | (2006.01) |
| B22F 3/00 | (2021.01) |
| H01F 1/22 | (2006.01) |
| B22F 1/00 | (2006.01) |
| H01F 1/34 | (2006.01) |
| H01F 1/20 | (2006.01) |
| B22F 1/02 | (2006.01) |
| C22C 32/00 | (2006.01) |
| H01F 1/26 | (2006.01) |
| H01F 1/36 | (2006.01) |

(52) U.S. Cl.
CPC .............. *C22C 14/00* (2013.01); *C22C 38/00* (2013.01); *H01F 1/147* (2013.01); *H01F 1/14733* (2013.01); *H01F 1/20* (2013.01); *H01F 1/22* (2013.01); *H01F 1/33* (2013.01); *H01F 1/34* (2013.01); *H01F 41/0246* (2013.01); *B22F 1/02* (2013.01); *B22F 3/003* (2013.01); *B22F 2998/10* (2013.01); *C22C 32/001* (2013.01); *C22C 2202/02* (2013.01); *H01F 1/26* (2013.01); *H01F 1/346* (2013.01); *H01F 1/36* (2013.01)

(56) References Cited

U.S. PATENT DOCUMENTS

| | | |
|---|---|---|
| 2010/0261038 A1 | 10/2010 | Imaoka et al. |
| 2016/0180993 A1 | 6/2016 | Kanada et al. |
| 2017/0053729 A1 | 2/2017 | Kotani et al. |

FOREIGN PATENT DOCUMENTS

| | | |
|---|---|---|
| WO | 2009/057742 A1 | 5/2009 |
| WO | 2015/020183 A1 | 2/2015 |
| WO | 2016/013183 A1 | 1/2016 |

OTHER PUBLICATIONS

Pande, Ironmaking and Steelmaking, Publication date: Oct. 2010, vol. 37 pp. 502-511. (Year: 2010).*
Turtelli et al., "Magnetostriction of Fe—Ti Alloys," IEEE Transactions on Magnetics, 46: 498-501 (2010).
Herzer, "Grain Size Dependence of Coercivity and Permeability in Nanocrystalline Ferromagents," IEEE Transactions on Magnetics, 26: 1397-1402 (1990).
Zhang et al., "Sintered powder cores of high Bs and low coreloss Fe84.3Si4B8P3Cu0.7 nano-crystalline alloy," AIP Advances, 3: 062118 (2013).
Imaoka et al., "High electrical resistance composite magents of Sm2Fe17N3 powders coated with ferrite layer for high frequency applications," Journal of Applied Physics,103: 07E129 (2008).
Abe, "Ferrite-Film Formation from an Aqueous Solution, and Its Applications", Journal of the Magnetics Society of Japan, 22: 1225 (1998) (see partial English translation).
Tsuchiya et al., "Combustion synthesis of TiFe-based hydrogen storage alloy from titanium oxide and iron," International Journal of Hydrogen Energy, 38: 6681-6686 (2013).
International Search Report issued in corresponding International Patent Application No. PCT/JP2017/012032 dated Jun. 13, 2017.

* cited by examiner

MAGNETIC MATERIAL AND MANUFACTURING METHOD THEREFOR

TECHNICAL FIELD

The present invention relates to a soft magnetic material or a semi-hard magnetic material, and a production method thereof.

BACKGROUND ART

Global environmental problems, such as global warming and exhaustion of resources, are becoming more severe, and the social demands for energy saving and using less resources in various electronic and electric devices are increasing day by day. In such a situation, there is a need for further improvement in the performance of soft magnetic materials used in the drive unit of motors and the like and the transformer of voltage-conversion devices. In addition, to solve various problems involved with manufacturing various compact and high-performance information communication devices, increasing calculation processing speeds, increasing recording storage capacity, as well as maintaining environmental sanitation in infrastructure, distribution systems that are becoming ever more complex, and strengthening the security that becomes increasingly diverse, there is a need to improve the electromagnetic properties, reliability, and sensitivity of various soft magnetic materials and semi-hard magnetic materials used for various elements, sensors, and systems.

Demand for next-generation automobiles equipped with large motors driven at high revolutions (hereinafter, this refers to revolution speeds exceeding 400 rpm) such as in electric automobiles, fuel cell automobiles, and hybrid automobiles, is expected to further increase in the future to meet the current calls to deal with environmental and energy problems. Among the various problems to be solved, better performance and lower costs for the soft magnetic material used for the stator in a motor are one of the important issues.

Existing soft magnetic materials used for the above applications are broadly divided into two types, namely, metallic magnetic materials and oxide-based magnetic materials.

Examples of the former, namely, metallic magnetic materials, include silicon steel (Fe—Si), which is a Si-containing crystalline material being a typical example of electromagnetic steels, as well as sendust (Fe—Al—Si), which is an intermetallic compound containing Al, electromagnetic soft iron (Fe), which is pure iron having a low carbon content of 0.3% by mass or less and a low impurity content, amorphous alloys such as permalloy, which contains Fe—Ni as a main component, and Metglas (Fe—Si—B), and a group of nanocrystalline soft magnetic materials (whose representative compositions include Fe—Cu—Nb—Si—B, Fe—Si—B—P—Cu, etc.), such as Finemet, which are nanocrystal-amorphous phase-separated materials obtained by precipitating microcrystals by applying an appropriate heat treatment to the amorphous alloy. The term "nano" as used here means a size of 1 nm or more and less than 1 m. For magnetic materials other than nanocrystalline soft magnetic materials, in terms of reducing coercive force and iron loss, it is important to facilitate movement of the domain walls as a composition that is as uniform as possible. It is noted that nanocrystalline soft magnetic materials are a heterogeneous system that include a crystalline phase, an amorphous phase, a Cu-enriched phase, and the like, and magnetization reversal is considered to be mainly caused by magnetization rotation.

Examples of the latter, namely, oxide-based magnetic materials, include ferritic magnetic materials such as Mn—Zn ferrite and Ni—Zn ferrite.

Silicon steel has until now been the soft magnetic material that is most widely used in high-performance soft magnetic material applications, and is a high magnetization, low coercive force magnetic material having a saturation magnetization of 1.6 to 2.0 T and a coercive force of 3 to 130 A/m. This material is obtained by adding up to 4% by mass of Si to Fe, which lowers the magnetocrystalline anisotropy and the saturation magnetostriction constant and reduces the coercive force without significantly impairing the large magnetization of Fe. In order to improve the performance of this material, it is necessary to remove foreign substances that hinder the movement of domain walls while increasing the crystal grain size by appropriately combining composition-controlled materials with the appropriate hot and cold rolling and annealing. In addition to non-oriented steel sheets with a random orientation of the crystal grains, directional steel sheets in which the (100) direction of Fe—Si, which is an easily magnetized direction, is highly oriented in the rolling direction are widely used as a material that further reduces coercive force.

Since this material is a rolled material, it has a thickness of less than about 0.5 mm. Further, since this material is a homogeneous metal material, it has a low electric resistance of about 0.5 $\mu\Omega$m. Generally, this material is used in large equipment applications by covering the surface of each silicon steel sheet with an insulating film, punching out with a die, and laminating and welding to provide thickness while suppressing eddy current loss that occurs in high-rotation applications, such as next-generation automobiles. Therefore, the costs of the punching and lamination steps, and deterioration of the magnetic properties are serious problems.

A nanocrystalline soft magnetic material such as Fe—Cu—Nb—Si—B is a soft magnetic material having a nanocrystalline structure in which the amorphous grain boundary phases are randomly oriented that is obtained by subjecting an alloy which has become amorphous by rapid cooling to a heat treatment at a temperature higher than the crystallization temperature to cause crystal grains of about 10 nm to precipitate in the amorphous phase. The coercive force of this material is extremely low, namely, 0.6 to 6 A/m, and the saturation magnetization is 1.2 to 1.7 T, which is higher than that of an amorphous material. Hence, the market for such materials is expanding at present. This material is a relatively new material that was developed in 1988. The principle behind these magnetic properties is that by making the crystal grain size smaller than the ferromagnetic exchange length (also called the exchange coupling length) and by causing the randomly-oriented main phase, namely, the ferromagnetic phase, to undergo ferromagnetic coupling through an amorphous interface phase, the magnetocrystalline anisotropy is averaged, thereby reducing the coercive force. This mechanism is called a random magnetic anisotropy model, or a random anisotropy model (e.g., see Non Patent Document 1).

However, since this material is produced after first producing a ribbon by liquid rapid quenching, the thickness of the product is about 0.02 to 0.025 mm, and the insulation, cutting, alignment, lamination, welding, and annealing steps are more complicated than for silicon steel, this material suffers from problems such as processability and thermal stability. Furthermore, the electric resistivity is small at 1.2 $\mu\Omega$m, and a problem with eddy current loss similar to other rolled materials and ribbons has been pointed out.

In order to overcome this, attempts have been made to prepare a bulk molding material by pulverizing the above-mentioned ribbon-shaped nanocrystalline soft magnetic material using SPS (discharge plasma sintering) (e.g., see Non Patent Document 2). However, the magnetic properties are much worse than for a 0.02 mm ribbon, with a coercive force of 300 A/m and a saturation magnetization of 1 T. At present, there is no good method other than a lamination method for producing products thicker than 0.5 mm.

Among existing soft magnetic materials so far, ferrite oxide materials have the least problem with eddy current loss in high-rotation applications. The electric resistivity of such a material is $10^6$ to $10^{12}$ μΩm, and the material can be easily bulked to 0.5 mm or more by sintering. Further, such a material can also be formed into a molded body free from eddy current loss. Therefore, it is a material suitable for high-rotation, high-frequency applications. In addition, since it is an oxide, this material does not rust and the stability of its magnetic properties is also excellent. However, the coercive force of this material is comparatively high, namely, 2 to 160 A/m, and in particular, the saturation magnetization is small at 0.3 to 0.5 T. Therefore, this material is not suitable for high-performance, high-speed motors for next-generation automobiles, for example.

In general, metallic soft magnetic materials such as silicon steel are used by laminating due to their thin thickness as a result of being rolled materials. However, such materials have a low electric resistance, and suffer from the occurrence of eddy current loss for high-rotation, high-performance motors. Consequently, lamination needs to be carried out in order to solve these problems. This results in serious problems such as the steps becoming complicated, an insulation treatment before lamination being necessary, magnetic properties deteriorating due to punching and the like, and increased costs for the steps. On the other hand, oxide-based soft magnetic materials such as ferrite have a large electric resistance and no problems with eddy current loss, but they are unsuitable for high-performance motors for next-generation automobiles because they have a small saturation magnetization of 0.5 T or less. However, from the perspective of oxidation resistance, oxide-based soft magnetic materials are superior to metallic soft magnetic materials in terms of having a high stability.

The upper limit of the thickness that can be used for the motor in the non-oriented electromagnetic steel sheets of silicon steel that are produced for high-performance motors for next-generation automobiles using permanent magnets is estimated as follows. First, when an alternating magnetic field with a frequency f is applied to the material, a skin depth s at which the strength of the magnetic field is 1/e is as shown in the following relational expression (1).

[Expression 1]

$$s = \sqrt{\rho / \pi \mu \mu_0 f} \quad (1)$$

In the case of a non-oriented electromagnetic steel sheet, which is silicon steel, by substituting an electric resistivity $\rho = 5 \times 10^{-7}$ [Ωm] and a permeability $\mu \mu_0 = 9200 \times 4\pi \times 10^{-7}$ [N/A$^2$] as representative values into relational expression (1), when the number of poles of the next-generation automotive motor is 8 and the maximum rotation speed is 10000 rpm, namely, f is 667 [Hz], the skin depth is 0.14 mm.

The condition for preventing a large reduction in the effective magnetization of the material is to set the particle size of the material to no greater than twice the skin depth. Therefore, for example, when a silicon steel sheet is used at 667 Hz, the sheet thickness needs to be about 0.3 mm, but since the thickness of the next-generation automotive motor is, for example, 9 cm, when a thin silicon steel sheet having a thickness of 0.3 mm is used, about 300 sheets each have to be insulated and laminated. The steps of insulating, punching, aligning, welding and annealing such a thin sheet are complicated and expensive. In order to make the laminated sheet thickness as thick as possible, it is necessary to increase the electric resistivity of the material.

Thus, there is a need for the appearance of a soft magnetic material having an electric resistance higher than a metallic silicon steel sheet and the like, a saturation magnetization higher than a ferrite magnetic material, and physical properties to compensate for problems caused by having such an electric resistance and saturation magnetization, namely, a soft magnetic material combining both the advantages of the high saturation magnetization of metallic magnetic materials and the small eddy current loss, absence of a lamination step and complicated steps associated therewith, high oxidation resistance, and good magnetic stability of oxide-based magnetic materials.

PRIOR ART DOCUMENTS

Non Patent Document

[Non Patent Document 1]
G. Herzer, IEEE Transactions on Magnetics, vol. 26, No. 5 (1990) pp. 1397-1402
[Non Patent Document 2]
Y. Zhang, P. Sharma and A. Makino, AIP Advances, vol. 3, No. 6(2013) 062118

SUMMARY OF INVENTION

Technical Problem

It is an object of the present invention to provide, by using a magnetic material in which an α-(Fe,Ti) phase and a Ti-enriched phase are nano-dispersed, a new magnetic material, and a production method thereof, having high magnetic stability, which enables a higher saturation magnetization to be realized than a ferrite magnetic material, and enables the above-mentioned problems such as eddy current loss to be solved due to having a higher electric resistivity than existing metallic magnetic materials.

Further, it is an object of the present invention to provide a powder sintered magnetic material that is capable of producing a molded body having a thickness of 0.5 mm or more, further 1 mm or more, and even 5 mm or more, by simple steps without performing complicated steps such as lamination, and at the same time can reduce eddy current.

Solution to Problem

The present inventors extensively studied magnetic materials that simultaneously satisfy two points, namely, having a high magnetization and being able to solve the above-mentioned problem of eddy current loss due to a high electric resistivity, which are contradictory characteristics for conventional magnetic materials, and yet have excellent electromagnetic properties that combine the merits of both metallic magnetic materials and oxide-based magnetic materials which do not require or mitigate complicated steps such as lamination, as well as have stable magnetic properties even in air. As a result, the inventors discovered that a magnetic material containing two or more of various crystal phases, or one crystal phase and an amorphous phase, can be obtained through disproportionation during a reduction reaction of titanium ferrite (in the present invention, also referred to as "Ti-ferrite"), which is completely different from the conventionally-used uniform homogeneous crystalline and amorphous materials or, among amorphous materials, nanocrystalline soft magnetic materials in which uniform nanocrystals are precipitated, and completed the present invention by controlling the composition, the crystal structure, the powder particle diameter, and the crystal grain size of the magnetic material, establishing a method for producing the magnetic material, and establishing a method for solidifying the magnetic material without laminating.

In order to solve the above problem, there is a need for a magnetic material having a saturation magnetization that is 0.3 T of ferrite, namely, since the magnetic material of the present invention has a density close to that of a metal system, the saturation magnetization needs to be approximately at a level of 30 emu/g or higher as represented in terms of the density of Fe, and an electric resistivity of 1.5 μΩm or more. Further, just in terms of a soft magnetic material, the saturation magnetization is preferably 100 emu/g or more, and more preferably 150 emu/g or more, and the electric resistivity is 1.5 μΩm or more.

Specifically, the present invention is as follows.

(1) A soft magnetic or semi-hard magnetic material, comprising a first phase having crystals with a bcc structure containing Fe and Ti and a second phase containing Ti, the second phase having a Ti content that is, when a sum of the Fe and the Ti contained in the second phase is taken to be 100 atom %, larger than a Ti content when a sum of the Fe and the Ti contained in the first phase is taken to be 100 atom %.

(2) The magnetic material according to the above (1), wherein the magnetic material is soft magnetic.

(3) The magnetic material according to the above (1) or (2), wherein the first phase has a composition represented by a composition formula $Fe_{100-x}Ti_x$ (where x is 0.001≤x≤33 in terms of atomic percentage).

(4) The magnetic material according to any one of the above (1) to (3), wherein the first phase has a composition represented by a composition formula $Fe_{100-x}(Ti_{100-y}M_y)_{x/100}$ (where x and y are 0.001≤x≤33 and 0.001≤y<50 in terms of atomic percentage, and M is one or more of Zr, Hf, Mn, V, Nb, Ta, Cr, Mo, W, Ni, Co, Cu, Zn, and Si).

(5) The magnetic material according to any one of the above (1) to (4), wherein the second phase is a phase having crystals with a bcc structure containing Fe and Ti, and the Ti content when the sum of the Fe and the Ti contained in the phase is taken to be 100 atom % is an amount of 2 times or more and $10^5$ times or less and/or 2 atom % or more and 100 atom % or less relative to the Ti content when the sum of the Fe and the Ti contained in the first phase is taken to be 100 atom %.

(6) The magnetic material according to any one of the above (1) to (5), wherein the second phase comprises at least any one of a Ti-ferrite phase and a wustite phase.

(7) The magnetic material according to any one of the above (1) to (6), wherein the second phase comprises a $TiO_2$ phase.

(8) The magnetic material according to any one of the above (1) to (7), wherein the phase having crystals with a bcc structure containing Fe and Ti has a volume fraction of 5% by volume or more based on the whole magnetic material.

(9) The magnetic material according to the above (6) or (7), wherein the magnetic material has a composition in a range of, based on the composition of the whole magnetic material, 20 atom % or more and 99.998 atom % or less of Fe, 0.001 atom % or more and 50 atom % or less of Ti, and 0.001 atom % or more and 55 atom % or less of O.

(10) The magnetic material according to any one of the above (1) to (9), wherein an average crystal grain size of the first phase, the second phase, or the whole magnetic material is 1 nm or more and less than 10 m.

(11) The magnetic material according to any one of the above (1) to (10), wherein at least the first phase has a bcc phase having a composition represented by a composition formula $Fe_{100-x}Ti_x$ (where x is 0.001≤x≤1 in terms of atomic percentage), and the bcc phase has a crystallite size of 1 nm or more and 100 nm or less.

(12) The magnetic material according to any one of the above (1) to (11), wherein the magnetic material is in a powder form, and when the magnetic material is soft magnetic, the magnetic material has an average powder particle diameter of 10 nm or more and 5 mm or less, and when the magnetic material is semi-hard magnetic, the magnetic material has an average powder particle diameter of 10 nm or more and 10 μm or less.

(13) The magnetic material according to any one of the above (1) to (12), wherein at least the first phase and the second phase are ferromagnetically coupled with adjacent phases.

(14) The magnetic material according to any one of the above (1) to (13), wherein the first phase and the second phase are continuously bonded to each other directly or via a metal phase or an inorganic phase to form a massive state as the whole magnetic material.

(15) A method for producing the magnetic material according to the above (12) by reducing a titanium ferrite powder having an average powder particle diameter of 1 nm or more and less than 1000 nm in a reducing gas containing hydrogen gas at a reduction temperature of 400° C. or more and 1290° C. or less.

(16) A method for producing the magnetic material according to any one of the above (1) to (13) by reducing a titanium ferrite powder having an average powder particle diameter of 1 nm or more and less than 1000 nm in a reducing gas containing hydrogen gas, and forming the first phase and the second phase by a disproportionation reaction.

(17) A method for producing the magnetic material according to the above (14) by sintering the magnetic material produced by the method according to the above (15) or (16).

(18) A method for producing a soft magnetic or semi-hard magnetic material, comprising performing annealing at least once after the reduction step in the method according to the above (15), or after the reduction step or the formation step in the method according to the above (16), or after the sintering step in the method according to the above (17).

Advantageous Effects of Invention

According to the present invention, there can be provided a magnetic material having a high saturation magnetization and a small eddy current loss, in particular a soft magnetic material that is suitably used even in high rotation motors and the like, and various soft magnetic materials and semi-hard magnetic materials having high oxidation resistance.

According to the present invention, because the magnetic material can be used in the form of a powder material like ferrite, it can easily be produced in bulk by sintering or the like, and hence the present invention can solve problems such as complicated steps like lamination and the like caused by the use of metallic soft magnetic materials known as thin sheets, as well as the high costs involved with such steps.

DESCRIPTION OF EMBODIMENTS

Figure 1:
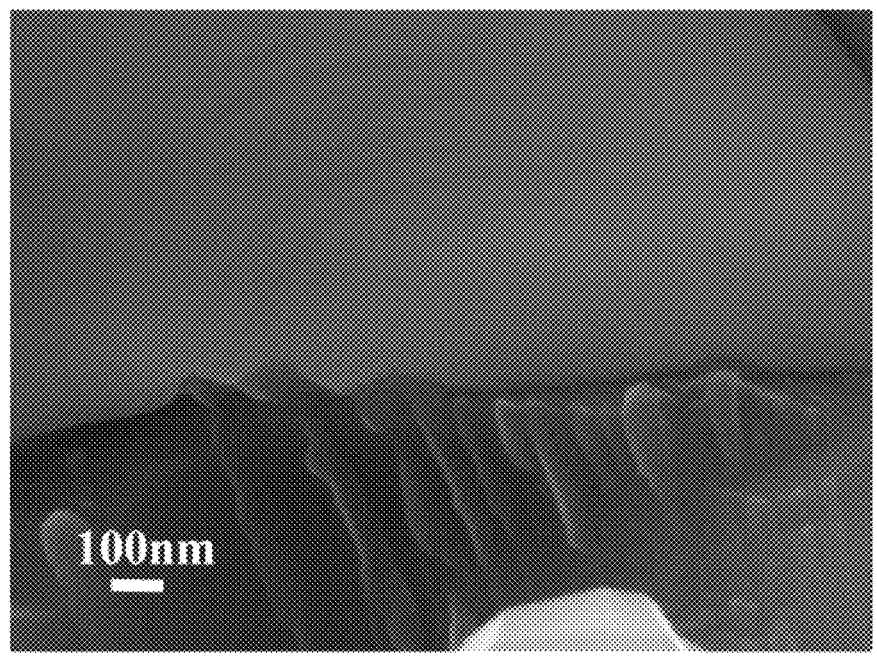
FIG. 1 is an SEM image of the interface between the first phase and the Ti enriched phase of a $Fe_{69.4}Ti_{30.6}$ soft magnetic material (Example 23).

The present invention will now be described in detail.

The term "magnetic material" as used in the present invention refers to magnetic materials called "soft magnetic" (i.e., "soft magnetic materials") and magnetic materials called "semi-hard magnetic" (i.e., "semi-hard magnetic materials"). Here, a "soft magnetic material" is a magnetic material having a coercive force of 800 A/m (≈10 Oe) or less, and a "semi-hard magnetic material" is a material having a coercive force exceeding 800 A/m and 40 kA/m (≈500 Oe) or less. In order to obtain an excellent soft magnetic material, it is important to have a low coercive force, a high saturation magnetization or permeability, and low iron loss. The causes of iron loss are mainly hysteresis loss and eddy current loss. In order to reduce the former, it is necessary to make the coercive force smaller, and in order to reduce the latter it is necessary to increase the electric resistivity of the material itself, or to increase the electric resistance of the whole molded body to be subjected to practical use. For a semi-hard magnetic material, it is required to have a coercive force that is appropriate for the application, and to have a high saturation magnetization and residual magnetic flux density. Among magnetic materials, soft magnetic or semi-hard magnetic materials used for high frequency generate a large eddy current, and hence it is important for the material to have a high electrical resistivity and that the powder particle diameter is small, or the sheet thickness is a thin sheet or ribbon.

The term "ferromagnetic coupling" as used in the present invention refers to a state in which adjacent spins in a magnetic material are strongly bound by exchange interaction. In particular in the present invention, this term refers to state in which the spins of two adjacent crystal grains (and/or amorphous grains) are strongly bound to each other by exchange interaction across the crystal boundary. Since exchange interaction is an interaction that only reaches a distance based on the short range order of the material, when a nonmagnetic phase is present at the crystal boundary, exchange interaction does not work on the spins in the region on either side thereof, and hence ferromagnetic coupling does not occur between the crystal grains (and/or amorphous grains) on either side. In the present application, the term "crystal grain" may include amorphous grains. Further, the characteristics of the magnetic curve of the material in which ferromagnetic coupling has occurred between different adjacent crystal grains having different magnetic properties will be described later.

The term "disproportionation" as used in the present invention means that phases having two or more different compositions or different crystal structures are produced from a phase in a homogeneous composition by a chemical reaction. In the present invention, disproportionation is caused as a result of a reducing substance such as hydrogen being involved in a phase of the homogeneous composition leading to the occurrence of a reduction reaction. During this "disproportionation" reaction, water is often produced as a by-product.

In the present invention, the expression "including Fe and Ti" means that the magnetic material of the present invention always contains Fe and Ti as components, and optionally the Ti may be substituted with a certain amount of other atoms (specifically, one or more of Zr, Hf, Mn, V, Nb, Ta, Cr, Mo, W, Ni, Co, Cu, Zn, and Si). Further, oxygen (O component) may be contained, and when an κ component or iron oxide hydroxide, or the like is present as a minor phase, H may be contained mainly as an OH group, and other unavoidable impurities as well as Cl or alkali metals such as K derived from raw materials may also be included. Alkali metals such as K are suitable components in that they may exert an effect of promoting the reduction reaction.

The term "magnetic powder" generally refers to a powder having magnetism, but in the present application a powder of the magnetic material of the present invention is referred to as "magnetic material powder". Therefore, the term "magnetic material powder" is included in the term "magnetic powder".

The present invention relates to a magnetic material comprising a phase (first phase) containing titanium in an α-Fe phase and a Ti-enriched phase (second phase) having a Ti content higher than the first phase. The best mode of the present invention is a "powder" in which the two phases are mixed and bonded at the nano level. These magnetic material powders are used for various devices by directly compacting or sintering. Further, depending on the application, an organic compound such as a resin, an inorganic compound such as glass or ceramic, a composite material thereof, or the like may be added and the resultant mixture may be molded.

Hereinafter, the composition, crystal structure and morphology, crystal grain size and powder particle diameter, and the production method of the first phase containing Fe and Ti and the second phase enriched with Ti will be described. In particular, a method for producing a nanocomposite oxide powder as a precursor of the magnetic material of the present invention, a method for reducing the powder, a method for solidifying the reduced powder, and a method for annealing in each step of these manufacturing methods, will be described.

<First Phase>

In the present invention, the first phase is a crystal having a bcc structure cubic crystal (space group Im-3m) containing Fe and Ti as a crystal structure. The Ti content of this phase is preferably 0.001 atom % or more and 33 atom % or less, based on a sum (total content) of the Fe and Ti contained in the phase of 100 atom %. Specifically, the composition of the first phase may be represented by the composition formula $Fe_{100-x}Ti_x$ (where x is $0.001 \leq x \leq 33$ in terms of atomic percentage).

Here, the Ti content and the Fe content are, unless stated otherwise, respectively the value of the atomic ratio of Ti or Fe relative to the sum (in the present application, as described above, sometimes also referred to as the total content, or as total amount) of Fe and Ti contained in the phase. In the present invention, this may be represented as an atomic percentage relative to the sum (total content) of Fe and Ti contained in the phase of 100 atom %.

It is preferable that the Ti content is 33 atom % or less in order to suppress a decrease in magnetization. Further, the Ti content is more preferably 20 atom % or less, because this means that, depending on the production method and conditions, a magnetization exceeding 1 T can be realized. In addition, the Ti content is even more preferably 10 atom % or less, as this enables a magnetic material having a saturation magnetization exceeding 1.6 T to be produced. Further, the Ti content is preferably 0.001 atom % or more, as this means that, unlike when Fe is used alone, the magnetic properties in the soft magnetic region can be adjusted by the effect of Ti addition. A particularly preferable range for the Ti content is 0.01 atom % or more and 10 atom % or less. In this region, depending on the production conditions, it is possible to prepare a semi-hard magnetic material from soft magnetic, and the magnetic material has even more preferable electromagnetic properties. Even if the coercive force is slightly sacrificed, when it is desired to produce a soft magnetic material having a higher magnetization, it is preferable to set the Ti content of the first phase to 5 atom % or less.

The first phase having a Fe—Ti composition having this bcc structure is also referred to as an α-(Fe,Ti) phase in the present application, since the symmetry of the crystal is the same as the α-phase, which is the room temperature phase of Fe.

When the content of the Ti component of the first phase of the present invention is taken to be 100 atom %, 0.001 atom % or more and less than 50 atom % of the Ti can be substituted with one or more of any of Zr, Hf, Mn, V, Nb, Ta, Cr, Mo, W, Ni, Cu, Co, Zn, and Si (in the present application, these substitution elements are also referred to as "M component"). Therefore, in the present invention, when the Ti contained in the first phase has a composition substituted with the M component, the combination of the Ti and the M component in the composition is equivalent to the above-mentioned "Ti component", and the Ti component content (specifically, the sum of the Ti content and the M component content in the composition) is 100 atom %. Among these M components, co-adding a large number of elemental species to the soft magnetic material of the present invention is effective in reducing coercive force. In particular, in terms of atomic percentage when the Ti component content of the first phase is taken to be 100 atom %, containing 1 atom % or more of Mn, V, Cr, and Mo is effective in enabling the nanocrystals of the present invention to be easily produced without largely depending on the cooling rate in the reduction treatment and the annealing treatment. Further, since Zr, Hf, Mn, Cr, V, Ni, Co, and Si decrease the anisotropic magnetic field, they are preferable as components coexisting with the soft magnetic material of the present invention. Also, in order to improve the saturation magnetization, Ni is preferably added in an amount of about 5 atom % or less, and Co is preferably added in an amount of less than about 50 atom %. Zr, Hf, Mn, V, Nb, Ta, Cr, Mo, and W suppress "improper grain growth" during the reduction step even when 1 atom % or less is added in terms of atomic percentage when the Ti component content of the first phase is taken to be 100 atom %. Mn, Ni, Co, Cu, and Zn are preferable for improving oxidation resistance and molding properties. Of these, when Mn is co-added to Ti, not only the above effects but also a unique synergistic effect is realized in which a low coercive force and high magnetization are achieved. The preferable substitution quantity of Mn with respect to Ti is 0.01 atom % or more and 50 atom % or less. A more preferable amount of the M component is not dependent on the elemental species, and is 0.1 atom % or more and 30 atom % or less in terms of the substitution quantity for Ti.

Therefore, for example, when the first phase has a composition formula $Fe_{100-x}Ti_x$ (where x is $0.001 \leq x \leq 33$ in terms of atomic percentage), if its Ti component is substituted with the M component in the range of 0.01 atom % or more and less than 50 atom %, the composition formula thereof is represented as $Fe_{100-x}(Ti_{1100-y}M_y)_{x/100}$ (where x and y are $0.001 \leq x \leq 33$ and $0.001 \leq y < 50$ in terms of atomic percentage, and M is one or more of Zr, Hf, Mn, V, Nb, Ta, Cr, Mo, W, Ni, Co, Cu, Zn, and Si).

Note that "improper grain growth" means that the nano-microstructure of the magnetic material of the present invention collapses and crystal grains grow with a homogeneous crystal structure. On the other hand, "grain growth" that is suitable in the present invention is growth in which the powder particle diameter grows to be large while maintaining the nano-microstructure that is a characteristic of the present invention, or growth in which a nano-microstructure appears in the crystal due to a disproportionation reaction, phase separation or the like after the powder particle diameter has grown to be large, or both of these cases. Unless otherwise noted, the term "grain growth" in the present invention refers to grain growth that is not improper and that can generally be said to be suitable. Even when the grain growth is improper or suitable, the surface area of the magnetic material per unit mass or per unit volume becomes small, and hence oxidation resistance generally tends to be improved.

For any of the M components, from the perspective of the addition effect described above, the amount added is preferably 0.001 atom % or more in terms of the atomic percentage when the Ti component content of the first phase is taken to be 100 atom %, and from the perspective of preventing inhibition of the various effects of the Ti component in the magnetic material of the present invention, the amount added is preferably 50 atom % or less.

In the present invention, when expressed as "Ti component", or when expressed as "Ti", "titanium" in the context of discussing formulas such as "α-(Fe,Ti)" phase or the composition of the magnetic material, the Ti includes not only cases in which Ti is used alone, but also compositions in which 0.001 atom % or more and less than 50 atom % of the Ti content is substituted with an M component. In addition, although it is necessary to remove as much as possible impurities mixed in during the steps, unavoidable impurities such as H, C, Al, Si, S, N, alkali metals such as Li, K and Na, alkali earth metals such as Mg, Ca, Sr, rare earth metals, halogens such as Cl, F, Br, I, and the like may be included. However, the content of such impurities is to be 5 atom % or less, preferably 2 atom % or less, more preferably 0.1 atom % or less, and particularly preferably 0.001 atom % or less, of the whole (i.e., sum of Fe and Ti contained in the first phase). This is because the greater the content of these impurities, the lower the magnetization, and in some cases, the coercive force is also adversely affected, which depending on the application may deviate from the target range. On the other hand, when some components, such as alkali metals like K, which act as reducing aids if contained to some extent, are contained in an amount of 0.0001 atom % or more and 5 atom % or less of the total (i.e., sum of Fe and Ti contained in the first phase), a magnetic material having a high saturation magnetization may be obtained. Therefore, when the above-mentioned impurities hinder the object of the present invention, it is most desirable not to include such impurities.

The α-Fe phase not containing Ti is not included in the first phase or the second phase. The reason for this is that if the content of elements other than Ti is also extremely small, the α-Fe phase not containing Ti is expected to have saturation magnetization like electromagnetic soft iron, but even if the α-Fe phase is a powder in the nano region, the effect on electric resistivity is poor, oxidation resistance is poor, and the material is inferior in cutting processability. However, the α-Fe phase not containing Ti may exist as a separate phase as long as it does not hinder the object of the present invention. When the present invention is a soft magnetic material, the volume fraction of the α-Fe phase is preferably less than 50% by volume based on the whole magnetic material of the present invention.

The volume fraction referred to here is the ratio of the volume occupied by the target component based on the total volume of the magnetic material.

<Second Phase>

In the present invention, the second phase is a phase in which the Ti content relative to the sum of Fe and Ti contained in the phase is larger than the Ti content relative to the sum of Fe and Ti contained in the first phase. In other words, in the present invention, the second phase is a phase in which the atomic percentage of Ti relative to the sum of Fe and Ti contained in the phase is larger than the atomic percentage of Ti relative to the sum of Fe and Ti contained in the first phase. Examples of the second phase may include cubic crystals, such as an α-$(Fe_{1-y}Ti_y)$ phase (phase in space group Im-3m having the same crystal phase as the first phase, but a higher Ti content than the first phase), a TiFe phase (space group Pm-3m), a γ-(Fe,Ti) phase (space group Fm-3m), a wustite phase (representative composition is a $(Fe_{1-z}Ti_z)_aO$ phase, a is usually 0.85 to less than 1, in the present specification this phase is sometimes simply referred to as (Ti,Fe)O phase), a Ti-ferrite phase (representative composition is a $(Fe_{1-w}Ti_w)_3O_4$ phase, when Ti in the formula does not have an M component, this phase is called a titanomagnetite phase; and when Ti in the formula does not have another M component, but W=⅓, this phase is called an urbospinel phase), and a β-Ti phase (in some cases containing Fe up to 23 atom % and O up to 8 atom %), hexagonal crystals, such as a Laves phase (representative composition is a $TiFe_2$ phase) and an α-Ti phase (in some cases containing O up to 24 atom %), rhombohedral crystals, such as an ilmenite phase (representative composition is a $TiFeO_3$ phase) and a titanohematite phase (representative composition is a $Fe_{2-u}Ti_uO_3$ phase), tetragon crystals, such as, of $TiO_2$ phases, an anatase phase and a rutile phase, orthorhombic crystals, such as a pseudobrookite phase (a ferrous pseudobrookite phase, representative composition is a $Fe_{1+v}Ti_{2-v}O_5$ phase) and a brookite type $TiO_2$ phase, as well as a Ti—Fe amorphous phase and the like, a $Ti_{70}Fe_{30}$ eutectic point composition phase (composition ratio is described to one significant digit), a $Ti_{90}Fe_{10}$ eutectoid point composition phase (composition ratio is described to one significant digit), and the like, and mixtures thereof. It is noted that the amorphous phase, the eutectic point composition phase, and the eutectoid phase composition phase (in the present application, also referred to as "amorphous phase and the like") differ depending on their Ti content and reduction conditions, but when an amorphous phase and the like is present, microcrystals such as the existing nanocrystal-amorphous phase separation type material described above do not form a fine structure being in the form of islands and floating in an amorphous sea, but often exist in an island shape separated from the first phase. The content of the amorphous phase and the like is between 0.001 and 10% by volume, and from the perspective of suppressing a reduction in magnetization, preferably not more than this. To obtain a magnetic material with higher magnetization, this content is preferably 5% by volume or less. The amorphous phase and the like may be contained in order to control the disproportionation reaction itself, but in this case, it is preferable to set the content to more than 0.001% by volume from the perspective of controlling this reaction.

Although the second phase has poorer saturation magnetization than the first phase, the coexistence of these phases greatly increases electric resistivity. Further, in the present invention, the coercive force is improved when forming the semi-hard magnetic material. Conversely, in the present invention, when forming a soft magnetic material, depending on the crystal structure, composition, microstructure, interface structure and the like of the phases, it is possible to realize a small coercive force by ferromagnetically coupling with the phases. In addition, in the second phase as well, similarly to the first phase, it is possible to substitute less than 50 atom % of the Ti content (wherein the content of the Ti component in the second phase is taken to be 100 atom %) with an M component. Here, in the present invention, similarly to the above-mentioned "Ti component" of the first phase, the "Ti component" of the second phase also refers to, when the Ti contained in the second phase is substituted with an M component, the combination of the Ti and the M component in its composition.

<Minor Phase, Other Phases>

A phase that does not contain Fe or Ti, and that is mixed with only an M component compound, is not included in the first phase or the second phase. However, there are cases where such a phase contributes to improving electric resistivity, oxidation resistance, sinterability, and the electromagnetic properties of the semi-hard magnetic material of the present invention. In the present application, a phase that does not contain a Ti component, such as a compound phase of the above-mentioned M component or an Fe compound phase, and a phase in which the content of the M component is equal to or more than the content of the Ti element, is referred to as a "minor phase".

Other than the first phase and the second phase, the magnetic material may also contain a minor phase that does not contain Ti, such as a wustite phase, a magnetite phase ($Fe_3O_4$), a maghemite phase ($\gamma$-$Fe_2O_3$), a hematite phase ($\alpha$-$Fe_2O_3$), an $\alpha$-Fe phase, and a $\gamma$-Fe phase, an iron oxide hydroxide phase that may or may not contain Ti, such as goethite, akagenite, lepidocrocite, ferroxyhyte, ferrihydrite, green rust, a hydroxide such as potassium hydroxide and sodium hydroxide, a chloride such as sodium chloride and potassium chloride, a fluoride, a carbide, a nitride, a hydride, a sulfide, a nitrate, a carbonate, a sulfate, a silicate, a phosphate, and the like. The volume of such components needs to be smaller than the volume of the first phase in order for the magnetic material of the present invention to have a high saturation magnetization and also to exhibit stable magnetic properties and high magnetization over time. From the perspective of suppressing a decrease in the saturation magnetization, the preferable range of the content of these phases is 50% by volume or less based on the volume of the whole magnetic material.

The content of the M component in all of the phases, including the first phase, the second phase, and the minor phase, must not exceed the Ti content contained in the first phase and the second phase based on all the phases. This is because when the content of the M component exceeds the Ti content, the unique characteristic effects on electromagnetic properties specific to Ti, for example, a reduction in magnetocrystalline anisotropy, an improvement in electric resistivity, and an improvement of oxidation resistance due to passivation of powder surface, are lost. In the present application, the Ti content of the first phase and/or the second phase is an amount that includes the M component.
<Case in which Second Phase has Same Crystal Structure as First Phase>

Although the second phase may have the same crystal structure as the first phase, it is important that the phases are sufficiently different from each other in terms of their composition. For example, it is preferable that the Ti content of the second phase relative to the sum of Fe and Ti in the second phase is higher than the Ti content of the first phase relative to the sum of Fe and Ti in the first phase, and that this difference is twice or more and/or the Ti content of the second phase is 2 atom % or more relative to the sum of Ti and Fe in the second phase.

The Ti component content itself in the second phase does not exceed 100 atom %. When the lower limit of the Ti content of the first phase is 0.001 atom %, the Ti content of the second phase does not exceed $10^5$ times the Ti content of the first phase. The Ti content of the second phase is preferably 90 atom % or less of the Ti content of the first phase. This is because when the Ti content exceeds 90 atom % (i.e., when the Ti content of the second phase exceeds $9 \times 10^4$ times the Ti content of the first phase) while the second phase maintains the same crystal structure as that of the first phase at ordinary temperature, the thermal stability of the whole magnetic material of the present invention may deteriorate.

In the above, the case described as the "Ti content" of the second phase being "twice or more" that of the first phase refers to a case in which, when the Ti content of each phase is calculated to one significant digit, the Ti content of the second phase is twice or more the Ti content of the first phase.

It is an objective of the present invention to lower coercive force by utilizing the magnetic anisotropy fluctuations in the above-mentioned random magnetic anisotropy model or a model in accordance therewith. Therefore, it is important either that the first phase and the second phase, which are crystallographically independent, are magnetically coupled at the nano level by exchange coupling, or that the Ti content in the bcc phase including the first phase and the second phase has a spatial change at the nanoscale (this is sometimes referred to in the present invention as a "concentration fluctuation"). However, if the Ti composition ratio of these two phases is too close, there are cases where the crystal orientations of the crystal phases are aligned in the same direction, and in addition, the magnitude of the magnetocrystalline anisotropy constant is often smaller in the second phase. However, when the Ti content is less than 2 atom % relative to the sum of Fe and Ti in the second phase, the crystalline magnetic anisotropy increases and when averaged the crystalline magnetic anisotropy value is not sufficiently small. As a result, a sufficiently low coercive force is not realized. Therefore, the preferable Ti content of the second phase is 2 atom % or more relative to the sum of Fe and Ti in the second phase, and more preferably 5 atom % or more. In the latter case, the magnetocrystalline anisotropy of the two phases is reduced to less than half that when Ti is not contained. When the Ti content is even more preferably 8 atom % or more, because this means that the magnetocrystalline anisotropy is very small.

If there is a phase (first phase) in which the Ti content is lower than the Ti content of the whole magnetic material of the present invention, this means that in the same magnetic material there will be a phase (second phase) in which the Ti content is higher than that of the magnetic material of the present invention. Therefore, if isotropy is realized as a result of those phases ferromagnetically coupling, the material will be the magnetic material of the present invention, specifically a soft magnetic material. Further, if the material is interposed at the interface of the first phase, has a coercive force within the appropriate range, and has an action of increasing electric resistance, then the material will be the magnetic material of the present invention, specifically a semi-hard magnetic material. Even when the material is not sufficiently isotropic, if there is spatial concentration fluctuation of the Ti content in a given crystal phase, there will be fluctuation in the magnetic anisotropy, and the coercive force may decrease by a mechanism that is slightly different from the random anisotropy model. In general, the magnetic material of the present invention, in which the coercive force decreases by such a mechanism often has a Ti content relative to the sum of Ti and Fe in the magnetic material of 10 atom % or less. The above is one characteristic of the magnetic material of the present invention that is not seen in most existing soft magnetic materials such as electromagnetic steel sheets and sendust, which have highly homogenous compositions designed to thoroughly eliminate heterogeneity so as not to inhibit domain wall movement. This characteristic can be said to be common with magnetic materials in which magnetization reversal occurs due to the rotation of magnetization.

In the present invention, it may be noted that a state in which only the first phase or only the second phase is magnetically coupled at the nano level by exchange coupling may be included. Even in this case, it is important for the crystal axis directions of adjacent nanocrystals not to be aligned, and for the material to be isotropic or have a nanoscale spatial distribution of the Ti content in the bcc phase containing the first phase and the second phase. However, in the present invention, it is impossible to achieve a magnetic material composed of microcrystals of only the first phase or a magnetic material composed of microcrystals of only the second phase, and even when such a structure is included, in the present invention, the first phase and the second phase always exist in the magnetic material. The reason for this is that the formation of the nanocrystals per se plays a large role in the disproportionation reaction in each of the processes of the reduction step that kicks off with reduction of the nanoscale ferrite powder containing titanium that is used for producing the magnetic material of the present invention (in the present application, also referred to as "titanium ferrite nanopowder" or "Ti-ferrite nanopowder"). In the present application, a nanoscale ferrite powder is also referred to as a "ferrite nanopowder", and the term "nanoscale" means, unless defined otherwise, a scale of 1 nm or more and less than 1 μm.

<Specification of Second Phase>

How to specify the second phase will now be described. First, as described above, the first phase is an α-(Fe,Ti) phase, which is mainly to guarantee a high saturation magnetization. The second phase is a phase whose Ti content relative to the sum of Fe and Ti contained in that phase is higher than the Ti content relative to the sum of Fe and Ti contained in the first phase. In the present invention, the second phase may be an α-(Fe,Ti) phase whose Ti content is higher than the Ti content of the whole magnetic material, or may be another crystal phase, an amorphous phase, or a mixed phase thereof. In any case, the soft magnetic material of the present invention has an effect of keeping the coercive force low, so that even if a semi-hard magnetic material is included, there is an effect of imparting oxidation resistance and improving electric resistivity. Therefore, since the second phase is an aggregate of phases having these effects, if the Ti content is higher than that of the first phase, and it is possible to show the presence of any of the phases exemplified above, that material can be understood as being the magnetic material of the present invention. If such a second phase is not present and the material is composed only of the first phase, that magnetic material will have poorer magnetic properties such as coercive force, oxidation resistance, or electric conductivity, and inevitably processability will be poor and the molding steps will be complicated.

If the second phase is an α-(Fe,Ti) phase, the Ti composition may continuously change from that of the first phase. Alternatively, depending on the method for identifying the material, it may appear as if the Ti composition of the second phase continuously changes from the first phase. In such a case as well, it is desirable that the Ti content of the second phase is twice or more the Ti content of the first phase, or that the Ti content of the second phase is 2 atom % or more and larger than the Ti content of the first phase, or the Ti content of the second phase is twice or more the Ti content of the first phase and 2 atom % or more.

The composition ratio of Fe and Ti is, when the first phase and the second phase are combined, desirably 1:1 or less. In other words, the Ti content relative to the total amount of Fe and Ti is desirably 0.01 atom % or more and 50 atom % or less.

The Ti content including the first phase and the second phase together is preferably 50 atom % or less in order to avoid a reduction in the saturation magnetization, and is preferably 0.01 atom % or more in order to avoid having no effect of adding the Ti on oxidation resistance and to avoid the coercive force becoming so high that it does not correspond to the intended use. Further, from the perspective of a good balance between oxidation resistance and magnetic properties, the Ti content when the first phase and the second phase are combined is preferably 0.05 atom % or more and 33 atom % or less, and a particularly preferable range is 0.1 atom % or more and 25 atom % or less.

Although the volume ratio of the first phase and the second phase is arbitrary, the sum of the volume of the α-(Fe,Ti) phase in the first phase, or the α-(Fe,Ti) phase in the first phase and the second phase based on the whole magnetic material of the present invention including the first phase, the second phase, and the minor phase is preferably 5% by volume or more. Since the α-(Fe,Ti) phase is responsible for the main magnetization of the magnetic material of the present invention, the α-(Fe,Ti) phase volume is preferably 5% by volume or more in order to avoid a reduction in magnetization. Further, the α-(Fe,Ti) phase volume is preferably 25% by volume or more, and more preferably 50% by volume or more. In order to realize a particularly high magnetization without substantially reducing the electric resistivity, it is desirable to set the sum of the α-(Fe,Ti) phase volume to 75% by volume or more.

In the second phase of the soft magnetic material of the present invention, it is preferable that there is a ferromagnetic phase or an antiferromagnetic phase (in the present application, weak magnetism is also included therein), because there is an effect of reducing the magnetocrystalline anisotropy of the first phase.

<Example of Preferable Second Phase>

In the magnetic material of the present invention, as a representative example of the preferable second phase for ferromagnetism, first, the Ti content of the second phase relative to the sum of Fe and Ti in the second phase is higher than that of the first phase relative to the sum of Fe and Ti in the first phase. Preferably, there is an α-(Fe,Ti) phase that has a Ti content of, relative to the sum of Fe and Ti in the second phase, 0.1 atom % or more and 20 atom % or less, more preferably 2 atom % or more and 15 atom % or less, and particularly preferably 5 atom % or more and 10 atom % or less.

A low coercive force is realized when the Ti content of the first phase relative to the sum of Fe and Ti in the first phase is 5 atom % or more and 10 atom % or less. However, when the Ti content is increased to such a degree, a saturation magnetization of close to 2 T cannot be exhibited. Therefore, it is preferable to realize a magnetic material having a large saturation magnetization and a small coercive force by combining a first phase having a Ti content of less than 5 atom % and a second phase having a Ti content of 5 atom % or more.

Examples of the preferred second phase may include a Ti-ferrite phase and a wustite phase. The former is ferromagnetic and the latter is antiferromagnetic, but either of them can promote ferromagnetic coupling if it is in the first phase. These oxide phases may be nano-sized and very fine structures. In particular, for the wustite phase, it is several atomic layers thick and may be finely dispersed in the bcc phase or layered between the bcc microcrystalline phases. When such an oxide layer is present, the crystal orientation of the bcc phase may be uniform in the region of several hundred nm to several tens of μm, but even with such a microstructure, as long as the crystal grain size and the like is within the range of the present invention, such a material is considered to be the magnetic material of the present invention. In particular, when a magnetic material having the above structure is a soft magnetic material, the coercive force is lowered by a mechanism slightly different from the random anisotropy. It is assumed that the mechanism is as follows.

If, due to disproportionation, there is a difference between the Ti content of the first phase relative to the sum of Fe and Ti in the first phase and the Ti content of the second phase relative to the sum of Fe and Ti in the second phase, and there is a concentration fluctuation in the Ti content spatially at a fine nanoscale, spatial fluctuation of the magnetic anisotropic properties occurs. As a result, magnetization reverses all of a sudden (as if a resonance phenomenon has occurred) when an external magnetic field is applied. The above concentration fluctuation has the same effect on reducing coercive force not only when the second phase is an oxide phase, but also when it is an $\alpha$-(Fe,Ti) phase.

Although examples in which the ferrite phase promotes ferromagnetic coupling are also known (in regards to this, see International Publication No. WO 2009/057742 (hereinafter, referred to as "Patent Document 1"), and N. Imaoka, Y. Koyama, T. Nakao, S. Nakaoka, T. Yamaguchi, E. Kakimoto, M. Tada, T. Nakagawa, and M. Abe, J. Appl. Phys., Vol. 103, No. 7 (2008) 07E129 ((hereinafter, referred to as "Non Patent Document 3"), in all of those cases, a ferrite phase is present between $Sm_2Fe_{17}N_3$ phases of a hard magnetic material, and those phases are ferromagnetically coupled to constitute an exchange spring magnet.

However, the present invention relates to a soft magnetic material and a semi-hard magnetic material, and exhibits completely different functions from those of the above-mentioned hard magnetic exchange spring magnet. In the present invention, if such a second phase is present so as to surround the first phase through an exchange interaction between first phases due to the presence of the second phase, which is a Ti-ferrite phase or a wustite phase, electric resistance is also high, and coercive force is also reduced. Therefore, this is a particularly preferable second phase for the soft magnetic material of the present invention.

On the other hand, the presence of a nonmagnetic $TiO_2$ phase in the second phase is preferable because the electric resistance, in particular, is improved. Even if it is present between the first phases, although ferromagnetic coupling like a Ti-ferrite phase occurs and there is no direct effect on the magnetic properties, the presence of $TiO_2$ covering the surfaces of such ferromagnetically coupled powder not only improves electric resistance and oxidation resistance, but may also have an effect of reducing coercive force in some cases.

In the magnetic material of the present invention, when the second phase is any one of a Ti-ferrite phase, a wustite phase, or a $TiO_2$ phase, or a mixed phase thereof, the volume fraction of the mixed oxide phase is preferably set to 95% by volume or less of the whole magnetic material, more preferably 75% by volume or less, and even more preferably 50% by volume or less. For example, the Ti-ferrite phase has a lower magnetization than the $\alpha$-(Fe,Ti) phase even though it is ferromagnetic, and the wustite phase is also weakly magnetic even though it is antiferromagnetic, and hence although magnetization exists to a certain extent, magnetization is lower than for the Ti-ferrite phase. In addition, the $TiO_2$ phase is nonmagnetic. Therefore, when any combination of the above-mentioned oxide phases exceeds 95% by volume of the whole magnetic material, the magnetization of the magnetic material of the present invention becomes extremely low. To avoid this, the volume fraction of the mixed oxide phase is preferably set to 95% by volume or less. When the wustite phase or the $TiO_2$ phase is predominant, since magnetization decreases when the content of these three oxide phases exceeds 75% by volume, in order to avoid this, it is preferable to set the content of those oxide phases to 75% by volume or less of the whole magnetic material. When the $TiO_2$ phase is predominant, the characteristic of the magnetic material of the present invention of having a high magnetization is lost when the $TiO_2$ phase exceeds 50% by volume. In order to avoid this, it is preferable to set the $TiO_2$ phase to 50% by volume or less of the whole magnetic material. When a magnetic material having particularly high magnetization is to be produced while maintaining a certain level of electric resistivity, it is preferable to set the oxide phase to 25% by volume or less.

Conversely, when a $TiO_2$ phase or the like is present, the electric resistivity increases. Therefore, in cases where the $TiO_2$ phase or the like is deliberately incorporated, the volume fraction is preferably 0.001% by volume or more. When $TiO_2$ is to be present without particularly causing a substantial reduction in magnetization, in order to effectively improve the electric resistivity, the volume fraction is more preferably 0.01% by volume or more, and particularly preferably 0.1% by volume or more. Here, for example, even when the oxide phase is $TiO_2$, and even in the case of a mixture of Ti-ferrite and wustite, this preferable range of the volume fraction and the like is the same.

As described above, as a preferable second phase, an $\alpha$-(Fe,Ti) phase having a higher Ti content than the first phase, a Ti-ferrite phase, a wustite phase, and a $TiO_2$ phase have been mentioned as examples. Of those examples, the three phases other than the $TiO_2$ phase are ferromagnetic or antiferromagnetic. Therefore, if these phases are separated without ferromagnetic coupling, since the magnetic curve has additivity, the magnetic curves of these mixed materials are simply the sum of the respective magnetic curves, and a smooth step is produced on the magnetic curve of the whole magnetic material. For example, by observing the shape of the ¼ major loop (the magnetic curve when swept from 7.2 MA/m to the zero magnetic field is called the ¼ major loop) of the magnetic curve of the whole magnetic material, which is obtained by measuring the magnetization over a wide magnetic field range from 0 to 7.2 MA/m of an external magnetic field, it can be inferred that the smooth step on the ¼ major loop is due to the above-mentioned circumstances or that there is certainly an inflection point based thereon. On the other hand, when these dissimilar magnetic materials are formed as one body by ferromagnetic coupling, a smooth step or an inflection point is not seen on the major loop in the range of 7.2 MA/m to the zero magnetic field, but a monotonically increasing magnetic curve with a convex portion at the top is produced. In order to estimate the existence of ferromagnetic coupling, in addition to observing the fine structure at the grain boundary region as described above, the above-mentioned detailed observation of the magnetic curve is also a measure.

<Composition Distribution>

In the examples of the present application, local composition analysis of the metal elements of the magnetic material of the present invention is mainly carried out by EDX (energy dispersive X-ray spectroscopy), and the composition analysis of the whole magnetic material is carried out by XRF (X-ray fluorescence elemental analysis). Generally, the Ti content of the first phase and the second phase is measured by an EDX apparatus attached to an SEM (scanning electron microscope), an FE-SEM, a TEM (transmission electron microscope), or the like (in the present application, this FE-SEM etc. equipped with an EDX is also referred to as an FE-SEM/EDX, for example). Depending on the resolution of the apparatus, if the crystal structure of the first phase and the second phase is a fine structure of 300 nm or less, accurate composition analysis cannot be performed with an SEM or FE-SEM. However, to detect only the difference in the Ti or Fe components of the magnetic material of the present invention, those apparatus can be utilized in a supplementary manner. For example, in order to find a second phase that is less than 300 nm and has a Ti content of 5 atom % or more, a certain point in the magnetic material is observed, and if the quantitative value of that point can be confirmed as having a Ti content of 5 atom % or more, then that means that a structure having a Ti content of 5 atom % or more or a part of such a structure is present within a diameter of 300 nm centered on that one point. Conversely, to find a first phase having a Ti content of 2 atom % or less, a certain point is observed in the magnetic material, and if the quantitative value of that point can be confirmed as having a Ti content of 2 atom % or less, then that means that a structure having a Ti content of 2 atom % or less or a part of such a structure is present within a diameter of 300 nm centered on that one point.

When analyzing the composition by using the EDX apparatus attached to the TEM, it is also possible to narrow down the electron beam to 0.2 nm, for example, and it is possible to perform very fine composition analysis. On the other hand, in order to investigate a certain area thoroughly and to gain an overall picture of the materials of the present invention, it is necessary to handle a large amount of data such as, for example, 60 thousand points.

In other words, it is necessary to appropriately select the composition distribution measurement method described above, and specify the compositional and structural characteristics of the magnetic material of the present invention, such as the composition of the first phase and the second phase, the crystal grain size.

Further, the composition of the $\alpha$-(Fe,Ti) phase can also be determined by confirming the diffraction peak positions by using an XRD (X-ray diffractometer). In general, the diffraction peaks of the $\alpha$-(Fe,Ti) phase tend to shift to a lower angle as the Ti content increases. Among those peaks, by observing the behavior of the (110) and (200) peaks, and comparing with the diffraction positions of $\alpha$-Fe (Fe-ferrite nanopowder not including Ti or an M component was separately prepared and compared as a comparative example while using the method of the present invention as a reference) the Ti content of the $\alpha$-(Fe,Ti) phase can be known to one significant digit.

The Ti composition, which is a characteristic of the present invention, is useful for verifying whether various crystal phases are present due to disproportionation, and whether their crystal axes are randomly oriented or not. Furthermore, to distinguish the $\alpha$-(Fe,Ti) phase from the other oxide phases, it is convenient and effective to analyze the oxygen characteristic X-ray surface distribution map using, for example, SEM-EDX.

<Composition of Whole Magnetic Material>

The composition of the whole magnetic material in the present invention is in the range of, based on the composition of the whole magnetic material, 20 atom % or more and 99.999 atom % or less of the Fe component, 0.001 atom % or more and 50 atom % or less of the Ti component, and 0 atom % or more and 55 atom % or less of O (oxygen). Preferably, all of these ranges are simultaneously satisfied.

Further, 0.0001 atom % or more and 5 atom % or less of an alkali metal such as K may be contained. It is desirable that the minor phase including K and the like does not exceed 50% by volume of the whole.

It is preferable that Fe is 20 atom % or more, because a reduction in the saturation magnetization can be avoided. It is preferable that Fe is 99.999 atom % or less, because a reduction in the oxidation resistance and deterioration in workability can be avoided. It is preferable that the Ti component is 0.001 atom % or more, because a reduction in the oxidation resistance and deterioration in workability can be avoided. Also, it is preferable that the Ti component is 50 atom % or less, because a reduction in the saturation magnetization can be avoided. When O is an important element for forming the second phase, it is preferable that O is in a range of 55 atom % or less, because not only a reduction in the saturation magnetization can be avoided, but a situation in which the disproportionation reaction in the first phase and the second phase by reduction of the titanium ferrite nanopowder does not occur, making it more difficult to develop to a low coercive force soft magnetic material, can be avoided. Although the magnetic material of the present invention does not necessarily need to contain oxygen, it is desirable that even a slight amount be contained in order to obtain a magnetic material with remarkably high oxidation resistance and electric resistivity. For example, it is possible to passivate the surface of the metal powder reduced by the gradual oxidation step (described later), or to cause an oxide layer mainly composed of $TiO_2$ to be present at a part of the crystal grain boundary of the solid magnetic material by that passivation action. In this case, the respective composition ranges of the whole magnetic material of the present invention are desirably 20 atom % or more and 99.998 atom % or less of the Fe component, 0.001 atom % or more and 50 atom % or less of the Ti component, and 0.001 atom % or more and 55 atom % or less of O.

A more preferable composition of the magnetic material of the present invention is 50 atom % or more and 99.98 atom % or less of the Fe component, 0.01 atom % or more and 49.99 atom % or less of the Ti component, and 0.01 atom % or more and 49.99 atom % or less of O. In this range, the magnetic material of the present invention has a good balance between saturation magnetization and oxidation resistance.

Furthermore, the magnetic material of the present invention having a composition in which the Fe component is in the range of 66.95 atom % or more and 99.9 atom % or less, the Ti component is in the range of 0.05 atom % or more and 33 atom % or less, and O is in the range of 0.05 atom % or more and 33 atom % or less is preferable from the perspective of having excellent electromagnetic properties and excellent oxidation resistance.

Within the above composition ranges, when the magnetic material of the present invention is to have an excellent performance, in particular, a magnetization of 1 T or more, a preferable composition range is 79.95 atom % or more and 99.9 atom % or less for the Fe component, 0.05 atom % or more and 20 atom % or less for the Ti component, and 0.05 atom % or more and 20 atom % or less of O.

Since it also depends on the Ti content, and hence cannot be unconditionally stated, in the present invention the semi-hard magnetic material tends to contain more oxygen than the soft magnetic material.

<Magnetic Properties, Electrical Properties, and Oxidation Resistance>

One aspect of the present invention is a magnetic material having magnetic properties, electrical properties, and oxidation resistance suitable for soft magnetic applications with a coercive force of 800 A/m or less. These points are now described below.

The term "magnetic properties" as used herein refers to at least one of the magnetic material's magnetization J (T), saturation magnetization $J_s$ (T), magnetic flux density (B), residual magnetic flux density $B_r$ (T), exchange stiffness constant A (J/m), magnetocrystalline anisotropy magnetic field $H_a$ (A/m), magnetocrystalline anisotropy energy $E_a$ (J/m$^3$), magnetocrystalline anisotropy constant $K_1$ (J/m$^3$), coercive force $H_{cB}$ (A/m), intrinsic coercive force $H_{cJ}$ (A/m), permeability $\mu\mu_0$, relative permeability $\mu$, complex permeability $\mu_r\mu_0$, complex relative permeability $\mu_r$, its real term $\mu'$, imaginary term $\mu''$, and absolute value $|\mu_r|$. In the present specification, A/m from the SI unit system and Oe from the cgs Gauss unit system are both used as the units of the "magnetic field". The formula for conversing between those values is 1 (Oe)=1/(4$\pi$)×10$^3$ (A/m). More specifically, 1 Oe is equivalent to about 80 A/m. As the units for the "saturation magnetization" and "residual magnetic flux density" in the present specification, T from the SI unit system and emu/g from the cgs Gauss unit system are both used. The formula for converting between those values is 1 (emu/g)=4$\pi$×d/10$^4$ (T), where d (Mg/m$^3$=g/cm$^3$) represents density. Therefore, since d=7.87 for Fe, Fe having a saturation magnetization of 218 emu/g has a saturation magnetization value $M_s$ in the SI unit system of 2.16 T. In the present specification, unless stated otherwise, the term "coercive force" refers to the intrinsic coercive force $H_{cJ}$.

The term "electrical properties" used herein refers to the electric resistivity (=volume resistivity) $\rho$ ($\Omega$m) of the material. The term "oxidation resistance" used herein refers to a change over time in the magnetic properties in various oxidizing atmospheres, for example, a room-temperature air atmosphere.

The above-mentioned magnetic properties and electrical properties are also collectively referred to as "electromagnetic properties".

In the magnetic material of the present invention, it is preferable that the magnetization, the saturation magnetization, the magnetic flux density, the residual magnetic flux density, and the electric resistivity are higher. For the saturation magnetization, a value as high as 0.3 T or 30 emu/g or more is desirable. For soft magnetic materials in particular, a value as high as 100 emu/g or more is desirable. For electric resistivity, a value as high as 1.5 $\mu\Omega$m or more is desirable. Other magnetic properties of the present invention, such as the magnetocrystalline anisotropy constant, the coercive force, the permeability, the relative permeability, and the like are appropriately controlled depending on the application and based on the material is to be formed as a semi-hard magnetic material or as a soft magnetic material. In particular, depending on the application, the permeability and relative permeability do not always have to be high. As long as the coercive force is sufficiently low and the iron loss is suppressed to a low level, for example, the relative permeability may even be adjusted to a magnitude in the range of of 10$^0$ to around 10$^4$. In particular, by suppressing the magnetic saturation under a direct-current superimposed magnetic field, it is possible to suppress the deterioration in efficiency and facilitate linear control, or based on the relational expression (1), each time the permeability is reduced by one digit, the critical thickness at which eddy current loss occurs can be increased by a factor of about 3.2. One of the characteristics of the present invention lies in comprising a magnetization reversal mechanism that is based mainly on direct rotation of magnetization, and not on magnetization reversal due to domain wall movement. As a result, the coercive force is low, eddy current loss due to domain wall movement is small, and iron loss can be suppressed to a low level. Moreover, it is possible to generate some local magnetic anisotropy at the crystal boundary for suppressing magnetization rotation by the external magnetic field, and to reduce permeability.

Incidentally, in the present invention, the reason why such permeability adjustment is possible is that because the electric resistivity of the magnetic material is large even when sintered as is, iron loss due to the eddy current is small, and therefore even if the hysteresis loss increases a little due to designing the material to suppress permeability by sacrificing a little bit of coercive force, the total iron loss can be kept at a low level.

The soft magnetic material of the present invention exhibits an electric resistivity of 1.5 $\mu\Omega$m or more, and in semi-hard magnetic materials, it exhibits even higher electric resistivity.

In the soft magnetic material of the present invention exhibiting an electric resistivity of 10 $\mu\Omega$m or more, since the saturation magnetization tends to decrease as the electric resistivity increases, it is necessary to determine the composition and degree of reduction of the raw materials according to the desired electromagnetic properties. In particular, an electric resistivity of less than 1000$\mu\Omega$m is preferable for obtaining the characteristic that the magnetization of the magnetic material of the present invention is high. Therefore, the preferred range of electric resistivity is 1.5$\mu\Omega$m or more and 1000$\mu\Omega$m or less.

<Crystal Boundaries>

Figure 2:
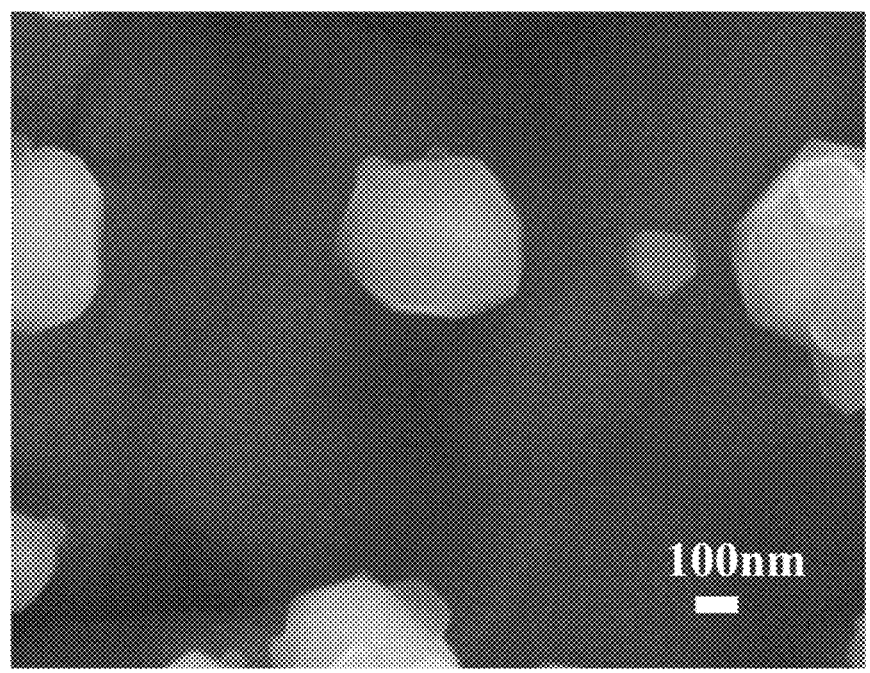
FIG. 2 is an SEM image of a $Fe_{70.5}Ti_{29.2}$ soft magnetic material (Example 22).

As described above, whether the magnetic material of the present invention becomes soft magnetic or semi-hard magnetic depends on the magnitude of the coercive force, but in particular it is closely related to the fine structure magnetic material. Although an $\alpha$-(Fe,Ti) phase and a Ti-enriched phase may at a glance look as if they are a continuous phase, the magnetic material contains many heterogenous phase interfaces and crystal grain boundaries. Further, the magnetic material contains twin crystals including simple twins such as contact twins and penetrating twins, recurring twins such as polysynthetic twins, cyclic twins, and multiple twins, intergrowths (see, for example, FIG. 1. The upper part is the first phase and the lower part is the Ti-enriched phase. The crystal boundaries in the first phase are observed as a group of curved lines with a large curvature), skeleton crystals (e.g., see FIG. 2. In the Ti-enriched phase with the black color in the center of the picture, a rectangular spiral structure having a hollow interior is observed. It can be seen that the first phase having a white color that seems to be phase separated from this structure is bound to this structure. In addition, structures formed during a complex disproportionation reaction can be seen, for example, another fine Ti-enriched phase different from the first phase is phase separated.). A big difference in Ti content can be seen depending on location. In the present invention, when crystals are classified not only by the heterogenous phase interface and the polycrystalline grain boundary but also by the various crystal habits, tracht, intergrowth structures, dislocations, and the like described above, those boundary surfaces are collectively referred to as "crystal boundaries".

In the case where the magnetic material of the present invention is a soft magnetic material, when the second phase is an $\alpha$-(Fe,Ti) phase, starting from a titanium ferrite nanopowder, as the first phase and the second phase undergo grain growth, and as the reduction reaction progresses, the oxygen in the crystal lattice is lost in conjunction with the disproportionation reaction of the composition, eventually causing a large reduction in volume of up to 52% by volume. As a result of this, the first phase and the second phase, which are α-(Fe,Ti) phases, have diverse microstructures, such as crystals that are observed in precious stones such as quartz and minerals and rocks such as pyrite and aragonite, that are in a reduced form on a nanoscale and contain various phases and nanocrystals with various Ti contents in their interior.

The structures seen at the grain boundaries and in intergrowths may also exhibit a difference in Ti content depending on the observed location, and hence are a heterogenous phase interface in some cases.

<Random Magnetic Anisotropy Model and Coercive Force Reduction Mechanism Unique to Present Invention>

For the soft magnetic material of the present invention described by the random anisotropy model, it is important that the following three conditions are satisfied.
(1) Crystal grain size of the α-(Fe,Ti) phase is small.
(2) There is ferromagnetic coupling by exchange interaction.
(3) There is random orientation.

Item (3) is not always necessary, particularly when the Ti content in the bcc phase is 10 atom % or less. In this case, the reduction in coercive force occurs based on a different principle from the random anisotropy model. Specifically, magnetic anisotropy fluctuations occur based on concentration fluctuations in the nanoscale Ti content due to interactions between any one or more of the first phase and the second phase, the first phases themselves, or the second phases themselves. This promotes magnetization reversal, and the coercive force is reduced. The magnetization reversal mechanism based on this mechanism is unique to the present invention, and was discovered for the first time by the present inventors as far as the inventors are aware.

When there is grain growth during reduction, or the particles are not fused with each other like when the ferromagnetic phase is continuous, or when phase separation occurs such that the particles are separated, in order to bring the coercive force within the soft magnetic region, it is desirable to solidify by subsequently sintering, namely, to bring into "a state wherein the first phase and the second phase are continuously bonded to each other directly or via a metal phase or an inorganic phase to form a massive state as the whole magnetic material".

In order to achieve the above item (2), namely, ferromagnetic coupling by exchange interaction, since the exchange interaction is an interaction or force that acts within a short range in the order of several nm, when first phases are coupled to each other, the phases are directly bonded, and when a first phase and a second phase or second phases are coupled to each other, it is necessary for the second phase to be ferromagnetic or antiferromagnetic in order to transmit the exchange interaction. Even if a part of the first phase and/or the second phase is in a superparamagnetic region, since the material itself is ferromagnetic or antiferromagnetic in the bulk state, as long as the surrounding ferromagnetic or antiferromagnetic phase is sufficiently exchange coupled, those phases may be able to transmit an exchange interaction.

In the case of the semi-hard magnetic material of the present invention, although not limited to the above, in order to obtain a semi-hard magnetic material having a high residual magnetic flux density, the above-mentioned solidification is necessary.

<Average Crystal Grain Size of First Phase, Second Phase, and Whole Magnetic Material>

The average crystal grain size of the first phase or the second phase of the soft magnetic material of the present invention or the average crystal grain size of the whole magnetic material is preferably 10 µm or less. When the average crystal grain size of the first phase and the second phase is 10 µm or less, the average crystal grain size of the whole magnetic material is 10 µm or less.

In particular, regarding the soft magnetic material of the present invention, in order to realize a low coercive force by the above random magnetic anisotropy model or the mechanism unique to the present invention, it is preferable that either the first phase or the second phase is in the nano region. When both the first phase and the second phase are ferromagnetic phases, it is preferable that the average crystal grain size of both phases is 10 µm or less, and preferably less than 1 µm in order to realize a low coercive force based on the random magnetic anisotropy model. This average crystal grain size is more preferably 500 nm or less, and particularly preferably 200 nm or less, because a remarkable reduction effect of the coercive force by the mechanism unique to the present invention can be realized, although this does depend on the Ti content as well. In the above case, since the $K_1$ of the first phase is larger than the second phase in many cases, particularly when the first phase is 10 µm or less, preferably 500 nm or less, and more preferably 200 nm or less, the coercive force becomes very small, and a soft magnetic material suitable for various transformers, motors, and the like is obtained.

On the other hand, if this average crystal grain size is less than 1 nm, superparamagnetism occurs at room temperature, and magnetization and permeability may become extremely small. Therefore, it is preferable that this average crystal grain size is 1 nm or more. As mentioned above, if crystal grains smaller than 1 nm or amorphous phases are present, these need to be sufficiently coupled to crystal grains of 1 nm or more in size by exchange interaction.

When the second phase is not a ferromagnetic phase, the second phase is not involved in reducing the coercive force by the random anisotropy model or the mechanism unique to the present invention, but its presence increases the electric resistivity, and hence it is preferable for that component to be present.

In the case of the semi-hard magnetic material of the present invention, contrary to the above, in order to express a coercive force, it is effective to maintain the average crystal grain size of the first phase at the nano level, and either employ a suitable surface oxide layer as the second phase or cause a second phase having an average crystal grain size of several nm to be present at the grain boundary of the first phase to thereby maintain a high magnetization and impart oxidation resistance while maintaining the coercive force of the semi-hard magnetic region.

<Measurement of Crystal Grain Size>

Measurement of the crystal grain size of the present invention is carried out using an image obtained by SEM, TEM, or metallographic microscopy. The crystal grain size is obtained by, within an observed range, observing not only the heterogenous phase interfaces and crystal grain boundaries but all the crystal boundaries, and taking the diameter of the crystal region of the surrounded portion to be the crystal grain size. When the crystal boundary is difficult to see, the crystal boundary may be etched by a wet method using a Nital solution or the like, a dry etching method, or the like. The average crystal grain size is, in principle, obtained by selecting a representative portion and measuring a region containing at least 100 crystal grains. Although the number of grains may be less than this, in that case the measurement needs to be carried out on a portion that is statistically sufficiently representative of the whole. The average crystal grain size is obtained by photographing the observation area, defining an appropriate rectangular quadrilateral area on the photographic plane (the enlarged projected surface on the target photographic plane), and applying the Jeffry method to the interior of that defined area. When observing by an SEM or a metallurgical microscope, the crystal boundary width may be too small in relation to the resolution and may not be observed, but in that case the measured value of the crystal grain size gives the upper limit of the actual crystal grain size. Specifically, it is enough if the crystal grain size measurement value has an upper limit of 10 μm. However, there is a possibility that part or all of the magnetic material may be below 1 nm, which is the lower limit of the crystal grain size, due to phenomena such as having no clear diffraction peaks in XRD and superparamagnetism being confirmed on the magnetic curve. In such a case, the actual crystal grain size must be determined again by TEM observation. In addition, in the present invention, it is sometimes necessary to measure the crystal grain size not in relation to the crystal boundary. More specifically, for example, when the crystal structure is finely modulated due to the concentration fluctuations of the Ti content, the crystal grain size of the magnetic material of the present invention having such a fine structure is the modulation width of that Ti content. Although this crystal grain size is often determined by TEM-EDX analysis or the like, in many cases the size almost corresponds to the crystallite size described in the next section.

<Measurement of Crystallite Size>

In the present invention, phase separation occurs due to the disproportionation reaction, and a composition width occurs in the Ti content of the bcc phase of the first phase and/or the second phase. Since the X-ray diffraction line peak positions vary depending on the Ti content, even if the line width of the (200) diffraction line of the bcc phase is calculated, for example, this is fairly meaningless in terms of determining the crystallite size. Here, the term "crystallite" refers to a small single crystal at the microscopic level forming the crystal substance, which is smaller than the individual crystals (so-called crystal grains) forming the polycrystal.

On the other hand, when the Ti content of the bcc phase is up to 1 atom %, the deviation of the (200) diffraction line is about 0.07 degrees (Co-Kα line). Therefore, in the range of 1 nm or more and less than 100 nm, it is meaningful to measure the crystallite size to one significant digit.

In the present invention, the crystallite size of the bcc phase was calculated by using the (200) diffraction line width excluding the influence of the $K\alpha_2$ diffraction line and the Scherrer equation, and taking the dimensionless shape factor to 0.9.

The bcc phase may be a phase in which at least the first phase has the bcc phase (i.e., a case in which only the first phase has the bcc phase and a case in which both the first phase and the second phase have the bcc phase), but a preferable crystallite size range of the bcc phase is 1 nm or more and less than 100 nm.

When the crystallite size is less than 1 nm, superparamagnetism occurs at room temperature, and magnetization and permeability may become extremely small. Therefore, it is preferable that this crystallite size is 1 nm or more.

The crystallite size of the bcc phase is preferably less than 100 nm, because the coercive force enters the soft magnetic region and becomes extremely small, and a soft magnetic material suitable for various transformers, motors, and the like is obtained. Further, at 50 nm or less, not only a high magnetization exceeding 2 T, which is a low region of the Ti content, can be obtained, but also a low coercive force can be achieved at the same time, and hence this is a very preferable range.

<Size of Soft Magnetic Material>

The size of the powder of the soft magnetic material of the present invention is preferably 10 nm or more and 5 mm or less. If this size is less than 10 nm, the coercive force does not become sufficiently small, and if the size exceeds 5 mm, a large strain is applied during sintering, and the coercive force conversely increases unless there is an annealing treatment after solidification. More preferably the size is 100 nm or more and 1 mm or less, and particularly preferably is 0.5 m or more and 500 μm or less. If the average powder particle diameter is within this region, a soft magnetic material with a low coercive force is obtained. In addition, the particle size distribution is preferably sufficiently wide within each average powder particle diameter range defined above, because high filling is easily achieved with a relatively small pressure and the magnetization based on the volume of the solidified molded body is increased. When the powder particle diameter is too large, movement of the domain walls may be excited, and due to the heterogenous phases formed by the disproportionation reaction in the production process of the soft magnetic material of the present invention, that domain wall movement is hindered, which can conversely result in the coercive force becoming larger. Therefore, when molding the soft magnetic material of the present invention, it can be better for the surface of the magnetic material powder of the present invention having an appropriate powder particle diameter to be in an oxidized state. Since an alloy containing Ti forms a passive film of titanium oxide (mainly $TiO_2$) on the surface by oxidation, not only is oxidation resistance extremely good, but there are also effects such as a reduction of the coercive force and improvement in the electric resistivity. Appropriate gradual oxidation of the powder surface, carrying out each step in air, and performing the solidification treatment in an inert gas atmosphere or the like rather than in a reducing atmosphere, are also effective.

<Size of Semi-Hard Magnetic Material>

The average powder particle diameter of the magnetic powder of the semi-hard magnetic material of the present invention is preferably in a range of 10 nm or more and 10 μm or less. If this average powder particle diameter is less than 10 nm, molding is hard to carry out, and when the magnetic material is used dispersed in a synthetic resin or ceramic, dispersibility may be very poor. In addition, if the average powder particle diameter exceeds 10 μm, since the coercive force reaches the soft magnetic region, the magnetic material falls into the category of a soft magnetic material of the present invention. A more preferable average powder particle diameter is 10 nm or more and 1 μm or less. Within this range, the magnetic material is a semi-hard magnetic material with a good balance between saturation magnetization and coercive force.

<Measurement of Average Powder Particle Diameter>

The powder particle diameter of the magnetic material of the present invention is mainly evaluated based on its median diameter calculated from a distribution curve obtained by measuring the volume-equivalent diameter distribution using a laser diffraction type particle size distribution meter. Alternatively, the powder particle diameter may also be calculated by choosing a photograph of the powder obtained by SEM or TEM, or a representative portion based on a metallographic micrograph, and measuring the diameter of at least 100 particles. Although the number of particles may be less than this, in that case the measurement needs to be carried out on a portion that is statistically sufficiently representative of the whole. In particular, when measuring the particle size of a powder smaller than 500 nm or a powder exceeding 1 mm, priority is given to a method using SEM or TEM. In addition, when a total number of measurements n is performed using N types (N≤2) of measurement method or measurement apparatus in combination (N≤n), the numerical values $R_n$ thereof needs to be within a range of $R/2 \leq R_n \leq 2R$. In that case, the average powder particle diameter is determined based on R, which is the geometric average of the lower limit and the upper limit.

As described above, in principle, the powder particle diameter of the magnetic material of the present invention is measured by (1) when the measurement value is 500 nm or more and 1 mm or less, preferentially using the laser diffraction type particle size distribution meter, (2) when the measurement value is less than 500 nm or more than 1 mm, preferentially using microscopy, and (3) when the measurement value is 500 nm or more and 1 mm or less and methods (1) and (2) are to be combined, calculating the average powder particle diameter by using the above-mentioned R. In the present application, the powder particle diameter is expressed to one to two significant digits in the case of methods (1) or (2), and in the case of (3) is expressed to one significant digit. The reason why the methods for measuring the powder particle diameter are used together is that when the powder particle diameter is just above 500 nm or just below 1 mm, there is a possibility that with method (1) an inaccurate value is obtained even when expressed to one significant digit, while on the other hand, for method (2), it takes time and effort to confirm that the measurement value is not local information. Therefore, it is very rational to first obtain the value of the average powder particle diameter by method (1), then obtain the value easily by method (2), comparatively look at the two values and determine the average powder particle diameter by using the above-mentioned R. In the present application, the average particle diameter of the powder of the magnetic material of the present invention is determined by the above method. However, if methods (1) and (3), or methods (2) and (3) do not match to one significant digit, R must be determined by precisely measuring using method (1) or (2) again based on the average powder particle diameter range. However, when there are obvious inappropriate reasons, such as when there is clearly strong agglomeration and it would be inappropriate to determine the powder particle diameter by method (1), or when the powder is too uneven and the powder particle diameter estimated from the sample image is clearly different and it would be inappropriate to determine the powder particle diameter by method (2), or when due to the specification of the measurement apparatus, classifying based on a size of 500 nm or 1 mm as the standard for determining the powder particle diameter measurement would be inappropriate, it is acceptable to disregard the above principle and re-select one of the methods (1), (2) or (3) for that particular case. If it is only necessary to distinguish the magnetic material of the present invention from other magnetic materials, it is sufficient for the average powder particle diameter to be determined to one significant digit.

For example, in the case of reducing a titanium ferrite nanopowder having a Ti content of 10 atom % or less at 1000° C. or more, the macroscopic powder shape is a three-dimensional network structure in which many hollow portions, which are through-holes, are contained inside, and hence the powder may become sponge-like. These hollow portions are thought to be formed by large volume reductions caused by oxygen leaving the crystal lattice as grain growth progresses in the reduction reaction. The powder particle diameter in this case is measured including the volume of the interior hollow portions.

<Solid Magnetic Material>

The magnetic material of the present invention can be used as a magnetic material in which the first phase and the second phase are continuously bonded to each other directly or via a metal phase or an inorganic phase to form a massive structure as a whole (in the present application, also referred to as "solid magnetic material"). Further, as described above, when many nanocrystals are already bonded in the powder, the powder may be molded by mixing with an organic compound such as a resin, an inorganic compound such as glass or ceramic, a composite material thereof or the like.

<Packing Factor>

The packing factor is not particularly limited as long as the objects of the present invention can be achieved. However, when the magnetic material of the present invention contains a small amount of the Ti component, from the perspective of a balance among oxidation resistance, electric resistivity, and magnetization level, it is preferable to set the packing factor to 60% by volume or more and 100% by volume or less.

As used herein, the term "packing factor" refers to the ratio, expressed as a percentage, of the volume of the magnetic material of the present invention relative to the volume of the whole magnetic material of the present invention including voids (i.e., volume occupied only by the magnetic material of the present invention, excluding the portion that is not the magnetic material of the present invention, such as voids and resin).

A more preferable range of the packing factor is 80% or more, and particularly preferable is 90% or more. Although the magnetic material of the present invention has high oxidation resistance to begin with, as the packing factor is increased, the oxidation resistance further increases, and there is a wider range of applications that the magnetic material of the present invention can be applied to. In addition, the saturation magnetization is also improved, and a high performance magnetic material can be obtained. Further, for the soft magnetic material of the present invention, there are also the effects of an increase in bonding between the powder particles and a reduction in the coercive force.

<Characteristics of Magnetic Powder and Solid Magnetic Material of Present Invention>

One of the major characteristics of the magnetic material powder of the present invention is that it is a sinterable powder material like ferrite. Various solid magnetic materials having a thickness of 0.5 mm or more can easily be produced. Even various solid magnetic materials having a thickness of 1 mm or more, and even 5 mm or more, can be produced comparatively easily by sintering or the like as long as the thickness is 10 cm or less.

Further, one of the characteristics of the magnetic material of the present invention is that the electric resistivity is large. While other metallic rolled materials and thin ribbon materials are made by a manufacturing method in which crystal grain boundaries, heterogenous phases, or defects are not included, the magnetic material powder of the present invention includes many crystal boundaries and various phases, and it itself has an effect of increasing the electric resistivity.

In addition, when solidifying the powder, because in particular a surface oxidized layer of the powder before solidification (i.e., layer having a high oxygen content that is present on the surface of the first phase or the second phase, such as a $TiO_2$, wustite, magnetite, Ti-ferrite, ilmenite, titanohematite, or amorphous layer, and among those, an oxide layer containing a large amount of Ti) and/or a metal layer (i.e., a metal layer containing a large amount of Ti) is intercalated, the electric resistivity of the bulk body also increases.

In particular, examples of preferable constituent compounds of a surface oxide layer for increasing the electric resistivity include at least one of $TiO_2$, wustite, and Ti-ferrite.

The reason why the magnetic material of the present invention has the above characteristics is that the present invention mainly provides a build-up type bulk magnetic material by producing a magnetic material that has a high magnetization and that is formed by a method which is essentially different from other metallic soft magnetic materials for high frequency applications, namely, by first producing a metal powder having nanocrystals by reducing a titanium ferrite nanopowder and then forming a solid magnetic material by molding the magnetic powder.

Further, as described above, since the electric resistance is higher than existing metal-based soft magnetic materials represented by silicon steel, for example, it is possible to considerably simplify the lamination step and the like that are normally required when producing rotating devices and the like. Assuming that the electric resistivity of the magnetic material of the present invention is about 30 times that of silicon steel, the limit of the thickness at which an eddy current does not occur is, based on the relational expression (1), about 5 times the thickness. Therefore, even when lamination is required, the number of laminations is also ⅕. For example, even when applied to a stator of a motor in a high rotation range with a frequency of 667 Hz, a thickness of 1.5 mm is permitted.

The solid magnetic material of the present invention does not contain a binder such as a resin, has high density, and can be easily processed into an arbitrary shape by an ordinary processing machine by cutting and/or plastic working. In particular, one of the major characteristics of the solid magnetic material is that it can be easily processed into a prismatic shape, a cylindrical shape, a ring shape, a disk shape, a flat sheet shape or the like having high industrial utility value. It is also possible to process the solid magnetic material into those shapes and then subject to cutting and the like for processing into a roof tile shape or a prismatic shape having an arbitrary base shape. Specifically, it is possible to easily perform cutting and/or plastic working into an arbitrary shape or any form surrounded by flat surfaces or curved surfaces, including cylindrical surfaces. Here, the term "cutting" refers to cutting general metal materials. Examples include machine processing by a saw, a lathe, a milling machine, a drilling machine, a grinding stone, and the like. The term "plastic working" refers to a process such as die cutting by a press, molding, rolling, explosion forming, and the like. Further, in order to remove distortion after cold working, annealing can be performed in the range of ordinary temperature to 1290° C.

<Production Method>

Next, the method for producing the magnetic material of the present invention will be described, but the present invention is not particularly limited thereto.

The method for producing the magnetic material of the present invention comprises:
(1) a titanium ferrite nanopowder production step; and
(2) a reduction step,
and may optionally further comprise any one or more of the following steps:
(3) a gradual oxidation step;
(4) a molding step; and
(5) an annealing step.

Each step is now described in more detail.

(1) Titanium Ferrite Nanopowder Production Step (in the Present Application, Also Referred to as "Step (1)")

Examples of a preferable step of producing the nanomagnetic powder, which is a raw material of the magnetic material of the present invention, include a method of synthesizing at room temperature using a wet synthesis method.

Examples of known methods for producing a ferrite fine powder include a dry bead mill method, a dry jet mill method, a plasma jet method, an arc method, an ultrasonic spray method, an iron carbonyl vapor phase cracking, and the like. Any of these methods is a preferable production method, as long as the magnetic material of the present invention is formed. However, to obtain nanocrystals having a disproportionated composition, which is the essence of the present invention, it is preferable to mainly employ a wet method using an aqueous solution because it is the simplest.

This production step is carried out by applying the "ferrite plating method" described in Patent Document 1 to the step for producing the titanium ferrite nanopowder used for producing the magnetic material of the present invention.

The ordinary "ferrite plating method" is applied not only to powder surface plating but also to thin films and the like. The reaction mechanism and the like of the ferrite plating method have already been disclosed (e.g., see Masaki Abe, Journal of the Magnetics Society of Japan, Volume 22, No. 9 (1998), page 1225 (hereinafter, referred to as "Non Patent Document 4") and International Publication No. WO 2003/015109 (hereinafter, referred to as "Patent Document 2")). However, unlike such a "ferrite plating method", in this production step, the powder surface, which serves as the base material of the plating, is not used. In this production step, the raw materials (e.g., titanium chloride and iron chloride) used for ferrite plating are reacted in solution at 100° C. or less to directly synthesize the ferrous and crystalline titanium ferrite nanopowder itself. In the present application, this step (or method) is referred to as "titanium ferrite nanopowder production step" (or "titanium ferrite nanopowder production method").

A "titanium ferrite nanopowder production step" in which the nanopowder has a spinel structure is described below as an example.

An appropriate amount of an aqueous solution adjusted in advance to an acidic region is placed in a container (in the present application, also referred to as a reaction field), and while subjecting to ultrasonic wave excitation at room temperature under atmospheric pressure or mechanical stirring at an appropriate strength or revolution number, a pH adjusting solution is added dropwise simultaneously with a reaction solution to gradually change the pH of the solution from the acidic to the alkaline range, thereby forming titanium ferrite nanoparticles in the reaction field. Then, the solution and the titanium ferrite nanopowder are separated, and the powder is dried to obtain a titanium ferrite powder having an average powder particle diameter of 1 nm or more and less than 1000 nm (1 μm). The above method is an example of an inexpensive method because the steps are simple. In particular, all of the steps in the working examples of the present invention are carried out at room temperature, and hence the burden of equipment costs and running costs in production steps is reduced due to the use of production step that do not use a heat source. Although the method for producing the titanium ferrite nanopowder used in the present invention is of course not limited to the above-mentioned production method, the initial liquid used in the above production method of the reaction field before the reaction starts (in the present application, this is also referred to as the "reaction field solution"), the reaction solution, and the pH adjusting solution are now described in more detail below.

As the reaction field solution, an acidic solution is preferable. In addition to inorganic acids such as hydrochloric acid, nitric acid, sulfuric acid, and phosphoric acid, a solution obtained by dissolving a metal salt, a double salt thereof, a complex salt solution, and the like in a hydrophilic solvent such as water (e.g., an iron chloride solution, a titanium chloride solution, etc.), a solution of a hydrophilic solvent such as an aqueous solution of an organic acid (e.g., acetic acid, oxalic acid, etc.), and combinations thereof, may be used. As the reaction field solution, preparing the reaction solution in advance in the reaction field is effective for efficiently promoting the synthesis reaction of the titanium ferrite nanopowder. If the pH is less than −1, the material providing the reaction field is restricted, and avoidable impurities may become mixed in the solution. Therefore, it is desirable to control the pH to between −1 or more and less than 7. To increase the reaction efficiency in the reaction field and minimize elution and precipitation of unnecessary impurities, a particularly preferable pH range is 0 or more and less than 7. As a pH range that provides a good balance between reaction efficiency and yield, the pH is more preferably 1 or more and less than 6.5. Although hydrophilic solvents among organic solvents and the like can be used as the solvent in the reaction field, it is preferable that water is contained so that the inorganic salt can be sufficiently ionized.

The reaction solution may be a solution of an inorganic salt in water as a main component, such as a chloride such as iron chloride or titanium chloride, a nitrate such as iron nitrate, or a nitrite, a sulfate, a phosphate, or a fluoride containing an Fe component and/or a Ti component (optionally also containing an M component). In some cases, a solution mainly comprising a hydrophilic solvent, such as organic acid salt in water may also be used as required. Also, a combination thereof may be used. However, it is essential that reaction solution contain iron ions and titanium ions. Regarding the iron ions, the reaction solution may contain only divalent iron ($Fe^{2+}$) ions, a mixture with trivalent iron ($Fe^{3+}$) ions, or only trivalent iron ions. In the case of containing only $Fe^{3+}$ ions, it is necessary to contain metal ions of the M component element that are divalent or less. Representative examples of the valence of the Ti ions in the reaction solution are divalent, trivalent, and tetravalent, but tetravalent is particularly excellent in terms of the homogeneity of the reaction in the reaction solution or reaction field solution.

Commercially available products prepared in advance as an aqueous solution may be used as the aqueous solution of titanium chloride. However, when preparing from an undiluted solution to obtain an aqueous solution having an arbitrary concentration, there is a danger of an explosive reaction when dissolved in water, and hence it is recommended to mix while cooling the solution with ice or the like. Further, since hydrogen chloride smoke will be produced when exposed to air, it is desirable to handle in a glovebox with a reduced oxygen concentration. In addition, if the aqueous solution is acidified with hydrochloric acid, titanium hydroxide, oxychloride, and the like are not precipitated, and a transparent aqueous solution is obtained.

Examples of the pH adjusting solution include an alkaline solution such as sodium hydroxide, potassium hydroxide, sodium carbonate, sodium hydrogencarbonate, and ammonium hydroxide, an acidic solution such as hydrochloric acid, and combinations thereof. It is also possible to use a pH buffer such as an acetic acid-sodium acetate mixed solution, or to add a chelate compound or the like.

Although the oxidizing agent is not indispensable, it is an essential component when only $Fe^{2+}$ ions are contained as Fe ions in the reaction field solution or the reaction solution. Examples of the oxidizing agent include nitrites, nitrates, hydrogen peroxide, chlorates, perchloric acid, hypochlorous acid, bromates, organic peroxides, dissolved oxygen water, and the like, and combinations thereof. Stirring in air or in an atmosphere having a controlled oxygen concentration is effective in maintaining a situation in which dissolved oxygen acting as an oxidizing agent is continuously supplied to the titanium ferrite nanoparticle reaction field, and to control the reaction. In addition, by continuously or temporarily introducing an inert gas such as nitrogen gas or argon gas by bubbling into the reaction field, for example, to limit the oxidizing action of oxygen, the reaction can be stably controlled without inhibiting the effect of other oxidizing agents.

In a typical titanium ferrite nanopowder production method, formation of the titanium ferrite nanoparticles proceeds by the following reaction mechanism. The nuclei of the titanium ferrite nanoparticles are produced in the reaction solution directly or via an intermediate product such as green rust. The reaction solution contains $Fe^{2+}$ ions, which are adsorbed on powder nuclei already formed or on OH groups on the powder surface that have grown to a certain extent, thereby releasing $H^+$. Subsequently, when an oxidation reaction is performed by oxygen in the air, an oxidizing agent, an anode current ($e^+$), or the like, a part of the adsorbed $Fe^{2+}$ ions is oxidized to $Fe^{3+}$ ions. While the $Fe^{2+}$ ions, or the $Fe^{2+}$ and the $Ti^{4+}$ ions (or, Ti and M component ions), in the solution are again adsorbed on the already adsorbed metal ions, $H^+$ ions are released in conjunction with hydrolysis, whereby a ferrite phase having a spinel structure is formed. Since OH groups are present on the surface of the ferrite phase, metal ions are again adsorbed and the same process is repeated to thereby grow into titanium ferrite nanoparticles.

Among these reaction mechanisms, to directly change from $Fe^{2+}$ and $Ti^{4+}$ to the ferrite having a spinel structure, the reaction system may be, while adjusting the pH and the redox potential so as to cross the line dividing the $Fe^{2+}$ ions and ferrite on the equilibrium curve in the pH-potential diagram of Fe, (slowly) shifted from the stable region of $Fe^{2+}$ ions to the region where ferrite precipitates. $Ti^{4+}$ is, except for special cases, a tetravalent state from the early stage of the reaction, and has almost no influence on redox potential change. In many cases, reactions due to a change in the redox potential of Fe (i.e., progress from the mixed solution to the ferrite solid phase) are described. When ions of the M component element are contained and the oxidation number of those ions changes and participates in the reaction, the same argument can be made by using or predicting a pH-potential diagram corresponding to the composition and the temperature. Therefore, it is desirable to produce a ferrite phase while appropriately adjusting conditions such as the kind, concentration, and addition method of the pH adjusting agent and the oxidizing agent.

In most generally well-known ferrite nanopowder production methods, the reaction solution is prepared on the acidic side, the alkali solution is added in one go to set the reaction field to a basic region, and fine particles are instantaneously formed by coprecipitation. In the case of producing titanium ferrite nanopowder, it may be thought that consideration is given such that differences in the solubility product between the Fe component and the Ti component do not cause non-uniformity. Of course, the ferrite nanopowder may be prepared by such a method and very small nanoparticles can be prepared, and hence such a ferrite nanopowder can be used as the ferrite raw material for the magnetic material of the present invention.

On the other hand, in the embodiment of the present invention, a step is designed such that, while dropping the reaction solution and supplying the raw materials for the titanium ferrite nanopowder production method to the reaction field, the Ti component is steadily incorporated into the Fe-ferrite structure by dropping the pH adjusting agent at the same time to gradually change the pH from acidic to basic. According to this step, at the stage of producing the titanium ferrite nanoparticles, the $H^+$ released when ferrite is produced by the above-mentioned mechanism is neutralized by the continuous introduction of the pH adjusting solution into the reaction field, and titanium ferrite particles are produced and grow one after another. Further, at the early stage of the reaction, there is a period in which green rust is produced and the reaction field becomes green (depending on conditions such as the reaction field and the pH of the reaction solution, the yellow or yellowish-green period may occur in the preceding stage). However, it is important that the Ti component is mixed into this green rust. When the green rust has finally been converted into ferrite, the Ti is incorporated into the lattice, and in the subsequent reduction reaction, in the first phase and the second phase, the Ti is incorporated into the $\alpha$-Fe phase having the bcc structure.

In addition to the above, other factors for controlling the reaction include stirring and reaction temperature.

Dispersion is very important to prevent the fine particles produced by the titanium ferrite nanopowder synthesis reaction from agglomerating and inhibiting a homogeneous reaction. To carry out such dispersion, any known method, or a combination thereof, may be used in accordance with the purpose of controlling the reaction, such as a method in which the reaction is subjected to excitation while simultaneously dispersing by ultrasonic waves, a method in which a dispersion solution is conveyed and circulated by a pump, a method of simply stirring by a stirring spring or a rotating drum, and a method of shaking or vibrating with an actuator or the like.

Generally, since the reaction in the titanium ferrite nanopowder production method used in the present invention is carried out in the presence of water, as the reaction temperature, a temperature between the freezing point and the boiling point of water under atmospheric pressure, namely, from 0° C. to 100° C., is selected.

In the present invention, a material produced from a method (e.g., a supercritical reaction method) for synthesizing titanium ferrite nanopowder in a temperature range exceeding 100° C. by placing the entire system under high pressure may be, as long as a titanium ferrite nanopowder exhibiting the effects of the present invention can be formed, considered to be the magnetic material of the present invention.

As a method for exciting the reaction, in addition to the above-mentioned temperature and ultrasonic waves, pressure and photo excitation may also be effective.

Further, in the present invention, when applying a titanium ferrite nanopowder production method using an aqueous solution containing $Fe^{2+}$ as the reaction solution (particularly when reacting the titanium ferrite nanopowder under conditions in which the Fe is mixed as a divalent ion), if the Ti content is less than 40 atom %, it is important that divalent ions of Fe are observed in the finally formed ferrite coating layer of the magnetic material of the present invention. The amount of the divalent ions is, in terms of the ratio of $Fe^{2+}/Fe^{3+}$ preferably 0.001 or more. It is preferable to identify the divalent ions by using an electron beam microanalyzer (EPMA). Specifically, the surface of the titanium ferrite nanoparticles is analyzed by the EPMA to obtain an X-ray spectrum of $FeL_\alpha$-$FeL_\beta$, the difference between the two materials is taken, and the amount of $Fe^{2+}$ ions in the titanium ferrite nanoparticles can be identified by comparing with the spectrum of a standard sample of an iron oxide containing $Fe^{2+}$ (e.g., magnetite) and an iron oxide containing only $Fe^{3+}$ (e.g., hematite or maghemite).

At this time, the EPMA measurement conditions are an acceleration voltage of 7 kV, a measurement diameter of 50 µm, a beam current of 30 nA, and a measurement time of 1 sec/step.

Examples of representative impurity phases of the titanium ferrite nanopowder include oxides such as titanohematite, iron oxide hydroxides such as goethite, acagenite, lepidocrocite, feroxyhyte, ferrihydrite, and green rust, hydroxides such as potassium hydroxide and sodium hydroxide, and the like. Among these, particularly when containing a ferrihydrite phase and a titanohematite phase, since these form an $\alpha$-(Fe,Ti) phase and other secondary phases after reduction, it is not always necessary to remove them. These ferrihydrite and titanohematite phases are observed in SEM observation and the like as a sheet-like structures having a thickness of several nm. However, since the particles have a large area relative to their thickness, these phases may promote large improper grain growth in the reduction reaction process, and since they also contain many impurities other than the Fe component, the Ti component, and oxygen, it is desirable that the volume fraction of these phases is less than that of the titanium ferrite nanopowder. In particular, when the atomic ratio of the Ti component relative to the Fe component is more than 0.33 and 0.5 or less, the Ti ratio of the phases other than the titanium ferrite nanopowder centered on ferrihydrite and titanohematite becomes larger than that of the titanium ferrite nanopowder, and as a result, the disproportionation that occurs during reduction becomes difficult to control. Therefore, careful attention needs to be given to the degree of agglomeration of the ferrihydrite phase and the like (in particular, to prevent uneven distribution up to several microns). It is also noted that, irrespective of the above, the ferrihydrite phase and Ti-ferrite phase, which easily incorporate Ti, can be caused to coexist so as to prevent the above-mentioned inappropriate minor phases that do not contain Ti from precipitating by intentionally limiting the content of these phases based on the whole magnetic material to a range from 0.01% by volume to 33% by volume. When doing this, it is not necessary to strictly maintain the control conditions during production of the ferrite nanopowder, and hence the industrial benefits are large.

The average powder particle diameter of the titanium ferrite nanopowder used as a raw material of the present invention is preferably 1 nm or more and less than 1 µm (1000 nm). It is more preferably 1 nm or more and 100 nm or less. If this average powder particle diameter is less than 1 nm, the reaction during reduction cannot be sufficiently controlled, resulting in poor reproducibility. If this average powder particle diameter exceeds 100 nm, the improper grain growth of the metal component reduced in the reduction step is substantial, and in the case of the soft magnetic material, the coercive force may increase, and hence the average powder particle diameter is preferably 100 nm or less. Further, if the average powder particle diameter is 1 μm or more, the α-Fe phase separates, Ti is not incorporated into this phase, and a magnetic material having poor in terms of the excellent electromagnetic properties and oxidation resistance provided by the present invention may be only obtained, and hence the average powder particle diameter is preferably less than 1 μm.

When the titanium ferrite nanopowder used in the present invention is produced mainly in an aqueous solution, moisture is removed by decantation, centrifugation, filtration (in particular, suction filtration), membrane separation, distillation, vaporization, organic solvent exchange, solution separation by magnetic field recovery of the powder, or a combination thereof, and so on. The titanium ferrite nanopowder is then vacuum dried at ordinary temperature or a high temperature of 300° C. or less, or dried in air. The titanium ferrite nanopowder may also be hot-air dried in air or dried by heat treating in an inert gas such as argon gas, helium gas, or nitrogen gas (in the present invention, the nitrogen gas may not be an inert gas depending on the temperature range during heat treatment), or a reducing gas such as hydrogen gas, or a mixed thereof. Examples of a drying method that removes unnecessary components in the solution but does not use a heat source at all include a method in which, after the centrifugation, the supernatant is discarded, the titanium ferrite nanopowder is further dispersed in purified water, centrifugation is repeated, and finally the solvent is exchanged with a hydrophilic organic solvent having a low boiling point and a high vapor pressure, such as ethanol, and then vacuum-dried under ordinary temperature.

(2) Reduction Step (in the Present Application, Also Referred to as "Step (2)")

This step is a step in which the titanium ferrite nanopowder produced by the above method is reduced to produce the magnetic material of the present invention.

Most preferably, the reduction step is carried out in a gas phase. Examples of the reducing atmosphere include hydrogen gas, an organic compound gas, such as carbon monoxide gas, ammonia gas, and formic acid gas, a mixed gas of such an organic compound gas and an inert gas, such as argon gas and helium gas, a low-temperature hydrogen plasma, supercooled atomic hydrogen, and the like. Examples of methods for carrying out the reduction step include a method in which these gases can be circulated in a horizontal or vertical tube furnace, a rotary reaction furnace, a closed reaction furnace, or the like, refluxed, hermetically closed, and heated with a heater, and methods in which heating is carried out by infrared rays, microwaves, laser light, and the like. The reaction may also be carried out in a continuous manner using a fluidized bed. Further examples of the reduction method include reducing with solid C (carbon) or Ca, mixing with calcium chloride or the like and reducing in an inert gas or a reducing gas, and as an industrial method, turning a Ti oxide into a chloride and reducing with Mg. However, as long as the magnetic material of the present invention is obtained, any method falls within the scope of the production method of the present invention.

However, a preferred method for the production method of the present invention is a method in which the reduction is carried out in hydrogen gas or a mixed gas of hydrogen gas and an inert gas as the reducing gas. To produce the magnetic material of the present invention phase-separated at the nano-scale, the reducing power is too strong by reducing with C or Ca, and it becomes very difficult to control the reaction for forming the soft magnetic material of the present invention. In addition, there are problems such as generation of toxic CO after reduction and mixing of calcium oxide, which must be removed by washing with water. However, by reducing in hydrogen gas, the reduction treatment can be carried out under consistently clean conditions.

However, conventionally, when Ti-ferrite is reduced with hydrogen gas, it is thought that it decomposes into α-Fe and $TiO_2$ (e.g., T. Tsuchiya, N. Yasuda, S. Sasaki, N. Okinaka and T. Akiyama, Int. J. of Hydrogen Energy, 38 (2013) pp. 6681-6686 (hereinafter, referred to as Non Patent Document 5)). The applicant is unaware of any prior art literature disclosing that when Ti-ferrite is reduced with hydrogen gas, an α-(Fe,Ti) phase is produced.

Further, even when considered thermodynamically, it is assumed from an Ellingham diagram that Fe oxides are reduced in an $H_2$ gas flow, but Ti oxides are understood not to be easily reduced by $H_2$ gas. For example, at 1000° C., in the case of Fe, the ratio of $H_2/H_2O$ when reduced from magnetite to metallic iron is approximately 1, whereas for $TiO_2$ it is around $10^6$ to $10^7$. From this it can be understood that even though the $H_2$ gas is flowing, there is little chance of the Ti oxide being reduced. Therefore, for a simple mixture or solid solution of an Fe oxide and a Ti oxide, it is usually considered that α-Fe and $TiO_2$ are formed by hydrogen reduction.

Therefore, the fact that when Ti-ferrite is reduced by hydrogen gas, the $Ti^{4+}$ ion, which is the main Ti ion in Ti-ferrite, is reduced to the valence of the Ti metal was not known until now, and is believed to have been first discovered by the present inventor. The reasons for this are, currently, thought to be as follows.

The Ti-ferrite of the present invention has a diameter of 1 nm or more and less than 1000 nm (1 μm), Ti is atomically dispersed in a highly active nanopowder, and the affinity between Ti and Fe is high. As a result, the Ti-ferrite is alloyed as α-(Fe,Ti) under a hydrogen gas flow. The reactivity of the powder in the nano region is high, and contrary to thermodynamic expectations, often giving results beyond the common technical knowledge of the metallographic field. Conventionally, Ti oxides essentially cannot be reduced unless in the presence of Ca, C, or the like, but according to the method of the present invention, a part of the Ti component is reduced to its metallic state and can be present as an alloy in the first phase or the α-(Fe,Ti) phase of the first phase and the second phase. At this time, the inventors infer that the coexistence of a small amount of an alkali metal such as K influences the facilitation of the reaction.

Further, in the equilibrium state diagram of Fe—Ti, the solid solution limit of Ti in the α-(Fe,Ti) phase increases as the temperature increases, but in the production method of the present invention, it is not always the case that the higher the reduction temperature is, the higher the average Ti content in the α-(Fe,Ti) phase is. In Examples 1 to 11 of the present invention, although the Ti content in the α-(Fe,Ti) phase does increase when the reduction temperature is in the range of 450° C. or more and 550° C. or less, when the reduction temperature is above that range up to 800° C., the Ti content conversely decreases. However, the Ti content once again increases as the reduction temperature is increased further. This behavior is different depending on the Ti content of the whole titanium ferrite nanopowder, the setting of the temperature increase/decrease conditions, the type of the coexisting second phase and minor phase, and the like. In addition, unlike ordinary metal-based magnetic material production technology in which the entire alloy is melted once, the above-mentioned unique phenomenon is one of the characteristics of the production method of the present invention, referred to as "build-up type", having a step of reducing the titanium ferrite nanopowder to cause grain growth, and subsequently preferably sintering the powder.

The oxygen content in the material of the present invention is generally determined by an inert gas melting method, but when the oxygen content before reduction is known, the oxygen content in the material of the present invention can also be estimated from the weight difference before and after reduction. However, when there is simultaneously a large amount of a halogen element, such as chlorine, whose content tends to change before and after reduction, and an alkali element such as K or Na or a highly volatile component such as water or an organic component contained in the material, the content of each of these elements and components should be individually identified. This is because the oxygen content cannot be precisely estimated based only on the weight change before and after the reduction reaction.

Incidentally, among alkali metals derived from the raw materials, for example, K begins to dissipate from the magnetic material at 450° C. due to vaporization, and depending on the Ti content and the reduction time, most of it is removed at 900° C. or above. Therefore, in the case of an alkali metal derived from the raw materials for which it is better to keep around in the early stage of the reduction reaction in order to utilize its catalytic action, but depending on the application is preferably not present at the product stage, that alkali metal can be ultimately appropriately removed to an acceptable range by appropriately selecting the reduction conditions. The final content range of the alkali metal such as K that can be easily removed while having a positive effect on reduction is a lower limit value of 0.0001 atom % or more and an upper limit value of 5 atom % or less. This upper limit value can be further controlled to 1 atom % or less, and when most precisely controlled, to 0.01 atom %. Of course, based on the reduction conditions, it is also possible to reduce the alkali metal such as K further below the detection limit. Halogen elements such as Cl (chlorine) remaining in the titanium ferrite nanopowder are mainly released outside the material system as hydrogen halides such as HCl under the reducing atmosphere. The amount of remaining Cl and the like starts to substantially decrease at a reduction temperature of 450° C. or more, and although it depends on the Ti and K contents and the content change thereof during the reduction step, if a reduction temperature of approximately 700° C. or higher is selected, almost all of those halogen elements can be completely removed from inside the material.

The weight reduction before and after the reduction reaction of the present invention, which is mainly due to the O component being converted into $H_2O$ and evaporating, is usually between 0.1% by mass and 80% by mass, although the amount depends on the Ti content, the M component content, the oxygen amount, the minor phase content, the amount of impurities, the amount of volatilized components such as water, the reducing reaction conditions such as the reducing gas species, and the like.

Incidentally, as described in some of the Examples of the present invention, a local oxygen content may be determined based on a photograph from an SEM and the like or by EDX, and a phase identified by XRD or the like may be specified on a microscopic observation image. This method is suitable for roughly estimating the oxygen content and its distribution in each phase of the first phase and the second phase.

Hereinafter, a method for producing the magnetic material of the present invention by a heat treatment in a reducing gas is described in detail. The heat treatment in a typical reduction step is carried out by increasing the temperature of the material linearly or exponentially from room temperature to a constant temperature in a reducing gas flow at one or more temperature increasing rates, and then immediately decreasing the temperature linearly or exponentially to room temperature using one or more temperature decreasing rates, or maintaining the temperature for a fixed period (=reduction time) when increasing or decreasing the temperature during the temperature increasing/decreasing process or after the temperature has been increased (hereinafter, referred to as "constant temperature holding process). Unless stated otherwise, the reduction temperature of the present invention refers to the highest temperature among the temperature at the time of switching from the temperature increasing process to the temperature decreasing process and the temperature during the process of maintaining the temperature for a fixed period.

When a method in which the titanium ferrite is reduced by hydrogen gas is selected as the production method of the soft magnetic material of the present invention, it is preferable to select a temperature range in which the reduction temperature is generally 400° C. or more and 1290° C. or less, although this depends on the Ti content.

However, when performing reduction at 1078° C. or more and 1290° C. or less, depending on the Ti content, the magnetic material being reduced may melt. Generally, if the Ti content is in the range of 0.01 atom % or more and 33 atom % or less, the reduction treatment can be carried out by freely selecting within the temperature range of 400° C. or more and 1290° C. or less. When the Ti content exceeds 33 atom % and is up to 50 atom %, to avoid melting of the material, it is more preferable to carry out the reduction treatment by selecting a temperature of 400° C. or more and 1078° C. or less. Generally, it is preferable that the temperature is 400° C. or more, as this avoids the reduction rate from being very slow, thus prolonging the reduction time and causing productivity to deteriorate.

In the production method relating to the soft magnetic material of the present invention, a preferable reduction temperature range is 400° C. or more and 1290° C. or less, and a more preferable reduction temperature range is 800° C. or more and 1200° C. or less. This is because when Ti is reduced to a metal, it is possible to avoid the coarsening of the structure due to the reduction reaction just under the melting point, a reaction with a reactor such as a ceramic container, and a decrease in productivity due to a reduction of the reduction reaction rate caused by a low temperature.

When reduction is performed at the same temperature, the reduction reaction progresses as the reduction time increases. Therefore, the saturation magnetization increases as the reduction time is longer, but for coercive force, even if the reduction time is increased or the reduction temperature is increased, the coercive force does not necessarily decrease. It is desirable to appropriately select the reduction time according to the desired magnetic properties.

When a method in which the titanium ferrite is reduced by hydrogen gas is selected as the production method of the semi-hard magnetic material of the present invention, although this depends on the Ti content, it is preferable to select the reduction temperature within a range of approximately 400° C. or more and 1290° C. or less. This is because when the reduction temperature is less than 400° C., the reduction rate is very slow, the reduction time is prolonged, and productivity deteriorates. On the other hand, when the reduction temperature exceeds 1290° C., melting begins, so that the characteristics of the nanocrystals of the present invention are inhibited and the coercive force is not properly controlled. A more preferable range of the reduction temperature is approximately 450° C. or more and 850° C. or less, and a particularly preferable range is approximately 500° C. or more and 700° C. or less.

Thus, when the soft magnetic or semi-hard magnetic material of the present invention is to be produced by reducing titanium ferrite with hydrogen gas, it is preferable that the reduction temperature range is 400° C. or more and 1290° C. or less.

Since the magnetic material of the present invention contains Ti, the reduction rate is extremely slow compared with an intermediate of Fe-ferrite, for example, magnetite and maghemite (see Patent Document 1 and Non Patent Document 3). For example, in the case of Fe-ferrite that has an average powder particle diameter of 100 nm or less and that does not contain Ti, reduction to almost 100% by volume of α-Fe is carried out just by reducing in hydrogen at 450° C. for 1 hour. Even under conditions of 425° C. for 4 hours, the Fe-ferrite is reduced to a level at which it can hardly be observed even by X-ray diffraction. On the other hand, for example, even if only 6 atom % of Ti is contained, unless the reduction conditions are set at 600° C. for 1 hour, the Ti-ferrite phase does not disappear, and the material is not formed only from an α-(Fe,Ti) phase when observed by an XRD.

In the magnetic material of the present invention, due to such a slow reduction rate of the Ti-ferrite, reduction at a high temperature is permitted. The nano-microstructure still containing Ti in the α-Fe phase does not become extremely coarse, it can be formed into an aggregate of microcrystalline structures comprising the first phase and the second phase by a disproportionation reaction.

It is desirable that the magnetic material of the present invention is separated into the first phase and the second phase at the nanoscale in the reduction step during production of the magnetic material. Particularly in the case of the soft magnetic material of the present invention, it is necessary for the phases having the various Ti contents and crystal structures to be separated by the disproportionation reaction, and for the orientation of those phases to be random or for the phases to include concentration fluctuations in Mn content at the nanoscale. Further, it is also necessary for each of the crystal phases to be ferromagnetically coupled.

The grains of the titanium ferrite nanoparticles grow as reduction progresses. However, during that process, the crystal structure and the Ti content of the first phase and the second phase of the produced crystal phases change in various ways depending on the reduction temperature due to the Ti content of the original titanium ferrite nanoparticles. In the temperature range of 400° C. or more and 1290° C. or less, generally the Ti content of the first phase tends to increase as the temperature at which reduction to the metal phase occurs increases, and conversely, if only melting does not occur, in the temperature range of 1290° C. or more and 1538° C. or less, the Ti content of the first phase tends to be smaller than the Ti content of the first phase in the temperature range of 400° C. or more and 1290° C. or less.

Therefore, the composition of the crystal phases varies depending on the rate of temperature increase during the increasing temperature process and the temperature distribution in the reaction furnace.

In the initial stage of the reduction reaction, for example, when Ti-ferrite nanopowder having a Ti content of 33 atom % and an average powder particle diameter of 100 nm or less is reduced in a hydrogen flow at 650° C. or less for 1 hour, first, in an α-(Fe,Ti) phase and a Ti-enriched phase of several nm begin to appear in the Ti-ferrite. Since the Ti-enriched phase is densely present between the α-(Fe,Ti) phase particles like fish eggs, this phase is called a spawn phase. An XRD peak corresponding to this phase is not detected, and it is assumed that it is a phase in which an amorphized phase or lattice has considerably collapsed. However, it can be confirmed by EDX that Ti is significantly more enriched compared with the α-(Fe,Ti) phase (e.g., when the Ti content of the raw material titanium ferrite nanopowder is 33 atom %, this phase is enriched by about 8 atom % of Ti). This is thought to be because, due to the Ti content of the titanium ferrite nanopowder, during the reduction of that phase to the α-(Fe,Ti) phase not all of the Ti could dissolve in solid solution in the α-(Fe,Ti) phase, and precipitated as a Ti-enriched phase. When reduction finishes in this state, the second phase of the magnetic material of the present invention is Ti-ferrite and this spawn phase. In regions where the spawn phase is present, the coercive force is high in a powder state, and the material can be suitably used as the semi-hard magnetic material of the present invention. This is not the case when the material is turned into a solid magnetic material by sintering or the like.

The reduced magnetic material powder loses its spawn phase as the reduction temperature increases and the reduction reaction progresses, the grains of the metal phase grow and an α-(Fe,Ti) phase having various compositions containing Ti can be seen. For example, when reduction is carried out in a hydrogen flow at a reduction temperature of 1000° C. for 1 hour, grains of the α-(Fe,Ti) phase grow to several m or more, but as the temperature decreases, the Ti-enriched phases that cannot all be dissolved in solid solution in the α-(Fe,Ti) phase separate one after another by a disproportionation reaction, and precipitate as the second phase. In these processes, the fact that numerous crystal boundaries have occurred in the α-(Fe,Ti) phase whose grains have been growing can be observed by SEM or TEM, confirming the formation of aggregates of microcrystals having a crystal grain size below 200 nm. When each region is observed by the SEM-EDX method, there is a distribution in the Ti content. To show one example of a case in which a titanium ferrite nanopowder having a Ti content of 6 atom % is reduced at 1000° C. in a hydrogen gas flow, in a field of view of only 8 μm×5 μm, the α-(Fe,Ti) phase has a wide Ti composition distribution ranging from 0.3 to 7 atom %. The Ti composition distribution in this α-(Fe,Ti) phase is caused by a kind of disproportionation reaction between phases having the same crystal structure, and it is estimated that this reaction mainly occurs during the temperature decreasing process of the reduction step.

Therefore, it is understood that by integrating by ferromagnetic coupling the nanoscale α-(Fe,Ti) phases having various Ti contents that are produced during the reduction step, a typical soft magnetic material is formed as the magnetic material of the present invention.

According to the equilibrium diagram of Fe—Ti, at around 1290° C., up to nearly 10 atom % of the Ti can dissolve in solid solution in the α-Fe phase, but at ordinary temperature Ti hardly dissolves in solid solution in the α-Fe phase. The Ti content in the α-(Fe,Ti) phase of the magnetic material of the present invention can be far beyond this solid solution source, which is the equilibrium composition, but naturally those will be non-equilibrium phases. If it were possible to perform the operation of decreasing the temperature from the reduction temperature to ordinary temperature over infinite time (an infinitely small rate of temperature decrease), almost none of the Ti would coexist in α-Fe phase. Conversely, if it were possible to perform the operation of decreasing the temperature at an infinitely high rate from around 1290° C. (an infinitely large rate of temperature decrease), even if an α-(Fe,Ti) phase having a Ti content of around 10 atom % were present at the reduction temperature, α-(Fe,Ti) phases having various Ti contents due to a disproportionation reaction do not separate from the α-(Fe,Ti) phase. Therefore, the soft magnetic material of the present invention cannot be obtained by the production methods for having any of the above limits. In other words, the microstructure of the soft magnetic material of the present invention is controlled by appropriately selecting a temperature decreasing rate that is not close to the above limits (is not super gradual cooling or rapid quenching).

However, the magnetic material of the present invention has a microstructure that is completely different from existing materials in bulk, and does not have a composition distribution that follows the equilibrium state diagram at ordinary temperature. However, near the reduction temperature, homogeneous phases in accordance with the equilibrium state diagram spreading across the nano region in the magnetic material of the present invention may occur. In such cases, the control of the rate of temperature increase/decrease including the temperature increasing process is important for the microstructure. From such a perspective, although the optimum conditions depend on the intended electromagnetic properties and the Ti content, it is desirable to appropriately select the rate of temperature increase/decrease in the reduction step of the present invention generally between 0.1° C./min and 5000° C./min.

In particular, when producing the soft magnetic material of the present invention, when the Ti content is more than 20 atom %, it is preferable to set the rate of temperature increase/decrease to between 1° C./min and 500° C./min, because this means that a soft magnetic material having a low coercive force can be prepared.

Although the magnetic material of the present invention may contain $TiO_2$ as the second phase, the presence of this phase at the grain boundary or on the surface of the powder particles has a strong oxygen blocking effect, and greatly contributes to an improvement in the oxidation resistance of the magnetic material of the present invention. Particularly for the semi-hard magnetic material of the present invention, there is not only a remarkable effect on oxidation resistance, but also an effect on improving the coercive force as well.

In the present invention, the reason why appropriate grain growth occurs while maintaining a nano-microstructure even in a high temperature region exceeding 800° C. is unknown. However, the raw material is a titanium ferrite nanopowder, and even if this is reduced by hydrogen to a metallic state like the first phase, as long as appropriate reduction conditions are selected, the original grain shape and composition distribution are not reflected whatsoever in the microstructure, the structure has a uniform composition distribution, and there is no improper grain growth like a coarsening of the crystal grain size. Since this grain growth occurs together with the reduction reaction, and considering that the volume reduction due to reduction is up to 52% by volume, it can be easily inferred that disproportionation progresses while leaving structures similar to intergrowths and skeleton crystals. Further, it is also thought that, while the difference in reduction rates of the phases separated by disproportionation at the initial stage of the reduction reaction is also involved, nanoscale very fine disproportionated structures are ultimately formed as a whole due to the phase separation caused by the disproportionation reaction during the temperature decreasing process mainly occurring in the α-(Fe,Ti) phase, causing nanoparticles and nanostructures to precipitate even from the high-temperature phases homogenized to a certain extent, which have a size in the nano region while maintaining their nano-microstructure.

It is known that in the oxide phase containing Ti, such as the Ti-ferrite phase, the reduction rate tends to be slower as the Ti content is higher, and hence it is considered that once disproportionation occurs, the fact that the reduction reaction rate becomes uneven within the material acts in a beneficial manner to maintain the nanostructure.

The above series of observations is also supported by the fact that the magnetic material of the present invention should lose its characteristics if it melts.

(3) Gradual Oxidation Step (in the Present Application, Also Referred to as "Step (3)")

Since the magnetic material of the present invention after the reduction step contains nano metal particles, there is a possibility that the material may spontaneously ignite and combust if directly exposed to the air. Therefore, although it is not an essential step, it is preferable to subject the magnetic material of the present invention to a gradual oxidation treatment immediately after the reduction reaction is finished, as necessary.

The term "gradual oxidation" refers suppressing rapid oxidation of the main body of the interior magnetic material mainly by oxidizing the surface of the reduced nano metal particles to passivate as wustite, magnetite, Ti-ferrite, $TiO_2$, or the like. According to the production method of the present invention, up to the reduction step, Ti is included as a metal component in the first phase, or in the first phase and the second phase. In the magnetic material of the present invention, this Ti component is precipitated on the surface of the alloy by the gradual oxidation step to form a passivated film, thereby giving the magnetic material remarkable oxidation resistance compared with an Fe magnetic material not containing a Ti component. The gradual oxidation is carried out, for example, in a gas containing an oxygen source, such as oxygen gas, in the vicinity of ordinary temperature to 500° C., but in many cases a mixed gas containing an inert gas with an oxygen partial pressure lower than atmospheric pressure is used. If the temperature exceeds 500° C., it becomes difficult to control and provide a thin oxide film of a few nm on the surface, no matter which low oxygen partial pressure gas is used. There is also a gradual oxidation method in which a vacuum is produced in a reactor, and then gradually released at ordinary temperature to increase the oxygen concentration so that the reactor is not abruptly brought into contact with the air.

In the present application, a step including an operation such as the above is referred to as the "gradual oxidation step". After this step, handling in the molding step, which is the next step, becomes very simple.

Examples of a method for again removing the oxide film after this step include a method in which the molding step is carried out under a reducing atmosphere, such as hydrogen gas. However, since the surface oxidation reaction in the gradual oxidation step is not a completely reversible reaction, it is impossible to remove all of the surface oxide film.

Of course, when the handling from the reduction step to the molding step is carried out by an apparatus devised so that it can be operated in an oxygen-free state like a glove box, this gradual oxidation step is unnecessary.

Further, in the case of the magnetic material powder of the present invention, which has a large Ti content, a sufficiently high reduction temperature and sufficiently long reduction time, and has undergone grain growth, even if this magnetic material is exposed to the air without being subjected to this gradual oxidation step, stable passivated films may be formed, and in such a case, a special gradual oxidation step is not required. In that case, exposing the magnetic material to the air can per se be regarded as a gradual oxidation step.

When oxidation resistance and magnetic stability are secured by gradual oxidation, ferromagnetic coupling may be broken by the oxide layer or the layer of the passivated film, and hence it is preferable to perform the gradual oxidation after grain growth has occurred as much as possible. Otherwise, as described above, it is preferable to not carry out the gradual oxidation step, and carry out the next molding step. It is desirable to then continue the reduction step and the molding step by deoxidation or a low oxygen process.

(4) Molding Step (in the Present Application, Also Referred to as "Step (4)")

The magnetic material of the present invention is used as a magnetic material (i.e., a solid magnetic material) in which the first phase and the second phase are continuously bonded to each other directly or via a metal phase or an inorganic phase to form a massive state as a whole. The magnetic material powder of the present invention is used in various applications by solidifying the powder itself or by adding a metal binder, another magnetic material, a resin, or the like and molding. When the magnetic material powder is in the state after step (2), or further after step (3), the first phase and the second phase may have already been continuously bonded directly or via a metal phase or an inorganic phase. In this case, the magnetic material powder in that state functions as a solid magnetic material even without subjected to the proper molding step.

As a method of solidifying only the magnetic material of the present invention, it is possible to use a method in which the magnetic material powder is placed in a mold, compacted in a cold state, and then used as it is, or the magnetic material powder may also be subjected to further cold rolling, forging, shock wave compression molding and the like, and then molded. In many cases, the method is carried out by sintering the magnetic material powder while heat treating it at a temperature of 50° C. or more. A method in which sintering is carried out without pressurization and just by heat treating is called pressureless sintering. The heat treatment atmosphere is preferably a non-oxidizing atmosphere, and it is desirable to perform the heat treatment in an inert gas, such as a rare gas like argon or helium or nitrogen gas, or in a reducing gas including hydrogen gas. The heat treatment can be carried out even in air if the temperature is 500° C. or less. Further, like pressureless sintering, the sintering may be carried out in a heat treatment atmosphere that is at ordinary pressure, or in a pressurized heat treatment atmosphere of 200 MPa or less, or even in a vacuum.

Regarding the heat treatment temperature, in addition to ordinary temperature molding carried out at less than 50° C., the heat treatment temperature is preferably 50° C. or more and 1400° C. or less for pressure molding and 400° C. or more and 1400° C. or less for pressureless sintering. Generally, the most preferable molding temperature range is 50° C. or more and 1290° C. or less, because the material may melt at temperatures exceeding 1290° C.

This heat treatment can also be carried out simultaneously with the powder compacting. Further, the magnetic material of the present invention can be molded even by a pressure sintering method, such as hot pressing, HIP (hot isostatic pressing), electric current sintering, and SPS (spark plasma sintering). To make the pressurizing effect remarkable in the present invention, it is preferable that the pressurizing force in the heating and sintering step is within the range of 0.0001 GPa or more and 10 GPa or less. If the pressurizing force is less than 0.0001 GPa, the effect of pressurization is poor and there is no change in the electromagnetic properties from pressureless sintering. In such a case, pressure sintering is disadvantageous due to the resultant drop in productivity. If the pressurizing force exceeds 10 GPa, the beneficial limits of pressurizing are reached, and hence unnecessary pressurizing only results in a drop in productivity.

In addition, strong pressurization imparts induced magnetic anisotropy to the magnetic material, and there is a possibility that the permeability and coercive force deviate from the ranges in which they are to be controlled. Therefore, the preferable range of the pressurizing force is 0.001 GPa or more and 2 GPa or less, and more preferably 0.01 GPa or more and 1 GPa or less.

Among hot pressing methods, an ultra-high-pressure HP method, in which a powder compacted molded body is placed in a capsule that plastically deforms, and then hot pressed by heat treating while applying a strong pressure in one to three axis directions, is capable of inhibiting the entry of unwanted excess oxygen. This is because in such a method, unlike a hot pressing method in which the pressurized heat treatment is performed in a die made of cemented carbide or carbon using a uniaxial compressor, a pressure of 2 GPa or more, which is difficult even when using a tungsten carbide cemented carbide die, can be applied on the material without problems such as breaking the die, and the molding can be carried out without contact with the air because the interior of the capsule is hermetically sealed as a result of the plastic deformation by the pressure.

Prior to molding, to adjust the powder particle diameter, coarse pulverization, fine pulverization, or classification can be carried out by using a known method.

Coarse pulverization is a step carried out before molding when the reduced powder is a massive object of several mm or more, or is a step carried out when again pulverizing after molding. Coarse pulverization is carried out using a jaw crusher, a hammer, a stamp mill, a rotor mill, a pin mill, a coffee mill, and the like.

Further, after coarse pulverization, in order to further adjust the density and molding properties at the time of molding, it is also effective to adjust the particle diameter by using a sieve, a vibration classifier or sound classifier, a cyclone, and the like. Coarse pulverization and classification followed by annealing in an inert gas or hydrogen can eliminate structural defects and distortion, and in some cases may have an effect.

Fine pulverization is carried out when it is necessary to pulverize the reduced magnetic material powder or the molded magnetic material from a submicron size to a size of several tens of μm.

Examples of the fine pulverization method include, in addition to the methods described above for coarse pulverization, using a dry or a wet fine pulverizing apparatus such as a rotary ball mill, a vibration ball mill, a planetary ball mill, a wet mill, a jet mill, a cutter mill, a pin mill, and an automatic mortar and a combination thereof.

A typical example of the method for producing the solid magnetic material of the present invention is to produce a titanium ferrite nanopowder by step (1), reduce the titanium ferrite nanopowder by step (2), and then carry out step (3) followed by step (4), or perform molding only by step (4). A particularly preferable example of the production method is to prepare the titanium ferrite nanopowder by the wet method exemplified in step (1), then reduce the titanium ferrite nanopowder by a method including hydrogen gas described in step (2), gradually oxidize the reduced titanium ferrite nanopowder to expose to a low oxgen partial pressure described in step (3) at ordinary temperature, mold by the sintering method at ordinary pressure or under pressure described in step (4), in particular remove the oxygen on the powder surface of the material in step (3), and then, as step (4), carry out molding in hydrogen to prevent any further oxygen from entering the material. The present solid magnetic material can be molded to a thickness of 0.5 mm or more, and can be worked into an arbitrary shape by cutting and/or plastic working.

When the magnetic material powder obtained by step (1)→step (2), or by step (1)→step (2)→step (3), or by step (1)→step (2)→step (5) (described later), or by step (1)→step (2)→step (3)→step (5) (described later), or the magnetic material powder obtained by re-pulverizing a magnetic material obtained by molding a magnetic material powder obtained by the above steps by step (4), or the magnetic material powder obtained by annealing a magnetic material powder obtained by the above steps in step (5) (described later), is applied in a composite material with a resin, such as a high frequency magnetic sheet, the magnetic material powder is molded by mixing with a thermosetting resin or a thermoplastic resin and then compression molded, or is kneaded together with a thermoplastic resin and then injection molded, or is extrusion molded, roll molded, calendar molded or the like.

In the case of applying in an electromagnetic noise absorbing sheet, for example, examples of the type of sheet shape include a batch type sheet obtained by compression molding, various rolled sheets obtained by roll molding, calendar molding, and the like, and cut or molded sheets of various sizes, such as A4 plate, having a thickness of 5 μm or more and 10000 μm, a width of 5 mm or more and 5000 mm or less, and a length of 0.005 mm or more and 1000 mm or less.

(5) Annealing Step

The magnetic material of the present invention has a first phase and a second phase, and typically one or both of those phases have a crystal grain size in the nano region.

As long as the object of the present invention is not hindered, it may be preferable to carry out annealing for various purposes, such as for crystal distortions and defects that are produced in the various steps, stabilization of non-oxidized active phases, and the like.

For example, after the titanium ferrite nanopowder production step (1), to carry out stable reduction simultaneously with drying for the purpose of removing volatile components such as moisture content, a so-called preliminary heat treatment (annealing) in which fine particle components of about several nm are heat treated may be carried out for the purposes of inhibiting improper grain growth and removing lattice defects in subsequent steps. In this case, it is preferable to perform the annealing in air, in an inert gas, or in a vacuum at about 50° C. to 500° C.

Further, the coercive force of the soft magnetic material of the present invention can be decreased by, after the reduction step (2), removing distortions and defects in the crystal lattice and microcrystals caused by the decrease in the volume due to grain growth and reduction. After this step, in applications in which the soft magnetic material of the present invention is used in powder form, for example, in applications such as powder magnetic cores used by hardening a powder with a resin, ceramic, or the like, electromagnetic properties may be improved by carrying out annealing under appropriate conditions after that step or after a pulverization step or the like that is carried out after this step.

In addition, in the gradual oxidation step (3), annealing may be useful for removing distortions and defects caused by surface oxidation that are present near the surface, interfaces, and boundaries.

Annealing after the molding step (4) is most effective. The annealing step may be proactively carried out after preliminary molding, compression molding, hot pressing, and the like, or the subsequent cutting and/or plastic working to remove the distortions and defects in the crystal lattices and microstructure caused by those steps. In the annealing step, there is expected to be a dramatic decrease in the distortions, defects, and the like that have accumulated in the steps prior to that. Furthermore, after the above-mentioned cutting and/or plastic working steps, the distortions in steps (1) to (4), steps (2) to (4), steps (3) and (4), or step (4) may be annealed, or the distortions that have accumulated in those steps may be annealed collectively.

The annealing atmosphere may be any one of a vacuum, a reduced pressure, an ordinary pressure, or a pressurized atmosphere of 200 MPa or less. The gas species to be used may be an inert gas, typified by a rare gas such as argon, nitrogen gas, a reducing gas such as hydrogen gas, or an atmosphere containing an oxygen source such as air. The annealing temperature may be from ordinary temperature to 1290° C., in some cases the treatment may be carried out at a low temperature, namely, from a liquid nitrogen temperature to ordinary temperature. The apparatus used in the annealing step may be almost the same as the apparatus used in the reduction step and the molding step, or it may be constructed by combining known apparatuses.

The present invention will now be described in more detail by way of examples, but the present invention is in no way limited to these examples.

The methods for evaluating the present invention are as follows.

EXAMPLES (I) Saturation Magnetization, Coercive Force, and Permeability

In the case of a magnetic powder, the powder was placed in a cylindrical case made of polypropylene (inner diameter: 2.4 mm, powder layer thickness approximately 1.5 mm). In the case of a molded powder, the molded body was molded on a disk having a diameter of 3 mm and a thickness of approximately 1 mm. Then, using a vibrating sample type magnetometer (VSM), a full loop of the magnetic curve in the region where the external magnetic field is −7.2 MA/m or more and 7.2 MA/m or less was drawn, and the values of the saturation magnetization (emu/g) and coercive force (A/m) at room temperature were obtained. The saturation magnetization was corrected with a 5N Ni standard sample, and calculated based on the law of approach to saturation. The coercive force was corrected using a paramagnetic Pd standard sample to correct the magnetic field shift in the low magnetic field region. In this measurement, if a smooth step or inflection point is not seen on the magnetic curve up to the zero magnetic field after magnetization up to 7.2 MA/m, it is determined that there is no (i.e. "absent") "inflection point on the ¼ major loop". The direction of the measurement magnetic field is the axial direction in the case of the magnetic powder and the radial direction in the case of the molded body.

When measuring a molded body, the saturation magnetization was converted into T (Tesla) units using the density of the molded body. The relative permeability of the molded body was obtained by determining a demagnetizing factor based on a Ni standard sample having the same shape as the measurement sample as mentioned above, and then roughly estimating the relative permeability by using a magnetic curve having a demagnetizing field corrected based on the determined value.

(II) Oxidation Resistance

The saturation magnetization $\sigma_{st}$ (emu/g) of a magnetic powder that had been left in air at an ordinary temperature for a certain period t (days) was measured by the above method, compared with an initial saturation magnetization $\sigma_{s0}$ (emu/g), and the rate of decrease in the saturation magnetization was evaluated based on the following expression.

$$\Delta\sigma_s (\%) = 100 \times (\sigma_{s0} - \sigma_{st})/\sigma_{s0}$$

The oxidation resistance performance can be determined as being higher as the absolute value of $\Delta\sigma_s$ approaches zero. In the present invention, a magnetic powder having an absolute value of $\Delta\sigma_s$ of 1% or less was evaluated as having good oxidation resistance for a period of t days. In the present invention, t (days) is 60 or 120.

(III) Electric Resistivity

The molded body was measured by the van der Pauw method.

(IV) Fe Content, Ti Content, Oxygen Content, and α-(Fe,Ti) Phase Volume Fraction The Fe content and the Ti content in the powder and the bulk magnetic material were quantified by X-ray fluorescence elemental analysis. The Fe content and the Ti content in the first phase and the second phase of the magnetic material were quantified by EDX included in an FE-SEM based on an image observed by the FE-SEM. Further, the volume fraction of the α-(Fe,Ti) phases was quantified by image analysis by combining a method using the above-mentioned FE-SEM together with the results of the XRD method. Mainly to distinguish whether the observed phase is an α-(Fe,Ti) phase or an oxide phase, an oxygen characteristic X-ray surface distribution map using SEM-EDX was used. In addition, the validity of the value of the volume fraction of the α-(Fe,Ti) phases was also confirmed from the value of the saturation magnetization measured in (I).

The oxygen content was determined based on a value obtained by quantifying by an inert gas melting method. Further, the oxygen content of the magnetic material after the reduction step was also confirmed based on the decrease in weight after reduction. In addition, image analysis by SEM-EDX was used for identification of each phase.

The K content was quantified by X-ray fluorescence elemental analysis.

(V) Average Powder Particle Diameter

The powder particle diameter was determined by observing the magnetic powder with a scanning electron microscope (SEM) or a transmission electron microscope (TEM). The powder particle diameter was determined to one significant digit by selecting portions representing the whole material, and setting n to be a number of 100 or more.

When using together with a laser diffraction type particle size distribution analyzer, the volume-equivalent diameter distribution was measured and evaluated in terms of a median diameter (μm) obtained from the distribution curve thereof. However, the value is employed only when the obtained median diameter is 500 nm or more and less than 1 mm. It was confirmed that such a value agrees to one significant digit with the powder particle diameter roughly estimated by a method using a microscope.

(VI) Average Crystal Grain Size

The magnetic material was observed with a scanning electron microscope (SEM), and the size of a portion surrounded by a crystal boundary was obtained to one significant digit. The measurement area was determined by selecting portions sufficiently representative of the whole, and setting the number n to 100 or more. The crystal grain size was determined by separately measuring the average value of the whole, and the average value of only the first phase and the second phase, respectively. Further, the EDX device included with the transmission electron microscope (TEM) was used to investigate the size of the portions having a difference in Ti content and estimate the crystal grain size at a fine scale. The number of measurement points of the Ti content was set to 65536 points.

(VII) Crystallite Size

The crystallite size was determined by applying the Scherrer equation to the line width of the (200) diffraction line of the bcc phases measured by X-ray diffraction, and taking the dimensionless form factor to be 0.9.

Example 1 and Comparative Example 1

An aqueous solution of $TiCl_4$ (aqueous solution of titanium chloride) and an aqueous solution of $FeCl_2 \cdot 4H_2O$ (ferric chloride(II) tetrahydrate) were separately prepared, and then mixed to form a mixed aqueous solution of $TiCl_4$ and $FeCl_2$ adjusted to 50.3 mM. The resultant mixed aqueous solution was placed in a reactor to obtain a reaction field solution. Next, a 660 mM aqueous potassium hydroxide solution (pH adjusting solution) was added dropwise while vigorously stirring in air, and the pH of the system gradually shifted from the acidic side to the alkaline side within a range of 2.26 or more and to 12.80 or less. At the same time, a mixed aqueous solution (reaction solution) of $FeCl_2$ and $TiCl_4$ of 168 mM was added dropwise and reacted for 15 minutes, then the addition of the pH adjusting solution and the reaction solution was stopped, and the stirring operation was further continued for 15 minutes. Then, the solid component was precipitated by centrifugation, redispersed in purified water and repeatedly subjected to centrifugation to adjust the pH of the supernatant solution to 9.13. Finally, the precipitate was dispersed in ethanol, and then subjected to centrifugation.

Figure 3:
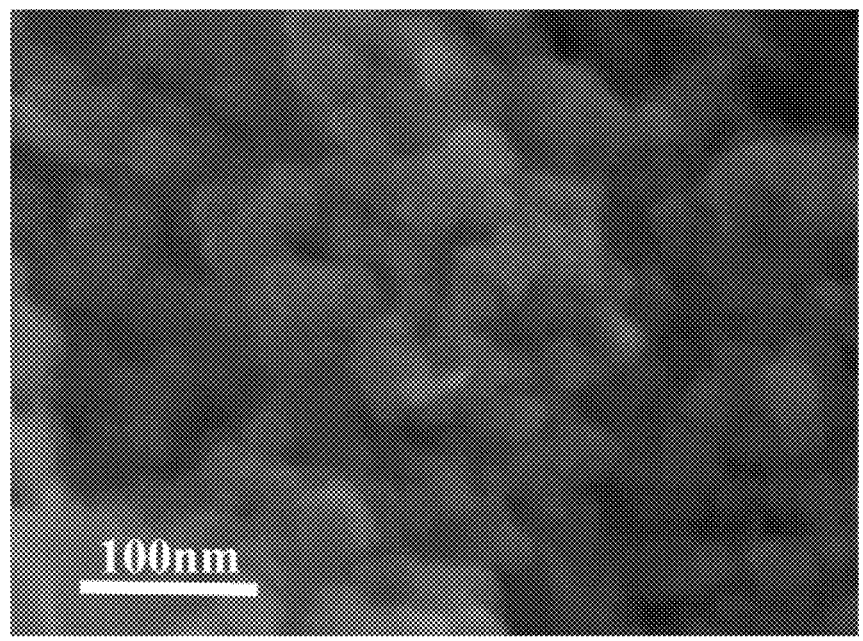
FIG. 3 is an SEM image of a $(Fe_{0.951}Ti_{0.049})_{43}O_{57}$ ferrite nanopowder (Comparative Example 1).

After that, vacuum drying was carried out at ordinary temperature overnight to obtain a Ti-ferrite nanopowder having a $(Fe_{0.951}Ti_{0.049})_{43}O_{57}$ composition having an average powder particle diameter of 20 nm. An SEM image of this nanopowder is shown in FIG. 3. Further, as a result of analyzing the nanopowder by X-ray diffraction, it was found that the cubic Ti-ferrite phase (titanomagnetite phase) was the main phase and a ferrihydrite phase is contained as an impurity phase. Therefore, this powder did not contain an α-(Fe,Ti) phase, and was hence used as the powder of Comparative Example 1. The particle diameter, magnetic properties, and the like of this powder are shown in Table 1.

The Ti-ferrite nanopowder was placed in a crucible made of aluminum titanate, the temperature was increased at 10°

C./min up to 300° C. in a hydrogen flow, then increased from 300° C. to 1100° C. at 2° C./min, and a reduction treatment was carried out at 1100° C. for 1 hour. After that, the temperature was lowered at a rate of 95° C./min to 400° C., and then cooled from 400° C. to room temperature over 40 minutes. Next, a gradual oxidation treatment was carried out at 20° C. in an argon atmosphere having an oxygen partial pressure of 1% by volume for 1 hour to obtain a magnetic material having a composition ratio of titanium to iron of $Fe_{94.2}Ti_{5.8}$. At this time, based on the whole magnetic material including Ti, Fe, O, and K, the O content was 2.6 atom % and the K content was zero. Further, the average powder particle diameter of the Fe—Ti magnetic material was 30 m. Analysis on this magnetic material was carried out by the following method, and this magnetic material was used as Example 1.

As a result of observation of the obtained magnetic material by X-ray diffraction, only an α-(Fe,Ti) phase was clearly recognized, based on which it was confirmed that the α-(Fe,Ti) phase, which is a bcc phase, is the main component.

Figure 4:
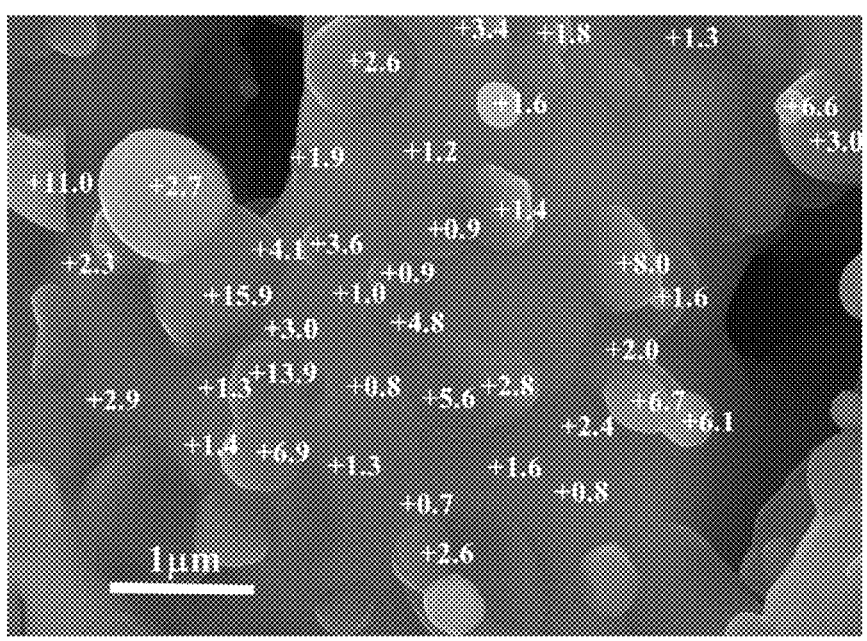
FIG. 4 is an SEM image of a $Fe_{94.2}Ti_{5.8}$ soft magnetic material (Example 1) (the numerical values in the diagram are the average value in the region having a radius of 100 nm to 150 nm in terms of Ti content (atom %) in the cruciform part).

Further, as a result of observation of this magnetic material by an FE-SEM/EDX, as shown in FIG. 4, it can be seen that the Ti content in each phase of the magnetic material (the numerical value in the diagram is the Ti content in each phase, and the atomic ratio value of Ti relative to the sum of Ti and Fe in each phase is expressed as a percentage) is distributed in a very disproportionate manner in the range of 0.7 atom % or more to 15.9 atom % or less. In addition, in FIG. 4, innumerable curved crystal boundaries curved at an interval in the order of tens of nanometers were also observed in a region thought to be one phase (i.e., α-(Fe,Ti) phase region). Regarding the distribution, which is a measurement result obtained by averaging the composition in the region between the radius of 100 nm and 150 nm relative to the Ti content, of the crystal phases deemed to be present in this region, it was found that in this averaged composition distribution the crystal phases greatly varied depending on the location, having a distribution from 0.8 atom % to 2.4 atom %, and a crystal phase having a Ti content of 2 atom % or more was present. The average crystal grain size of the whole magnetic material was 200 nm. In addition, observation of the crystal boundary vicinity at a magnification of 750,000 times confirmed that no heterogenous phases existed near these crystal boundaries.

Combining the above X-ray diffraction results (i.e., that only an α-(Fe,Ti) phase, which is a bcc phase was clearly observed for the observed magnetic material) and the above FE-SEM results (i.e., the observed magnetic material has a crystal phase having a high Ti content of 2.0 atom % to 15.9 atom % which is 2 atom % or more in addition to a crystal phase having a Ti content of 0.7 atom % to 1.9 atom %), it was found that an α-(Fe,Ti) phase and an α-(Fe,Ti) phase having a higher Ti content than that phase were formed in the observed magnetic material. When this is applied to the above definitions of the first phase and the second phase, the former phase corresponds to the first phase and the latter corresponds to the second phase.

Based on such image analysis, X-ray diffraction, oxygen content, and the like, the volume fraction of the bcc phase is estimated to be 97% by volume. By determining the second phase as described above, the crystal grain sizes of the first phase and the second phase can be determined from the SEM image, and as a result of image analysis, the values of those phases were 200 nm and 400 nm, respectively.

Further, the peak position of the (110) diffraction line of the first phase observed by X-ray diffraction was, when measured with CoK α-rays, 0.138 degrees to the lower angle side compared with an α-Fe powder prepared by the same method as described above except that the Ti component was not added and the reduction temperature was 450° C. However, the half value width was 0.26 degrees.

The Ti content of the magnetic material of this example was also measured by using XRD, which is thought to be superior in terms of capturing the macroscopic characteristics of the overall material. As a result, based on the fact that when Ti is in solid solution in the α-Fe phase, it is known that the peak position of the diffraction line shifts to the lower angle side, and based on the peak position of the (110) diffraction line of the α-(Fe,Ti) phase, the line width thereof, and the literature values, the Ti content can be estimated to be about 8 atom % or less. From this, it could be confirmed that the Ti content at the peak position of the diffraction line is about 3 atom %, which is 2 atom % or more.

Furthermore, although the presence of $TiO_2$ was not clearly shown in XRD, the presence of $TiO_2$, although slight, in particle form was confirmed by FE-SEM/EDX observation. This amount is estimated to be about 0.1% by volume based on O content and the like.

The saturation magnetization of this magnetic material was 202.8 emu/g, the coercive force was 680 A/m, and there was no inflection point on the ¼ major loop.

Therefore, since the magnetic material of Example 1 has a coercive force of 800 A/m or less, it was also confirmed that the magnetic material of this example was a soft magnetic material.

The measurement results of the phases, composition, particle diameter, and magnetic properties of this example are summarized in Table 1.

Example 2

The Ti-ferrite nanopowder of Comparative Example 1 having a $(Fe_{0.951}Ti_{0.049})_{43}O_{57}$ composition and an average powder particle diameter of 20 nm was placed in a crucible made of aluminum titanate, the temperature was increased at 10° C./min up to 300° C. in a hydrogen flow, then increased from 300° C. to 600° C. at 2° C./min, and a reduction treatment was carried out at 600° C. for 1 hour. After that, the temperature was lowered at a rate of 45° C./min to 400° C., and then cooled from 400° C. to room temperature over 40 minutes. Next, a gradual oxidation treatment was carried out at 20° C. in an argon atmosphere having an oxygen partial pressure of 1% by volume for 1 hour to obtain a magnetic material having a composition ratio of titanium to iron of $Fe_{94.4}Ti_{5.6}$. At this time, based on the whole magnetic material including Ti, Fe, O, and K, the O content was 6.0 atom % and the K content was 0.2 atom %. Further, the average powder particle diameter of the Fe—Ti magnetic material was 50 nm. Analysis on this magnetic material was carried out by the following method, and this magnetic material was used as Example 2.

Only an α-(Fe,Ti) phase was clearly observed when the obtained magnetic material was measured by X-ray diffraction. From this, it was confirmed that the α-(Fe,Ti) phase, which is a bcc phase, is the main component, and that the first phase was present. In addition, the peak position of the (110) diffraction line of the α-(Fe,Ti) phase observed by X-ray diffraction was 0.085 degrees to the lower angle side compared with the α-Fe phase prepared in Example 1 when measured with CoK α-rays, and the half value width was 0.21 degrees.

Figure 5:
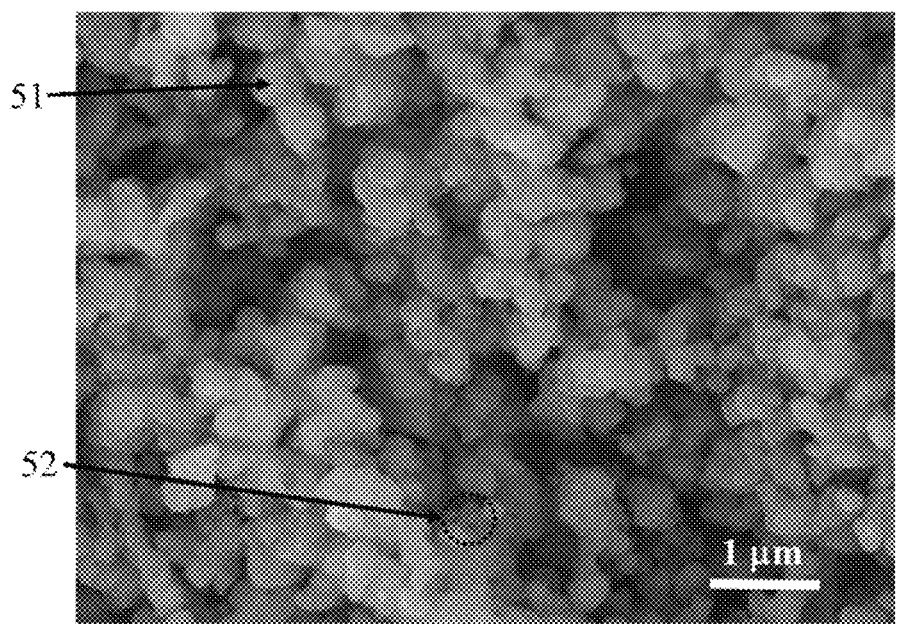
FIG. 5 is an SEM image of a $Fe_{94.4}Ti_{5.6}$ magnetic material (Example 2) (the particle which is 10 nm or less surrounded by the dashed-line circle is a Ti-enriched spawn phase).

As shown in FIG. 5, observation using FE-SEM showed that the soft magnetic material has an α-(Fe,Ti) phase of 10 nm or more and 500 nm or less and a spawn phase of several nm. The Ti content in each phase was in the range of 1.9 atom % to 5.4 atom % and 5.9 atom % to 8.1 atom %, respectively. Therefore, the spawn phase was found to be more enriched with Ti than the α-(Fe,Ti) phase.

Further, by using XRD, the magnetic material of this example was measured in the same manner as in Example 1. As a result, the Ti content can be estimated to be approximately 5 atom % or less, and the Ti content at the peak position that can be judged to be the (110) diffraction line of the α-(Fe,Ti) phase was confirmed to be about 2 atom %.

Combining the above results of X-ray diffraction (i.e., only an α-(Fe,Ti) phase, which is a bcc phase, was clearly observed for the magnetic material), the above results of FE-SEM (i.e., the material has an α-(Fe,Ti) phase with a Ti content of 1.9 atom % to 5.4 atom % and a spawn phase having a Ti content of 5.9 atom % to 8.1 atom % which is 2 atom % or more), and the above XRD results (an α-(Fe,Ti) phase having a Ti content of 2 atom % was also present in that α-(Fe,Ti) phase), it was found that an α-(Fe,Ti) phase and a spawn phase having a higher Ti content than that phase are formed in the observed magnetic material, and that an α-(Fe,Ti) phase distinguished in terms of Ti content is formed in the α-(Fe,Ti) phase. When this is applied to the above definitions of the first phase and the second phase, the α-(Fe,Ti) phase having a Ti content of 1.9 atom % corresponds to the first phase and the spawn phase having a Ti content of 5.9 atom % to 8.1 atom % and an α-(Fe,Ti) phase having a Ti content of 2.0 atom % to 5.4 atom % correspond to the second phase.

Based on such image analysis, X-ray diffraction, oxygen content, and the like, the volume fraction of the bcc phase is estimated to be 92% by volume (excluding the spawn phase). Further, it was also confirmed that the average crystal grain size of the first phase not containing a spawn phase was 100 nm, and that the average crystal grain size of the second phase including the spawn phase was 50 nm. In this case, it is assumed that the crystal grain size of the crystal grains other than in the spawn phase does not significantly change depending on Ti content.

Furthermore, although the presence of $TiO_2$ was not clearly indicated by XRD, it was estimated to be 0.1% by volume or more based on the O content and the like.

The saturation magnetization of this magnetic material was 194.1 emu/g, the coercive force was 12.4 kA/m, and there was no inflection point on the ¼ major loop.

Therefore, since the magnetic material of Example 2 has a coercive force exceeding 800 A/m and 40 kA/m or less, it was confirmed to be a semi-hard magnetic material.

The measurement results of the phases, composition, particle diameter, and magnetic properties of this example are summarized in Table 1.

Comparative Examples 2 to 4

Ferrite nanopowders were prepared in the same manner as in Example 1 or 2, except that the Ti component (aqueous solution of titanium chloride) was not added.

Fe metal powders were prepared in the same manner as in Example 1 or 2, except that the above ferrite nanopowders were used and the reducing conditions were 425° C. for 1 hour (Comparative Example 2), the same temperature for 4 hours (Comparative Example 3), and 450° C. for 1 hour (Comparative Example 4). The measurements were also carried out in the same manner.

The measurement results of the particle diameter, magnetic properties, and the like are shown in Table 1.

Note that in these metal powders, the magnetic properties dramatically deteriorate just by leaving in air at room temperature. Table 2 shows the rate of change $\Delta\sigma_s$ (%) of the saturation magnetization in Comparative Examples 2 to 4.

Examples 3 to 11

Magnetic materials of the present invention were produced in the same manner as in Example 1, except that the reduction temperature was set to that shown in Table 1 within the range of 450° C. to 1200° C., and a rate v of temperature decrease (° C./min) until 400° C. was set to, when the reduction temperature is taken to be T (° C.), a velocity represented by the following relational expression.

[Expression 2]

$$v=0.1T-15 \quad (2)$$

The measurements were also carried out in the same manner as in Example 1. In all of the examples, it was confirmed that an α-(Fe,Ti) phase (first phase) and a phase (second phase) having a larger Ti content than that phase were formed in the observed magnetic material. It was also confirmed that, in Example 3, a first phase of α-(Fe,Ti) phase and a second phase (specifically, a titanomagnetite phase and a wustite phase) having a Ti content of less than 2 atom % but two times or more and $10^5$ times or less than that of the first phase were formed in the observed magnetic material, in Example 4, a first phase of α-(Fe,Ti) phase and a second phase (specifically, a titanohematite phase and a titanomagnetite phase) having a Ti content of less than 2 atom % but two times or more and $10^5$ times or less than that of the first phase were formed in the observed magnetic material, and in Example 8, a first phase of α-(Fe,Ti) phase and a second phase (specifically, an α-(Fe,Ti) phase) having a Ti content of less than 2 atom % but two times or more and $10^5$ times or less than that of the first phase were formed in the observed magnetic material.

The measurement results of these phases, composition, particle diameter, and magnetic properties are summarized in Table 1.

Figure 6:
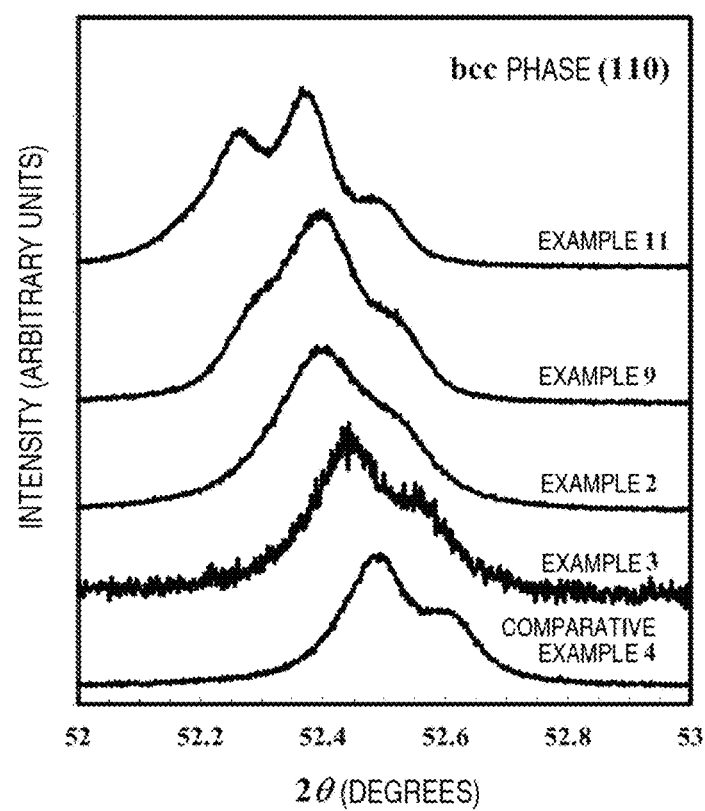
FIG. 6 is an X-ray diffraction diagram of powders (Example 2 (reduction temperature=600° C.), Example 3 (reduction temperature=450° C.), Example 9 (reduction temperature=900° C.), and Example 11 (reduction temperature=1200° C.)) produced by reducing Ti-ferrite nanopowders having an α-Fe powder (Comparative Example 4) and $(Fe_{0.951}Ti_{0.049})_{43}O_{57}$ composition at various temperatures of 450° C. or more to 1200° C. or less in hydrogen.

FIG. 6 is an XRD graph showing the results of Comparative Example 4 (α-Fe powder), Example 2 (reduction at 600° C.), Example 3 (reduction at 450° C.), Example 9 (reduction at 900° C.), and Example 11 (reduction at 1200° C.). It was confirmed that within the range shown in this graph, the diffraction peak of the (110) plane of the bcc phase shifted to a lower angle as the reduction temperature increased. In particular, at 900° C. or higher, two bcc phases were observed, and the presence of a bcc phase as the first phase and the presence of a "Ti-enriched bcc phase" as the second phase were clearly distinguished. The shoulder shape on the high angle side is a diffraction peak by the $K\alpha_2$ rays of the Co radiation source. In general, the position of the actual diffraction line shifts to the lower angle side when the absorption of the $K\alpha_2$ rays is subtracted. In the present invention, based on a comparison with the magnetic material not containing the Ti component of Comparative Example 4, it was confirmed that Ti was present in the bcc phases, and the average value of the Ti content of the bcc phases was calculated to one significant digit based on the magnitude of the low angle shift and the literature values, although it was assumed that at this magnitude of the low angle shift, the influence of the absorption of the $K\alpha_2$ rays is largely canceled out. It should be noted that the change in the diffraction position due to the nanocrystals was similarly assumed as being canceled out by the subtraction when calculating the magnitude of the low angle shift in the above comparison, that measurement error from the stability of the XRD apparatus used in these examples was also continuously measured from a sample for which comparison is to be made on the same day, and the diffraction peak position of a Si standard sample before and after the measurement did not change, thereby ensuring the validity of the above comparison.

When two or more bcc phases are observed, the "Ti content of the bcc phase roughly estimated based on the magnitude of the (110) low angle shift" listed in the table is calculated based on the diffraction angle at the maximum value of the diffraction peak observed at the lowest angle. Even for diffraction peaks other than the (110) diffraction peak, that is, "diffraction peak observed at the lowest angle", the low angle shift occurs by containing Ti.

The K content relative to the whole magnetic material including Ti, Fe, O, and K was 0.04 atom % or more and 1.4 atom % or less at a reduction temperature of 450° C. to 700° C., and 0 atom % at a reduction temperature of 800° C. or more (Examples 8 to 11). The volume fraction of $TiO_2$ phase was in the range of 0.1 to 4% in all the examples.

Figure 7:
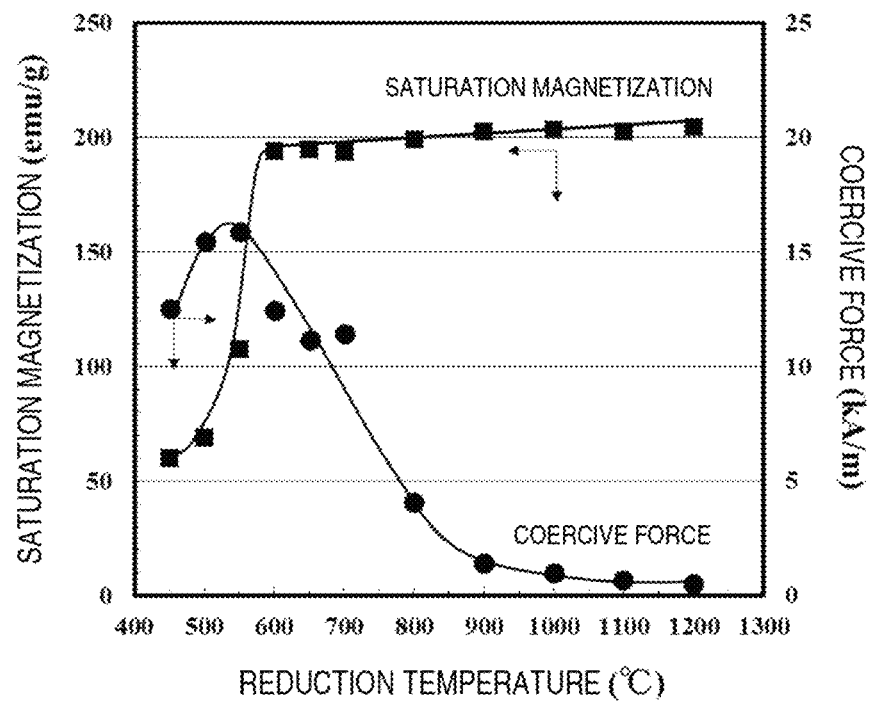
FIG. 7 is a diagram showing the reduction temperature dependence of saturation magnetization (emu/g) and coercive force (kA/m) on Fe—Ti magnetic materials (Examples 1 to 11).

In FIG. 7, the measurement results of the saturation magnetization and coercive force of Examples 1 to 11 are summarized.

In addition, Table 2 shows the rate of change $\Delta\sigma_s$ (%) of the saturation magnetization in Examples 1 and 11. The fact that $\Delta\sigma_s$ is a negative value indicates that saturation magnetization is improved after leaving at an ordinary temperature as compared with immediately after preparation of each magnetic powder. From the results of this table, it was found that the oxidation resistance of the metal powders of these examples is good at t=60 or 120.

Example 12

An Fe—Ti metal powder was prepared in the same manner as in Example 5, except that the reduction conditions were changed to 550° C. for 4 hours. The measurements were also carried out in the same manner as in Example 1. With a reduction time of 4 hours, the reduction reaction advanced and the titanohematite phase and the titanomagnetite phase, which did not disappear on XRD for a reduction time of 1 hour at 550° C., disappeared. From the results of the SEM observation, it was also found that the magnetic material of this example was a mixed phase of an α-(Fe,Ti) phase and a spawn phase. Further, in this example, it was also confirmed that the observed magnetic material contained an α-(Fe,Ti) phase (first phase) and a phase (second phase) having a larger Ti content than that phase.

The measurement results of the phases, composition, particle diameter, and magnetic properties of this example are summarized in Table 1.

Example 13 and Comparative Example 5

Figure 8:
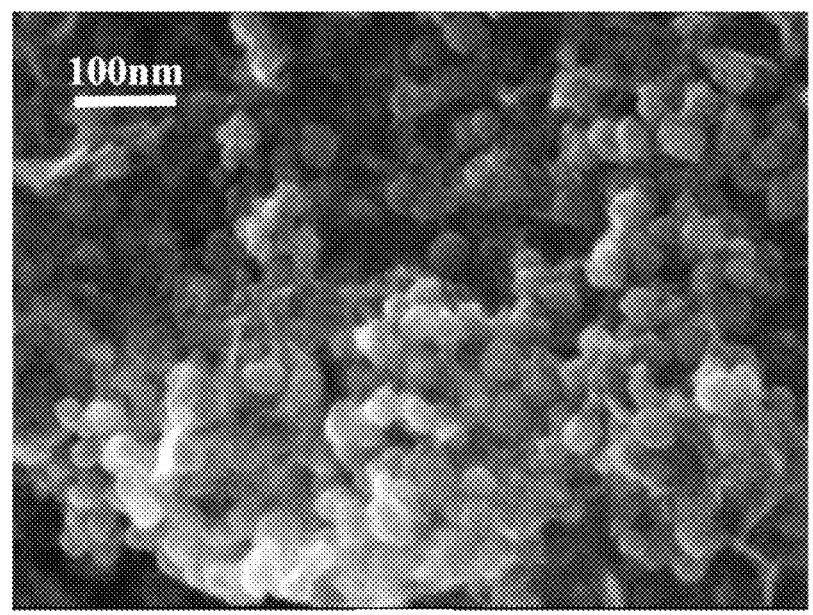
FIG. 8 is an SEM image of a $(Fe_{0.730}Ti_{0.270})_{43}O_{57}$ ferrite nanopowder (Comparative Example 5).

$(Fe_{0.730}Ti_{0.270})_{43}O_{57}$ Ti-ferrite nanopowders having an average powder particle diameter of 20 nm were prepared in the same manner as in Example 1, except that the $TiCl_4$ raw material was changed to a commercially available aqueous solution of titanium tetrachloride (Ti molar concentration=5.24 M) and the composition ratio of $FeCl_2$ in the mixed solution was changed. However, the pH in the reaction system varied from 1.94 to 14.64, and the pH at the time when the step of washing the solution remaining by centrifugation was completed was 10.65. FIG. 8 shows an SEM image of the nanopowder prepared in this way. The average powder particle diameter was about 20 nm. As a result of analysis by X-ray diffraction, it was found that the cubic Ti-ferrite phase (titanomagnetite phase) was the main phase and the ferrihydrite phase was contained as an impurity phase. Therefore, this nanopowder did not contain an α-(Fe, Ti) phase, and hence was used as the powder of Comparative Example 5. The particle diameter, magnetic properties, and the like of this nanopowder are shown in Table 3.

The Ti-ferrite nanopowder was placed in a crucible made of aluminum titanate, the temperature was increased at 10° C./min up to 300° C. in a hydrogen flow, then increased from 300° C. to 1100° C. at 2° C./min, and a reduction treatment was carried out at 1100° C. for 1 hour. After that, the temperature was lowered at a rate of 95° C./min to 400° C., and then cooled from 400° C. to room temperature over 40 minutes. Next, a gradual oxidation treatment was carried out at 20° C. in an argon atmosphere having an oxygen partial pressure of 1% by volume for 1 hour to obtain a magnetic material having a composition ratio of titanium to iron of $Fe_{69.1}Ti_{30.9}$. At this time, based on the whole magnetic material including Ti, Fe, O, and K, the O content was 27 atom % and the K content was 0.9 atom %. Further, the average powder particle diameter of the Fe—Ti magnetic material was 2 m. Analysis on this magnetic material was carried out by the following method, and this magnetic material was used as Example 13.

As a result of observing the obtained magnetic material by X-ray diffraction, it was found that an α-(Fe,Ti) phase, which is a bcc phase, was the main component. In addition, the presence of a slight $TiO_2$ phase (rutile phase), a Laves phase (Ti content of about 27 to 40 atom %), a β-Ti phase (Ti content of 77 atom % or more) (in this example, these phases are collectively referred to as "mixed phase") was confirmed, and the Ti content of this mixed phase was confirmed to be higher than the Ti content of the α-(Fe,Ti) phase. Therefore, when this is applied to the above-mentioned definitions of the first phase and the second phase, the former α-(Fe,Ti) phase corresponds to the first phase and the latter mixed phase corresponds to the second phase.

Figure 9:
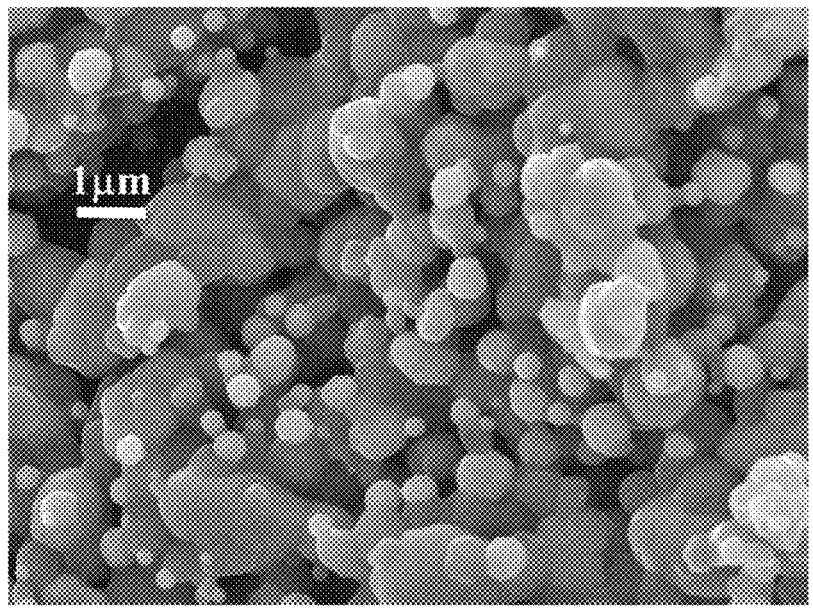
FIG. 9 is an SEM image of a $Fe_{69.1}Ti_{30.9}$ soft magnetic material (Example 13).

Further, FIG. 9 shows the results of observation of this magnetic material by FE-SEM/EDX. In general, the darkly-shaded black-like crystal phase has a high Ti content, and the pale whitish crystalline phase generally has a low Ti content. Thus, crystal phases having different levels of color shading are phase separated by the disproportionation reaction, and portions that have agglomerated while maintaining their chemical bonds are seen at many locations. The Ti content in each phase of this magnetic material is distributed in a very disproportionate manner between 2.7 and 99.6 atom %. In addition, in FIG. 9, innumerable curved crystal boundaries curved at an interval in the order of tens of nanometers were also observed in a region thought to be a bcc phase having a low Ti content (i.e., α-(Fe,Ti) phase region). Regarding the distribution, which is a measurement result obtained by averaging the composition in the region between the radius of 100 nm and 150 nm relative to the Ti content, of the crystal phases deemed to be present in this region, it was found that in this averaged composition distribution the crystal phases greatly varied depending on the location, having a distribution from 2.7 atom % to 19.2 atom %. The average crystal grain size of the whole magnetic material was 100 nm. In addition, observation of the crystal boundary vicinity at a magnification of 750,000 times confirmed that no heterogenous phases existed near these crystal boundaries.

Further, the peak position of the (110) diffraction line of the first phase observed by X-ray diffraction was 0.198 degrees to the lower angle side compared with the α-Fe powder of Comparative Example 4 when measured by CoK α-rays, but the half value width was 0.21 degrees. From this X-ray diffraction result, it was found that the Ti content of the first phase, which is a bcc phase, was close to 20 atom %. Therefore, in the measurement range of FIG. 9, it can be thought that a second phase of 5.4 atom % to 19.2 atom % of α-(Fe,Ti) also satisfying the condition of having a Ti content twice or more that of the 2.7 atom % of the first phase was present, and it was found that in addition to the above-mentioned mixed phase, this phase can also serve as the second phase of the magnetic material of the present invention. The volume fraction of the all the bcc phases, including these second phases, was estimated to be about 63% by volume. By determining the second phase in this manner, the crystal grain sizes of the first phase and the second phase can be determined from the SEM image. As a result of image analysis, those values were 80 nm and 100 nm, respectively.

The amount of $TiO_2$ phase present was found to be 2.2% by volume or more from FE-SEM/EDX observation.

The saturation magnetization of this magnetic material was 129.6 emu/g, the coercive force was 8 A/m, and there was no inflection point on the ¼ major loop. Since the magnetic material of Example 13 has a coercive force of 800 A/m or less, it was confirmed to be a soft magnetic material.

The measurement results of the phases, compositions, particle diameters, and magnetic properties of these examples are summarized in Table 3.

Further, Table 2 shows the rate of change as (%) of the saturation magnetization in Example 13. From the results of this table, it can be seen that the oxidation resistance of the metal powder of this example is good at t=120.

Example 14

The Ti-ferrite nanopowder having $(Fe_{0.730}Ti_{0.270})_{43}O_{57}$ composition of Comparative Example 5 having an average powder particle diameter of 20 nm was placed in a crucible made of aluminum titanate, the temperature was increased at 10° C./min up to 300° C. in a hydrogen flow, then increased from 300° C. to 600° C. at 2° C./min, and a reduction treatment was carried out at 600° C. for 1 hour. After that, the temperature was lowered at a rate of 45° C./min to 400° C., and then cooled from 400° C. to room temperature over 40 minutes. A gradual oxidation treatment was carried out at 20° C. in an argon atmosphere having an oxygen partial pressure of 1% by volume for 1 hour to obtain a magnetic material having a composition ratio of titanium to iron of $Fe_{71.4}Ti_{28.6}$. At this time, based on the whole magnetic material including Ti, Fe, O, and K, the O content was 32 atom % and the K content was 4.2 atom %. Further, the average powder particle diameter of the Fe—Ti magnetic material was 30 nm. Analysis on this magnetic material was carried out by the following method, and this magnetic material was used as Example 14.

By measuring the obtained magnetic material by X-ray diffraction, it was found that an α-(Fe,Ti) phase, which is a bcc phase, was the main component. In addition, the presence of a slight $TiO_2$ phase (rutile phase), a Laves phase (Ti content of about 27 to 40 atom %), a β-Ti phase (Ti content of 69 atom % or more) (in this example, these phases are collectively referred to as "mixed phase") was confirmed, and the Ti content of this mixed phase was confirmed to be higher than the Ti content of the α-(Fe,Ti) phase. Therefore, when this is applied to the above-mentioned definitions of the first phase and the second phase, the former α-(Fe,Ti) phase corresponds to the first phase and the latter mixed phase corresponds to the second phase.

Figure 10:
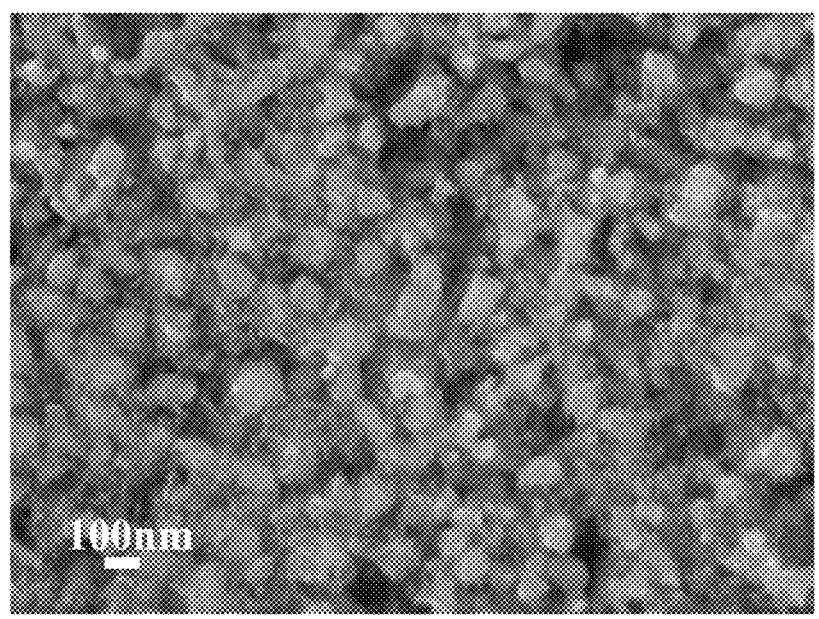
FIG. 10 is an SEM image of a $Fe_{71.4}Ti_{28.6}$ soft magnetic material (Example 14).

As shown in FIG. 10, observation using FE-SEM showed that the magnetic material has an α-(Fe,Ti) phase of 10 nm to 200 nm and a spawn phase of several nm. The Ti content in each phase was in the range of 16.6 atom % to 26.6 atom % and 19.9 atom % to 39.3 atom %, respectively. Therefore, on average, the spawn phase was found to be more enriched with Ti than the α-(Fe,Ti) phase.

Further, the peak position of the (110) diffraction line of the first phase observed by X-ray diffraction was, when measured with CoK α-rays, 0.127 degrees to the lower angle side compared with an α-Fe magnetic powder prepared in order to compare with Example 1, and the half value width was 0.23 degrees.

Based on the peak position of the (110) diffraction line of the α-(Fe,Ti) phase, the line width thereof, and the literature values, the Ti content can be estimated to be about 0 to 20 atom %, and it could be confirmed that the Ti content at the peak position of the diffraction line is about 3 atom %, which is 2 atom % or more. Therefore, based on the above X-ray diffraction results as well, it was clarified that a second phase is also contained in this α-(Fe,Ti) phase.

In addition, other second phases are also contained in the spawn phase. Specifically, for example, when the spawn phase is referred to as the second phase and the $TiO_2$ phase is referred to as the second phase, these may indicate the same phase.

Based on image analysis, X-ray diffraction, oxygen content, and the like, the volume fraction of the bcc phase was estimated to be 55% by volume (excluding the spawn phase). In addition, the average crystal grain size of the whole is 30 nm, the average crystal grain size of the first phase not including the spawn phase is 100 nm, and the average crystal grain size of the second phase including the spawn phase is 30 nm.

Further, the amount of $TiO_2$ phase present was found to be at least 2% by volume or more from observation of FE-SEM/EDX and the like.

The saturation magnetization of this magnetic material was 115.5 emu/g, the coercive force was 25.8 kA/m, and there was no inflection point on the ¼ major loop.

Therefore, since the magnetic material of Example 14 has a coercive force exceeding 800 A/m and 40 kA/m or less, it was confirmed to be a semi-hard magnetic material.

The measurement results of the phases, composition, particle diameter, and magnetic properties of this example are summarized in Table 3.

Examples 15 to 23

Magnetic materials of the present invention were produced in the same manner as in Example 13, except that the reduction temperature was set to that shown in Table 3 within the range of 450° C. to 1200° C., and a rate v of temperature decrease (° C./min) until 400° C. was set to, when the reduction temperature is taken to be T (° C.), a velocity represented by relational expression (2). Further, in all of the examples, it was confirmed that an α-(Fe,Ti) phase (first phase) and a phase (second phase) having a larger Ti content than that phase were formed in the observed magnetic material.

The measurement results of the phases, compositions, particle diameters, and magnetic properties of these examples are summarized in Table 3.

Figure 11:
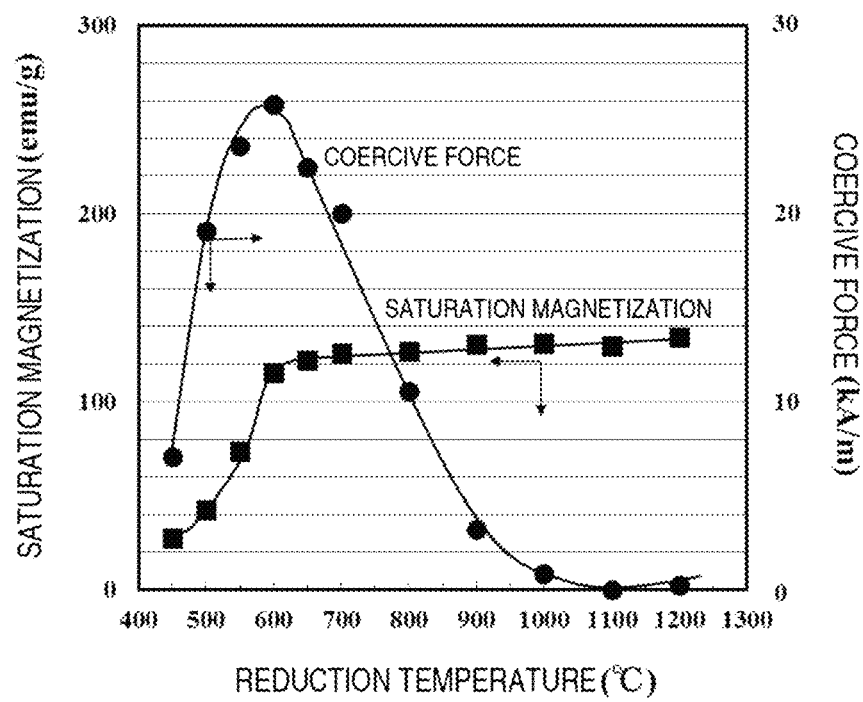
FIG. 11 is a diagram showing the reduction temperature dependence of saturation magnetization (emu/g) and coercive force (kA/m) on Fe—Ti magnetic materials (Examples 13 to 23).

It is also noted that FIG. 11 summarizes the results of the saturation magnetization and coercive force of Examples 13 to 23.

In these examples, the K content relative to the whole magnetic material including Ti, Fe, O, and K was from 2.8 atom % to 4.2 atom % at a reduction temperature of 450° C. to 700° C., and 0 atom % at 800° C. or more (Examples 8 to 11). For the $TiO_2$ phase, the K content was in the range of 0.1 to 4% by volume in all the examples.

Examples 24 to 26

Magnetic materials of the present invention were produced in the same manner as in Example 1, except that the Ti content, the reduction temperature, and the reduction time were set to the values shown in Table 4, and the rate of temperature increase and the rate of temperature decrease were as shown in Table 4. Further, in all of the examples, it was confirmed that an α-(Fe,Ti) phase (first phase) and a phase (second phase) having a larger Ti content than that phase were formed in the observed magnetic material.

The measurement results of the phases, compositions, particle diameters, and magnetic properties of the magnetic materials of these examples are summarized in Table 4.

The rate of temperature increase/decrease in Example 24 is the same as in Examples 5 and 17.

The "fast" condition and the "slow" condition of the rate of temperature increase/decrease shown in Table 4 are as follows.
(Rate of Temperature Increase)
"Fast": Temperature is increased at 10° C./min until the predetermined reduction temperature. (However, in Examples 25 and 26, annealing is carried out either side of a 15-minute constant temperature holding process at the point when the temperature reaches 300° C.)
"Slow": Temperature is increased at 10° C./min up to 300° C., and from 300° C. to the predetermined reduction temperature is increased at 2° C./min.
(Rate of Temperature Decrease)
"Fast": Until 400° C., temperature is decreased at a rate of temperature decrease (40 to 95° C./min) determined by relational expression (2), and from 400° C. to ordinary temperature, temperature is decreased over 40 minutes.
"Slow": Until 300° C., temperature is decreased at 2° C./min, and from 300° C. to ordinary temperature, temperature is decreased over 30 minutes.

Examples 27 and 28

Magnetic materials of the present invention were prepared in the same manner as in Example 22, except that, as the rate of temperature increase/decrease, the "fast" condition and the "slow" condition described in Examples 24 to 26 were combined and set as shown in Table 4. In all of the examples, it was confirmed that an α-(Fe,Ti) phase (first phase) and a phase (second phase) having a larger Ti content than that phase were formed in the observed magnetic materials. The measurement results of the phases, compositions, particle diameters, and magnetic properties of the magnetic materials of these examples are shown in Table 4.

Compared with Example 22, when the Ti content is approximately 30 atom % and the reduction temperature is 1000° C., the coercive force decreases by slowing either the rate of temperature increase or the rate of temperature decrease. In particular, when the rate is slowed when decreasing the temperature, the coercive force was 630 A/m, reaching the region of a soft magnetic material.

Example 29

The magnetic material powder of Example 10 was placed in a 3 ϕ cemented carbide die made of tungsten carbide and subjected to cold compression molding in air at ordinary temperature under 1 GPa to obtain a compact.

Figure 12:
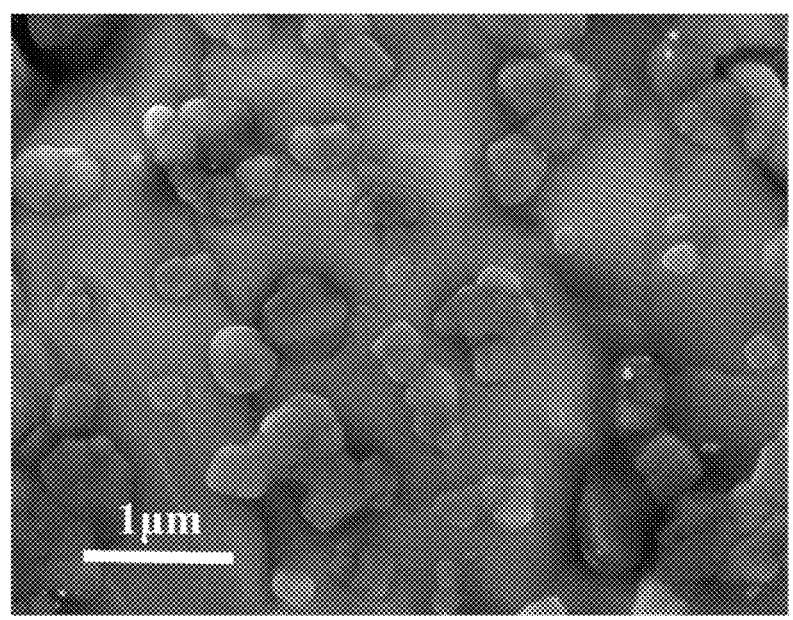
FIG. 12 is an SEM image of a $Fe_{94.4}Ti_{5.6}$ solid magnetic material surface (Example 29).

Next, the compact was sintered at ordinary pressure in hydrogen at 1000° C. for 1 hour to prepare a solid magnetic material. The rate of temperature increase was the above-mentioned "slow" condition, and the rate of temperature decrease was the above-mentioned "fast" condition. FIG. 12 is an SEM image obtained by observation of the surface of the pressureless sintered body of this example. Many crystal boundaries were observed to be present in the sintered continuous layer.

Figure 13:
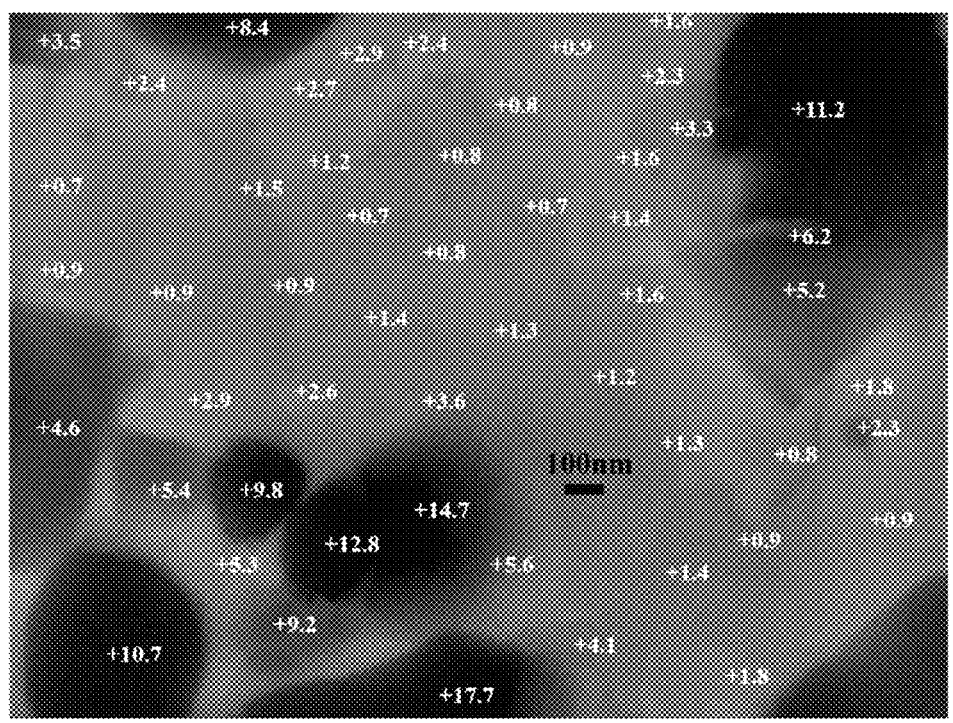
FIG. 13 is an SEM image of the polished surface of a $Fe_{94.4}Ti_{5.6}$ solid magnetic material surface (Example 29) (the numerical values in the diagram are the average value in the region having a radius of 100 nm to 150 nm in terms of Ti content (atom %) in the cruciform part).

FIG. 13 shows the polished surface of the pressureless sintered body of this example observed by FE-SEM/EDX. Most of the observation region is a bcc phase of Fe—Ti metal (total bcc volume fraction is 97% by volume), and the crystal phase can be seen to have divided into several tens to several hundred nm sizes by disproportionation phase separation. The Ti content was widely distributed from 0.7 atom % to 17.7 atom %, and it was found that a large Ti composition distribution is exhibited even in one crystal phase by the disproportionation reaction.

The measurement results of the phases, composition, particle diameter, magnetic properties, and electric resistivity of this solid magnetic material are shown in Table 5.

Further, it was conformed that this solid magnetic material was a soft magnetic material, with a coercive force of 560 A/m, and on the other hand, as described in the above Example 10, in a powder state, the solid magnetic material was a semi-hard magnetic material, with a coercive force of 980 A/m. The coercive force decreased as a result of the solidification of the powder due to ferromagnetic coupling caused by the sintering.

Example 30

A sintered body was obtained by placing the magnetic material powder of Example 2 in 3 ϕ cemented carbide die made of tungsten carbide, and then subjecting to electric current sintering in a vacuum at 300° C. under 1.4 GPa. The measurement results of the phases, composition, particle diameter, magnetic properties, and electric resistivity of the obtained solid magnetic material, which is an electrically-sintered body, are shown in Table 5.

Figure 14:
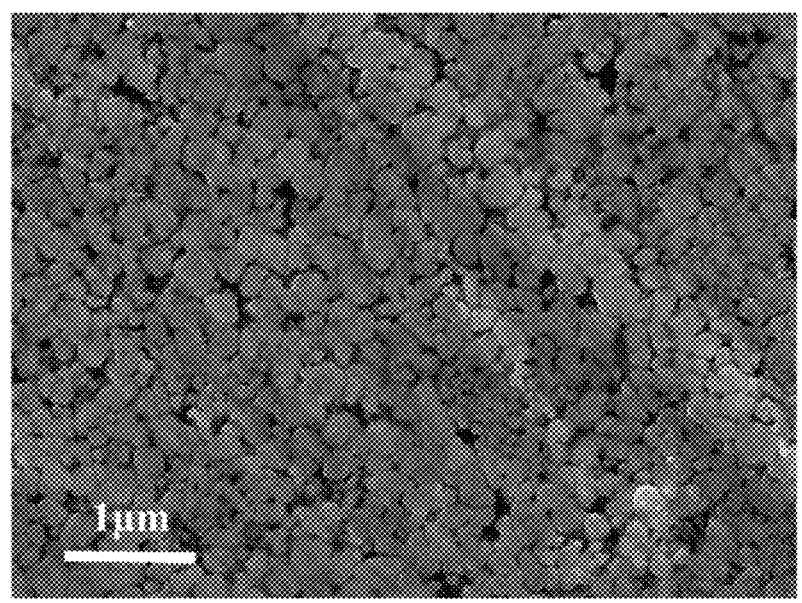
FIG. 14 is an SEM image of a $Fe_{94.4}Ti_{5.6}$ solid magnetic material surface (Example 30).

FIG. 14 is an SEM image obtained by observation of the surface of the electrically-sintered body of this example. Many spawn phases are present at the grain boundaries of the crystal phases, and it is possible to observe a state in which 100 nm first phases, or a 100 nm first phase and a spawn phase, which is a second phase, are bonded to each other.

It was confirmed that this solid magnetic material is a soft magnetic material, with a coercive force of 560 A/m, and on the other hand, as described in the above Example 2, in a powder state, the solid magnetic material is a semi-hard magnetic material, with a coercive force of 12400 A/m. The coercive force substantially decreased as a result of the solidification of the powder due to ferromagnetic coupling caused by the sintering.

Example 31

The magnetic material powder of Example 22 was placed in 3 ϕ cemented carbide die made of tungsten carbide, and then electric current sintering was carried out in a vacuum at 300° C. under 1 GPa. The solid magnetic material, which is an electrically-sintered body, was annealed in hydrogen at 1000° C. for 1 hour. The "rate of temperature increase" was selected as the "slow" condition in the descriptions of the above Examples 24 to 26, and the rate of temperature decrease was selected as the "fast" condition.

The measurement results of the phases, composition, particle diameter, magnetic properties, and electric resistivity of this solid magnetic material are shown in Table 5.

This solid magnetic material is the soft magnetic material of the present invention, with a coercive force of 620 A/m, and as described in the above Example 22, in a powder state, the solid magnetic material is a semi-hard magnetic material, with a coercive force of 850 A/m. The coercive force decreased as a result of the solidification of the powder due to ferromagnetic coupling caused by the sintering.

From analysis of the magnetic curve, it was found that the relative permeability of the solid magnetic materials of Examples 29 to 31 is in the order of $10^3$ to $10^4$.

Comparative Example 6

The powder of Comparative Example 3 was placed in a cemented carbide die made of tungsten carbide, and then electric current sintering was carried out in a vacuum at 315° C. under 1.4 GPa. The electric resistivity of the obtained material was 1.8 μΩm. The measurement results of the particle diameter, magnetic properties, and electric resistivity of the solid magnetic material are shown in Table 5.

From Table 5, it can be seen that the solid magnetic materials of the present invention described in Examples 29 to 31 have an electric conductivity higher by one order of magnitude than a solid magnetic material not containing Ti, and furthermore, compared with the 0.1 μΩm of pure iron and the 0.5 μΩm of an electromagnetic steel sheet, for example, which are existing materials, an electric resistivity higher by two orders of magnitude.

Example 32

A Ti-ferrite nanopowder having a $(Fe_{0.996}Ti_{0.004})_{43}O_{57}$ composition having an average powder particle diameter of 20 nm was obtained in the same manner as in Example 1. As a result of analyzing the nanopowder by X-ray diffraction, it was found that the cubic Ti-ferrite phase was the main phase and a slight amount of a rhombohedric ferrihydrite phase is contained as an impurity phase.

The Ti-ferrite nanopowder was placed in a crucible made of alumina, the temperature was increased at 10° C./min up to 300° C. in a hydrogen flow, the temperature was maintained at 300° C. for 15 minutes, then increased from 300° C. to 1100° C. at 10° C./min, and a reduction treatment was carried out at 1100° C. for 1 hour. After that, the temperature was lowered at a rate of 95° C./min to 400° C., and then cooled from 400° C. to room temperature over 40 minutes. Next, a gradual oxidation treatment was carried out at 20° C. in an argon atmosphere having an oxygen partial pressure of 1% by volume for 1 hour to obtain a magnetic material having a composition ratio of titanium to iron of $Fe_{99.6}Ti_{0.4}$. At this time, based on the whole magnetic material including Ti, Fe, O, and K, the O content was 0.4 atom % and the K content was zero. Further, the average powder particle diameter of the Fe—Ti magnetic material was 100 μm. Analysis on this magnetic material was carried out by the following method.

As a result of observing this magnetic material powder by X-ray diffraction, it was confirmed that an α-(Fe,Ti) phase, which is a bcc phase, is the main component. In addition, a $TiO_2$ phase having a higher Ti content than this phase was also confirmed to be slightly present. As a result, it was confirmed that the bcc α-(Fe,Ti) phase corresponds to the first phase and the $TiO_2$ phase corresponds to the second phase.

The Ti content calculated from the maximum value of the magnitude of the low angle shift at which the (110) diffraction line intensity is a maximum value was about 1 atom %.

Further, the crystallite size calculated from the (200) diffraction line width was about 30 nm.

As a result of SEM-EDX analysis of the material of this example using representative locations, a result was obtained in which the Ti content was very disproportionized, being from 0.01 to 2.43 atom %. Innumerable curved crystal boundaries curved at an interval in the order of tens of nanometers were also observed in a region thought to be a bcc phase having a low Ti content. Regarding the distribution, which is a measurement result obtained by averaging the composition in the region between the radius of 100 nm and 150 nm relative to the Ti content, of the crystal phases in this region, it was found that in this averaged composition distribution the crystal phases greatly varied depending on the location, having a distribution from 0.01 atom % to 2.10 atom %. The average value of the Ti content determined by SEM-EDX was about 0.04 atom %. Therefore, it is clear from these results that even in the α-(Fe,Ti) phase regions, there are phases that can be distinguished on Ti content, for example, an α-(Fe,Ti) phase having a Ti content of 2.10 atom %, which is twice or more and $10^5$ times or less the content an α-(Fe,Ti) phase having a Ti content of 0.01 atom %, and which is 2 atom % or more, namely, that regarding the α-(Fe,Ti) phases, a phase other than the first phase and that corresponds to the second phase is also present.

The volume fraction of the all the bcc phases, including these second phases, was estimated to be about 99.9% by volume.

The average crystal grain size of the whole magnetic material of this example was about 300 nm. The crystal grain size of the first phase and the second phase was each about 300 nm. The reason why these crystal grain sizes are measured to be larger than the crystallite size of 30 nm is thought to be that because that SEM observation is used for the measurement of the average crystal grain size in this example, and due to the low resolution of the SEM, or due to the presence of crystal boundaries that cannot be observed by an SEM, the value is measured to be larger than it actually is. However, even when SEM observation is used for the measurement of the average crystal grain size of this example, the size is 10 m or less, and the average crystal grain size of this example is confirmed to be within the range of the magnetic material of the present invention.

In addition, observation of the crystal boundary vicinity at a magnification of 750,000 times confirmed that no heterogenous phases existed near these crystal boundaries.

Further, TEM-EDX analysis was performed on a sheet-shaped sample formed from a powder cut to a thickness of 100 nm. As a result, a concentration fluctuation (falling within the Ti content of 0 atom % to 8.5 atom %) in the Ti content in the bcc phases including the first phase and the second phase of about 1 nm to 40 nm was found to exist. The size of this fluctuation corresponds to the crystallite size by XRD measurement.

The saturation magnetization of the magnetic material of this example was 205.1 emu/g, the coercive force was 80

A/m, and there was no inflection point on the ¼ major loop. Since the magnetic material of this example has a coercive force of 800 A/m or less, it was confirmed to be a soft magnetic material.

TABLE 1

| Example | Reduction Temperature (° C.) | Reduction Time (hours) | FeTi Powder Ti Content (atom %) | First Phase | Second Phase | bcc Phase Volume Fraction (% by volume) | O Content (atom %) | Average Powder Particle Diameter (nm) |
|---|---|---|---|---|---|---|---|---|
| Example 1 | 1100 | 1 | 5.8 | α-(Fe,Ti) phase | α-(Fe,Ti) phase | 97 | 2.6 | 30000 |
| Comparative Example 1 | — | — | 4.9 | — | — | 0 | 57 | 20 |
| Example 2 | 600 | 1 | 5.6 | α-(Fe,Ti) phase | α-(Fe,Ti) phase, spawn phase | 92 | 6.0 | 50 |
| Example 3 | 450 | 1 | 5.1 | α-(Fe,Ti) phase | Titanomagnetite phase, wustite phase | 15 | 49 | 30 |
| Example 4 | 500 | 1 | 5.1 | α-(Fe,Ti) phase | Titanohematite phase, titanomagnetite phase | 20 | 46 | 50 |
| Example 5 | 550 | 1 | 5.4 | α-(Fe,Ti) phase | Titanohematite phase, titanomagnetite phase, spawn phase | 41 | 35 | 50 |
| Example 6 | 650 | 1 | 5.4 | α-(Fe,Ti) phase | α-(Fe,Ti) phase, spawn phase | 91 | 6.5 | 40 |
| Example 7 | 700 | 1 | 5.5 | α-(Fe,Ti) phase | α-(Fe,Ti) phase, spawn phase | 92 | 6.1 | 40 |
| Example 8 | 800 | 1 | 5.5 | α-(Fe,Ti) phase | α-(Fe,Ti) phase | 93 | 6.1 | 500 |
| Example 9 | 900 | 1 | 5.5 | α-(Fe,Ti) phase | α-(Fe,Ti) phase | 96 | 5.3 | 1000 |
| Example 10 | 1000 | 1 | 5.6 | α-(Fe,Ti) phase | α-(Fe,Ti) phase | 96 | 2.8 | 5000 |
| Example 11 | 1200 | 1 | 5.8 | α-(Fe,Ti) phase | α-(Fe,Ti) phase | 99 | 0.7 | 50000 |
| Comparative Example 2 | 425 | 1 | 0 | — | — | 29 | 41 | 100 |
| Comparative Example 3 | 425 | 4 | 0 | — | — | 97 | 1.6 | 2000 |
| Comparative Example 4 | 450 | 1 | 0 | — | — | 99 | 0.7 | 2000 |
| Example 12 | 660 | 4 | 5.6 | α-(Fe,Ti) phase | α-(Fe,Ti) phase, spawn phase | 92 | 5.7 | 40 |

| Example | Average Crystal Grain Size of the Whole (nm) | First Phase Average Crystal Grain Size (nm) | Second Phase Average Crystal Grain Size (nm) | Saturation Magnetization (emu/g) | Coercive Force (A/m) | Presence/ Absence of Inflection Point on ¼ Major Loop | bcc Phase Ti Content (atom %) Estimated From Magnitude of (110) Low Angle Shift |
|---|---|---|---|---|---|---|---|
| Example 1 | 200 | 200 | 400 | 202.8 | 680 | Absent | 3 |
| Comparative Example 1 | 20 | — | — | 31.8 | 5200 | Absent | — |
| Example 2 | 50 | 100 | 50 | 194.1 | 12400 | Absent | 2 |
| Example 3 | 30 | 80 | 30 | 60.1 | 12500 | Absent | 1 |
| Example 4 | 50 | 100 | 50 | 68.9 | 15500 | Absent | 1 |
| Example 5 | 50 | 100 | 50 | 107.5 | 15900 | Absent | 3 |
| Example 6 | 40 | 100 | 40 | 194.7 | 11200 | Absent | 2 |
| Example 7 | 40 | 100 | 40 | 193.8 | 11400 | Absent | 2 |
| Example 8 | 70 | 60 | 100 | 199.2 | 4100 | Absent | 1 |
| Example 9 | 80 | 70 | 200 | 202.7 | 1400 | Absent | 3 |
| Example 10 | 100 | 90 | 400 | 203.6 | 980 | Absent | 3 |
| Example 11 | 300 | 200 | 500 | 204.7 | 540 | Absent | 4 |
| Comparative Example 2 | 100 | — | — | 85.9 | 12000 | Absent | — |
| Comparative Example 3 | 2000 | — | — | 214.6 | 3700 | Absent | — |
| Comparative Example 4 | 2000 | — | — | 216.6 | 3200 | Absent | — |
| Example 12 | 40 | 90 | 40 | 194.9 | 7500 | Absent | 3 |

TABLE 2

| Example | FeTi Powder Ti Content (atom %) | bcc Phase Volume Fraction (% by volume) | Average Powder Particle Diameter (nm) | Average Crystal Grain Size (nm) | Saturation Magnetization (emu/g) | Days Left at Room Temperature (days) | $\Delta\sigma_s$ (%) |
|---|---|---|---|---|---|---|---|
| Example 1 | 5.8 | 97 | 30000 | 200 | 202.8 | 60 | −0.8 |
| Example 11 | 5.8 | 99 | 50000 | 300 | 204.7 | 120 | −0.4 |
| Example 13 | 30.9 | 63 | 2000 | 100 | 129.6 | 120 | −1.0 |
| Comparative Example 2 | 0 | 29 | 100 | 100 | 85.9 | 60 | 5.4 |
| Comparative Example 3 | 0 | 97 | 2000 | 2000 | 214.6 | 60 | 19.0 |
| Comparative Example 4 | 0 | 99 | 2000 | 2000 | 216.6 | 120 | 27.2 |

TABLE 3

| Example | Reduction Temperature (°C.) | Reduction Time (hours) | FeTi Powder Ti Content (atom %) | First Phase | Second Phase* | bcc Phase Volume Fraction (% by volume) | O Content (atom %) | Average Powder Particle Diameter (nm) |
|---|---|---|---|---|---|---|---|---|
| Example 13 | 1100 | 1 | 30.9 | α-(Fe,Ti) phase | α-(Fe,Ti) phase, TiO$_2$ phase, other | 63 | 27 | 2000 |
| Comparative Example 5 | — | — | 27.0 | — | — | 0 | 57 | 20 |
| Example 14 | 600 | — | 28.6 | α-(Fe,Ti) phase | α-(Fe,Ti) phase, spawn phase, TiO$_2$ phase, other | 58 | 32 | 30 |
| Example 15 | 450 | 1 | 27.2 | α-(Fe,Ti) phase | Titanomagnetite phase, wustite phase | 6.4 | 54 | 20 |
| Example 16 | 500 | 1 | 28.0 | α-(Fe,Ti) phase | Titanomagnetite phase, wustite phase | 14 | 51 | 20 |
| Example 17 | 550 | 1 | 28.2 | α-(Fe,Ti) phase | Titanomagnetite phase, spawn phase | 30 | 42 | 30 |
| Example 18 | 650 | 1 | 28.5 | α-(Fe,Ti) phase | α-(Fe,Ti) phase, spawn phase, TiO$_2$ phase, other | 58 | 30 | 30 |
| Example 19 | 700 | 1 | 28.8 | α-(Fe,Ti) phase | α-(Fe,Ti) phase, spawn phase, TiO$_2$ phase, other | 60 | 29 | 50 |
| Example 20 | 800 | 1 | 28.7 | α-(Fe,Ti) phase | α-(Fe,Ti) phase, TiO$_2$ phase, other | 60 | 29 | 100 |
| Example 21 | 900 | 1 | 29.3 | α-(Fe,Ti) phase | α-(Fe,Ti) phase, TiO$_2$ phase, other | 62 | 28 | 200 |
| Example 22 | 1000 | 1 | 29.2 | α-(Fe,Ti) phase | α-(Fe,Ti) phase, TiO$_2$ phase, other | 62 | 27 | 500 |
| Example 23 | 1200 | 1 | 30.6 | α-(Fe,Ti) phase | α-(Fe,Ti) phase, TiO$_2$ phase, other | 64 | 26 | 30000 |

| Example | Average Crystal Grain Size of the Whole (nm) | First Phase Average Crystal Grain Size (nm) | Second Phase Average Crystal Grain Size (nm) | Saturation Magnetization (emu/g) | Coercive Force (A/m) | Presence/Absence of Inflection Point on ¼ Major Loop | bcc Phase Ti Content (atom %) Estimated From Magnitude of (110) Low Angle Shift |
|---|---|---|---|---|---|---|---|
| Example 13 | 100 | 80 | 100 | 129.6 | 8 | Absent | 3 |
| Comparative Example 5 | 20 | — | — | 14.5 | 3500 | Absent | — |
| Example 14 | 30 | 100 | 30 | 115.5 | 25800 | Absent | 3 |
| Example 15 | 20 | 20 | 20 | 27.4 | 7100 | Absent | 2 |
| Example 16 | 20 | 20 | 20 | 42.5 | 19100 | Absent | 3 |
| Example 17 | 30 | 100 | 30 | 73.4 | 23600 | Absent | 2 |
| Example 18 | 30 | 100 | 30 | 121.9 | 22506 | Absent | 3 |
| Example 19 | 50 | 100 | 50 | 125.7 | 20000 | Absent | 3 |
| Example 20 | 70 | 70 | 70 | 126.5 | 10500 | Absent | 2 |
| Example 21 | 80 | 70 | 80 | 130.5 | 3200 | Absent | 2 |
| Example 22 | 80 | 70 | 90 | 131.1 | 850 | Absent | 3 |
| Example 23 | 200 | 100 | 200 | 134.2 | 250 | Absent | 3 |

*The "other" phases are a Laves phase and a β-Ti phase.

TABLE 4

| Example | Reduction Temperature (° C.) | Reduction Time (hours) | Rate of Temperature Increase | Rate of Temperature Decrease | FeTi Powder Ti Content (atom %) | First Phase | Second Phase* | bcc Phase Volume Fraction (% by volume) | O Content (atom %) |
|---|---|---|---|---|---|---|---|---|---|
| Example 24 | 550 | 4 | Slow | Fast | 29.2 | α-(Fe,Ti) phase | α-(Fe,Ti) phase, spawn phase | 54 | 32 |
| Example 25 | 1100 | 1 | Fast | Fast | 4.5 | α-(Fe,Ti) phase | α-(Fe,Ti) phase, $TiO_2$ phase | 98 | 1.5 |
| Example 26 | 1100 | 1 | Fast | Fast | 9.4 | α-(Fe,Ti) phase | α-(Fe,Ti) phase, $TiO_2$ phase, other | 92 | 6.3 |
| Example 27 | 1000 | 1 | Fast | Fast | 29.6 | α-(Fe,Ti) phase | α-(Fe,Ti) phase, $TiO_2$ phase, other | 62 | 27 |
| Example 28 | 1000 | 1 | Fast | Slow | 29.8 | α-(Fe,Ti) phase | α-(Fe,Ti) phase, $TiO_2$ phase, other | 64 | 26 |

| Example | Average Powder Particle Diameter (nm) | Average Crystal Grain Size of the Whole (nm) | First Phase Average Crystal Grain Size (nm) | Second Phase Average Crystal Grain Size (nm) | Saturation Magnetization (emu/g) | Coercive Force (A/m) | Presence/ Absence of Inflection Point on ¼ Major Loop | bcc Phase Ti Content (atom %) Estimated From Magnitude of (110) Low Angle Shift |
|---|---|---|---|---|---|---|---|---|
| Example 24 | 30 | 30 | 100 | 30 | 113.8 | 21500 | Absent | 2 |
| Example 25 | 50000 | 300 | 200 | 500 | 208.0 | 750 | Absent | 2 |
| Example 26 | 1000 | 100 | 100 | 200 | 193.3 | 920 | Absent | 2 |
| Example 27 | 500 | 50 | 90 | 100 | 130.6 | 1570 | Absent | 3 |
| Example 28 | 500 | 70 | 60 | 70 | 133.1 | 630 | Absent | 3 |

*The "other" phases are a Laves phase and a β-Ti phase

TABLE 5

[表5]

| Example | FeTi Powder Ti Content (atom %) | First Phase | Second Phase* | bcc Phase Volume Fraction (% by volume) | O Content (atom %) | Average Crystal Grain Size of the Whole (nm) | First Phase Average Crystal Grain Size (nm) | Second Phase Average Crystal Grain Size (nm) |
|---|---|---|---|---|---|---|---|---|
| Example 29 | 5.6 | α-(Fe,Ti) phase | α-(Fe,Ti) phase | 97 | 2.2 | 200 | 200 | 200 |
| Example 30 | 5.6 | α-(Fe,Ti) phase | α-(Fe,Ti) phase | 90 | 7.7 | 100 | 100 | 100 |
| Example 31 | 31.4 | α-(Fe,Ti) phase | α-(Fe,Ti) phase, $TiO_2$ phase, other | 62 | 27.1 | 90 | 80 | 90 |
| Comparative Example 6 | — | — | — | 93 | 4.5 | 2000 | — | — |

| Example | Saturation Magnetization (emu/g) | Saturation Magnetization (T) | Coercive Force (A/m) | Presence/ Absence of Inflection Point on ¼ Major Loop | Density (g/cm³) | Electric Resistivity (μΩm) | bcc Phase Ti Content (atom %) Estimated From Magnitude of (110) Low Angle Shift |
|---|---|---|---|---|---|---|---|
| Example 29 | 204.6 | 1.66 | 560 | Absent | 6.47 | 18 | 3 |
| Example 30 | 189.2 | 1.57 | 560 | Absent | 6.60 | 11 | 2 |
| Example 31 | 130.1 | 0.79 | 620 | Absent | 4.82 | 14 | 3 |
| Comparative Example 6 | 208.7 | 1.84 | 3500 | Absent | 7.02 | 1.8 | — |

*The "other" phases are a Laves phase and a β-Ti phase.

INDUSTRIAL APPLICABILITY

According to the magnetic material of the present invention, it is possible to have a high saturation magnetization and solve the problem of eddy current loss due to a high electric resistivity, which are contradictory characteristics for conventional magnetic materials, and yet have excellent electromagnetic properties that combine the merits of both metallic magnetic materials and oxide-based magnetic materials which do not require complicated steps such as lamination, as well as have stable magnetic properties even in air.

The present invention relates to a soft magnetic material used in transformers, heads, inductors, reactors, cores (magnetic core), yokes, magnet switches, choke coils, noise filters, ballast, and the like mainly used for power devices, transformers, and information communication related devices, as well as a motor or a linear motor for a rotary machines such as various actuators, voice coil motors, induction motors, reactance motors and the like, and in particular, a soft magnetic material used for a rotor, a stator, and the like, for automotive drive motors exceeding 400 rpm, motors for industrial machines such as power generators, machine tools, various generators, and various pumps, and motors for domestic electric appliances such as air conditioners, refrigerators, and vacuum cleaners.

The present invention also relates to a soft magnetic material used in antennas, microwave elements, magnetostrictive elements, magnetic acoustic elements, and the like, as well as in sensors that employ a magnetic field, such as Hall elements, magnetic sensors, current sensors, rotation sensors, and electronic compasses.

In addition, the present invention relates to a semi-hard magnetic material used in relays such as monostable and bistable electromagnetic relays, switches such as torque limiters, relay switches, and solenoid valves, rotating machines such as hysteresis motors, hysteresis coupling having a brake functions and the like, sensors for detecting a magnetic field, a rotation speed, and the like, a bias of a magnetic tag, a spin valve element, and the like, a magnetic recording medium or element such as a tape recorder, a VTR, a hard disk, and the like.

Further, the present invention can also be used for high frequency soft magnetic and semi-hard magnetic materials for high frequency transformers and reactors, as well as magnetic materials suppressing obstacles due to unnecessary electromagnetic interference, such as electromagnetic noise absorbing materials, electromagnetic wave absorbing materials, and magnetic shielding materials, materials for inductor elements such as noise removing inductors, RFID (Radio Frequency Identification) tag materials, noise filter materials, and the like.

REFERENCE SIGN LIST

51 Fe—Ti magnetic material phase
52 Ti-enriched phase (spawn phase)

The invention claimed is:

1. A magnetic material, comprising a first phase having crystals with a bcc structure containing Fe and Ti and a second phase containing Ti, the second phase having a Ti content that is, when a sum of the Fe and the Ti contained in the second phase is taken to be 100 atom %, larger than a Ti content when a sum of the Fe and the Ti contained in the first phase is taken to be 100 atom %,
wherein the second phase comprises a phase having crystals with a bcc structure containing Fe and Ti, and the Ti content when the sum of the Fe and the Ti contained in the phase is taken to be 100 atom %, is an amount of 2 times or more and $10^5$ times or less relative to the Ti content when the sum of the Fe and the Ti contained in the first phase is taken to be 100 atom % and/or the Ti content when the sum of the Fe and the Ti contained in the second phase is taken to be 100 atom % is 2 atom % or more and 100 atom % or less, and
wherein the magnetic material is in a powder form, and when the magnetic material is soft magnetic, the magnetic material has an average powder particle diameter of 10 nm or more and 5 mm or less, and when the magnetic material is semi-hard magnetic, the magnetic material has an average powder particle diameter of 10 nm or more and 10 μm or less.

2. The magnetic material according to claim 1, wherein the magnetic material is soft magnetic.

3. The magnetic material according to claim 1, wherein the first phase has a composition represented by a composition formula $Fe_{100-x}Ti_x$ (where x is 0.001≤x≤33 in terms of atomic percentage).

4. The magnetic material according to claim 1, wherein the first phase has a composition represented by a composition formula $Fe_{100-x}(Ti_{100-y}M_y)_{x/100}$ (where x and y are 0.001≤x≤33 and 0.001≤y<50 in terms of atomic percentage, and M is one or more of Zr, Hf, Mn, V, Nb, Ta, Cr, Mo, W, Ni, Co, Cu, Zn, and Si).

5. The magnetic material according to claim 1, wherein the second phase comprises at least any one of a Ti-ferrite phase and a wustite phase.

6. The magnetic material according to claim 1, wherein the second phase comprises a $TiO_2$ phase.

7. The magnetic material according to claim 1, wherein the first phase and the second phase which have crystals with a bcc structure containing Fe and Ti have a volume fraction of 5% by volume or more based on the whole magnetic material.

8. The magnetic material according to claim 1, wherein an average crystal grain size of the first phase, the second phase, or the whole magnetic material is 1 nm or more and less than 10 μm.

9. The magnetic material according to claim 1, wherein at least the first phase has a bcc phase having a composition represented by a composition formula $Fe_{100-x}Ti_x$ (where x is 0.001≤x≤1 in terms of atomic percentage), and the bcc phase has a crystallite size of 1 nm or more and 100 nm or less.

10. The magnetic material according to claim 1, wherein at least one of the first phase and the second phase is ferromagnetically coupled with adjacent phases.

11. The magnetic material according to claim 1, wherein the first phase and the second phase are continuously bonded to each other directly or via a metal phase or an inorganic phase to form a massive state as the whole magnetic material.

12. The magnetic material according to claim 5, wherein the magnetic material has a composition in a range of, based on the composition of the whole magnetic material, 20 atom % or more and 99.998 atom % or less of Fe, 0.001 atom % or more and 50 atom % or less of Ti, and 0.001 atom % or more and 55 atom % or less of O.

13. A method for producing the magnetic material according to claim 1, comprising reducing a titanium ferrite powder having an average powder particle diameter of 1 nm or more and less than 1 μm in a reducing gas containing hydrogen gas at a reduction temperature of 400° C. or more and 1290° C. or less.

14. A method for producing the magnetic material according to by claim 1, comprising reducing a titanium ferrite powder having an average powder particle diameter of 1 nm or more and less than 1 μm in a reducing gas containing hydrogen gas, and forming the first phase and the second phase by a disproportionation reaction.

15. A method for producing the magnetic material according to claim 11, comprising reducing a titanium ferrite powder having an average powder particle diameter of 1 nm or more and less than 1 μm in a reducing gas containing hydrogen gas at a reduction temperature of 400° C. or more and 1290° C. or less to produce a magnetic material, and sintering the magnetic material.

16. A method for producing a soft magnetic or semi-hard magnetic material, comprising producing a magnetic material according to claim 13, and performing annealing at least once after the reduction step.

17. A method for producing a soft magnetic or semi-hard magnetic material, comprising producing a magnetic material according to claim 14, and performing annealing at least once after the reduction step.

18. A method for producing a soft magnetic or semi-hard magnetic material, comprising producing a magnetic material according to claim 15, and performing annealing at least once after the reduction step.

19. A method for producing the magnetic material according to claim 11, comprising reducing a titanium ferrite powder having an average powder particle diameter of 1 nm or more and less than 1 μm in a reducing gas containing hydrogen gas to produce a magnetic material, forming the first phase and the second phase by a disproportionation reaction, and sintering the magnetic material.

* * * * *